US005504839A

United States Patent [19]

Mobus

[11] Patent Number: 5,504,839
[45] Date of Patent: Apr. 2, 1996

[54] PROCESSOR AND PROCESSING ELEMENT FOR USE IN A NEURAL NETWORK

[75] Inventor: George E. Mobus, 1925 Willowwood St., Denton, Tex. 76205

[73] Assignees: Caterpillar Inc., Peoria, Ill.; George E. Mobus, Bellingham, Wash.

[21] Appl. No.: 297,529

[22] Filed: Aug. 29, 1994

Related U.S. Application Data

[63] Continuation of Ser. No. 697,142, May 8, 1991, abandoned.

[51] Int. Cl.$^6$ .................................................. G06F 15/18
[52] U.S. Cl. .............................. 395/24; 395/23; 395/27
[58] Field of Search ........................................ 395/24, 27

[56] References Cited

U.S. PATENT DOCUMENTS

| | | | |
|---|---|---|---|
| 3,097,349 | 7/1963 | Putzrath et al. | 340/172.5 |
| 3,103,648 | 9/1963 | Hartmanis | 340/172.5 |
| 3,165,644 | 1/1965 | Clapper | 307/88.5 |
| 3,218,475 | 11/1965 | Hiltz | 307/88.5 |
| 3,293,609 | 12/1966 | Martin | 340/172.5 |
| 3,308,441 | 3/1967 | Dusheck, Jr. | 340/172.5 |
| 3,310,783 | 3/1967 | Putzrath | 340/172.5 |
| 3,310,784 | 3/1967 | Hilinski | 340/172.5 |
| 3,351,783 | 11/1967 | Harris et al. | 307/88.5 |
| 3,413,735 | 12/1968 | Harris et al. | 307/201 |
| 4,518,866 | 5/1985 | Clymer | 307/201 |
| 4,802,103 | 1/1989 | Faggin et al. | 364/513 |
| 4,912,649 | 3/1990 | Wood | 395/23 |
| 5,093,899 | 3/1992 | Hiraiwa | 395/23 |
| 5,093,900 | 3/1992 | Graf | 395/24 |

OTHER PUBLICATIONS

Caudill, "Neural Networks Primer—Part V", AI Expert, Nov. 1988, pp. 57–65.
Caudill, "Neural Networks Primer—Part VI", AI Expert, Feb., 1989, pp. 61–67.
Caudill, "Neural Networks Primer—Part VII", AI Expert, May 1989, pp. 51–58.
A Drive-Reinforcement Neural Network of Simple Instrumental Conditioning—J. S. Morgan et al—Pub. 1990.
A Neuronal Model of Classical Conditioning—A. Harry Klopf Pub. 1988.
Drive-Reinforcement Learning: A Self Supervised Model for Adaptive Control—James S. Morgan—Sub. to Mach. Learning (1990).
Pattern-Recognition by an Artificial Network Derived from Biologic Neuronal Systems—D. L. Alkon et al, Pub. 1990.
Article: The Role of Time of Natural Intelligence: Implications of Classical and Instrumental Conditioning for Neuronal and Neural Network Modeling; By: A. H. Klopf et al.; Published: 1990.

*Primary Examiner*—Robert W. Downs
*Attorney, Agent, or Firm*—James R. Yee

[57] ABSTRACT

A synaptic processor for use in a neural network produces a result signal in response to an input signal. The synaptic processor initializes an input expectation and receives an input signal. The synaptic processor determines a net modification to the the input expectation. The net modification to the input expectation has an increase term and a decrease term. The increase term is determined as a function of the input signal. The decrease term is independent of the magnitude of the input signal and is a function of a decay constant. The synaptic processor produces a result signal in response to the input expectation.

96 Claims, 49 Drawing Sheets

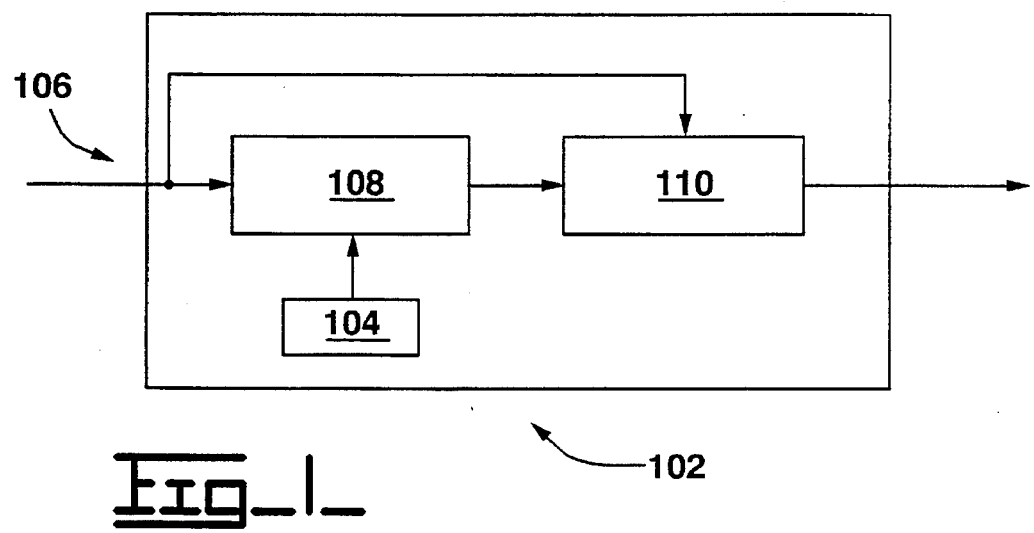
Fig_1_
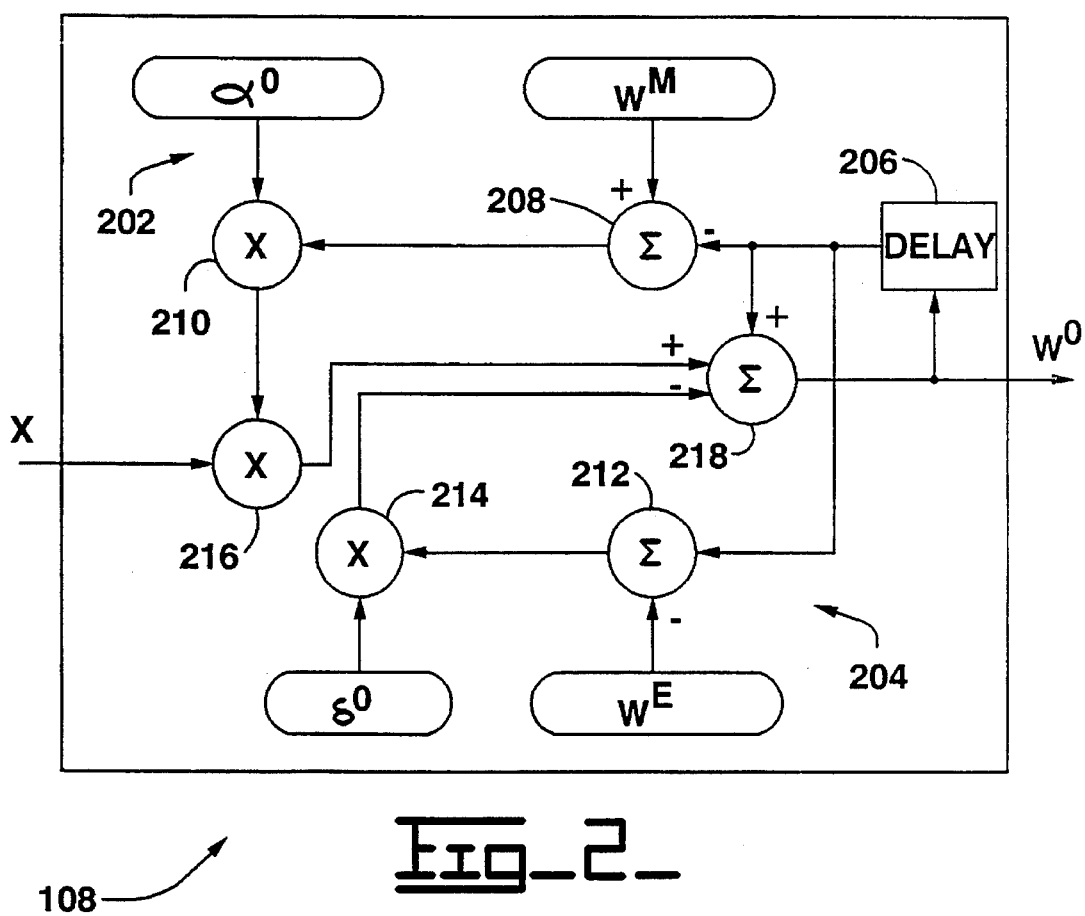
Fig_2_

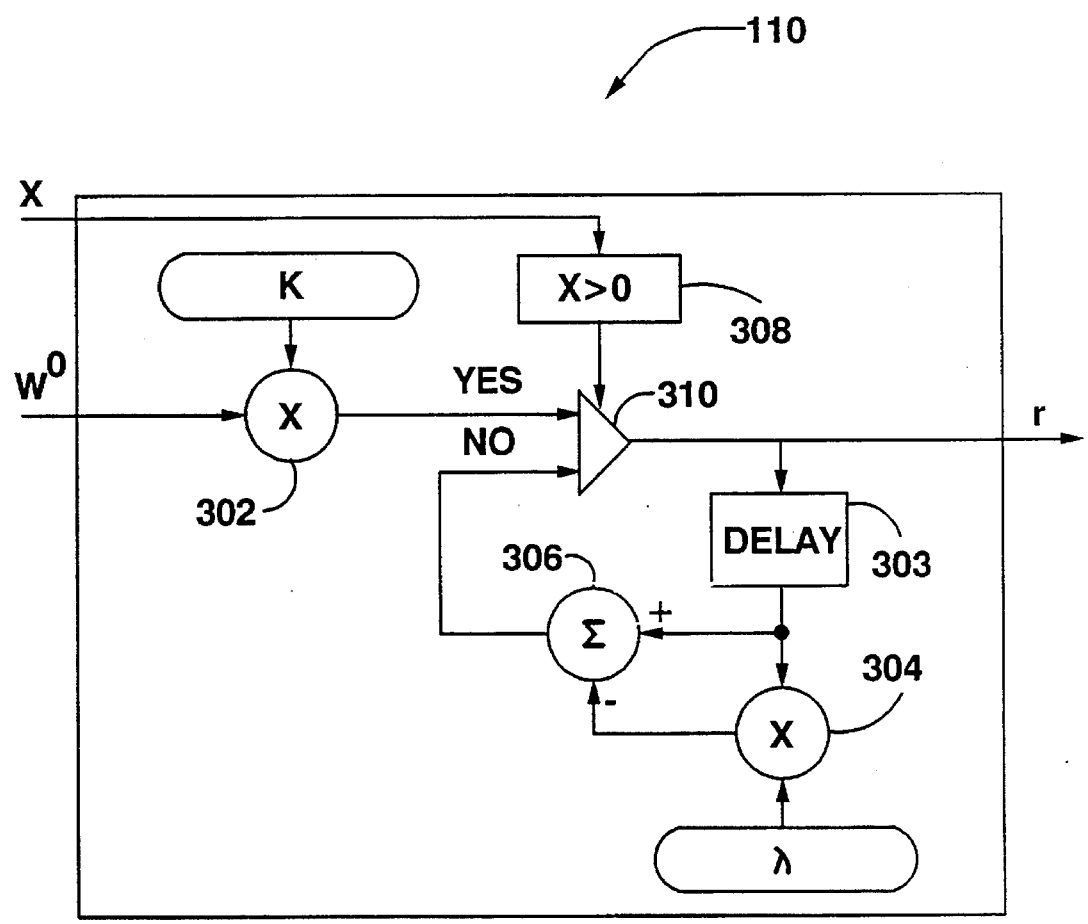
Fig_3_

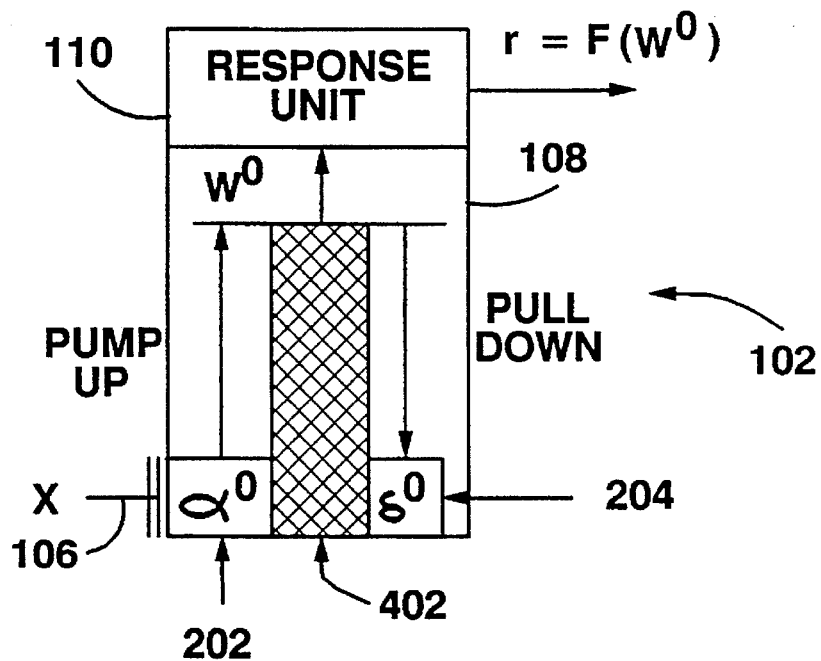
Fig_4_
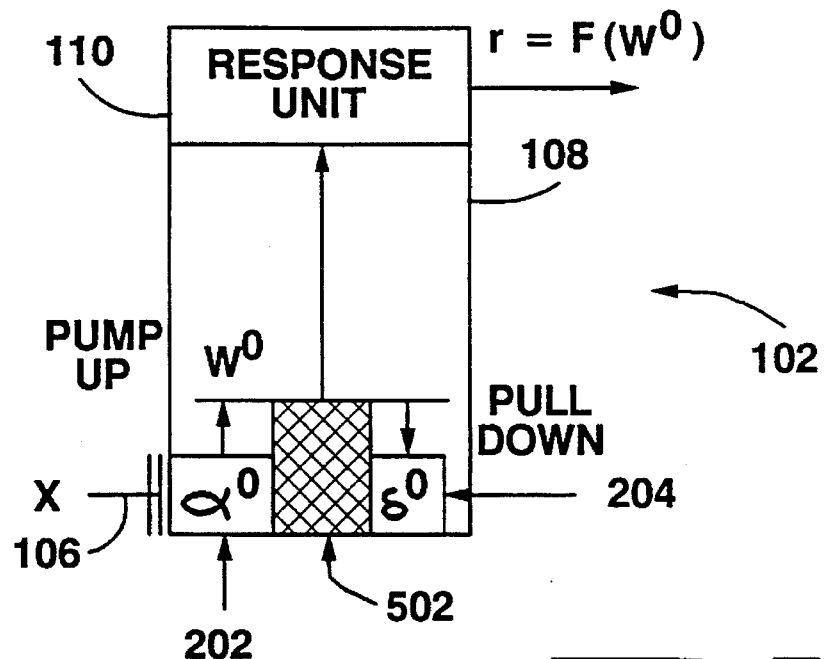
Fig_5_

Fig_6C_
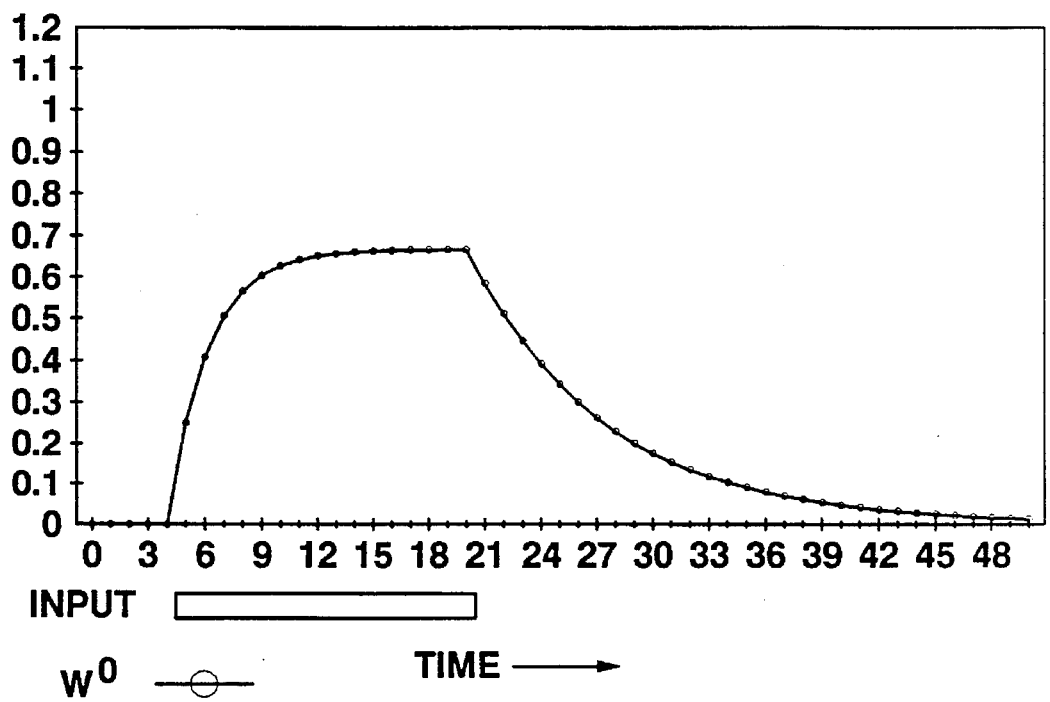
Fig_7A_
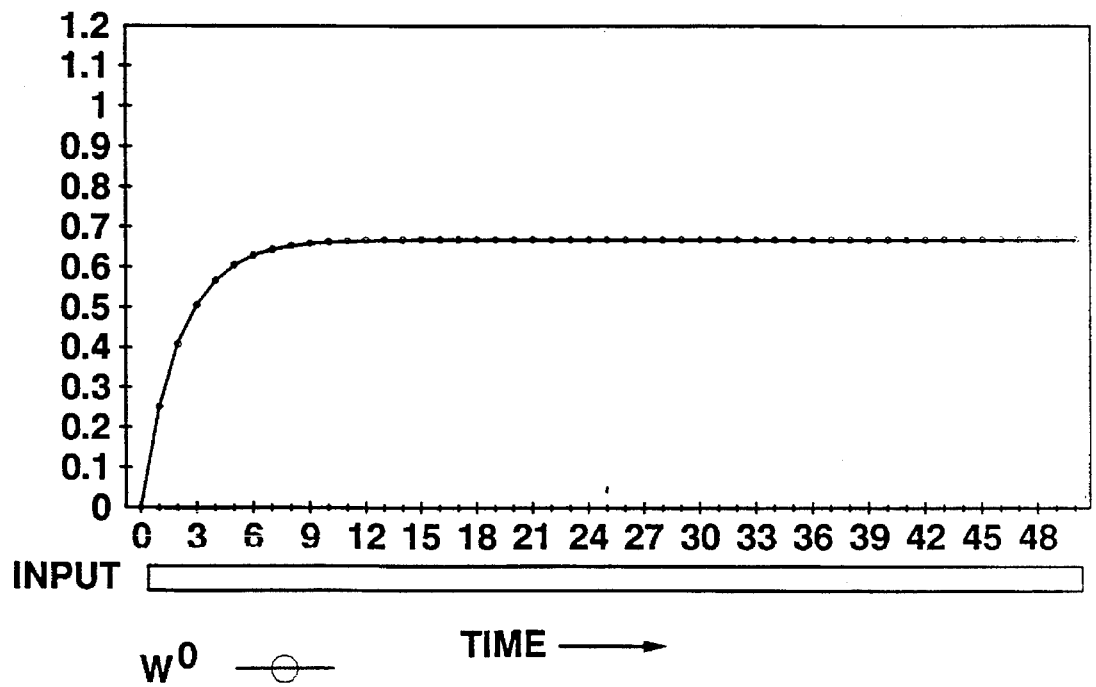

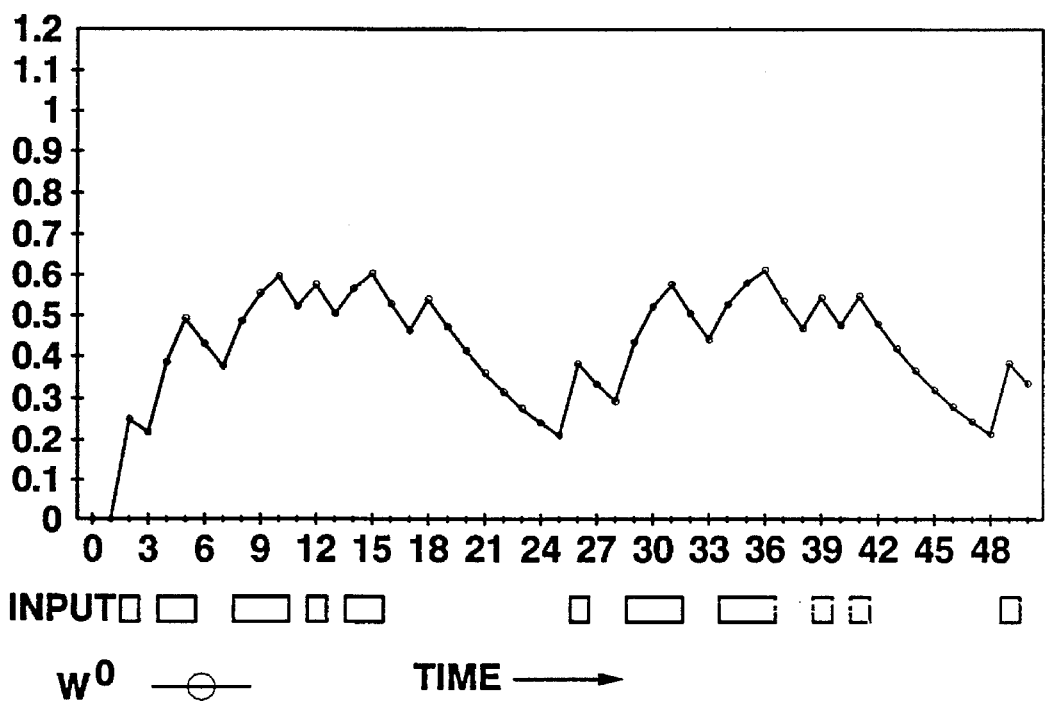
Fig_7B_
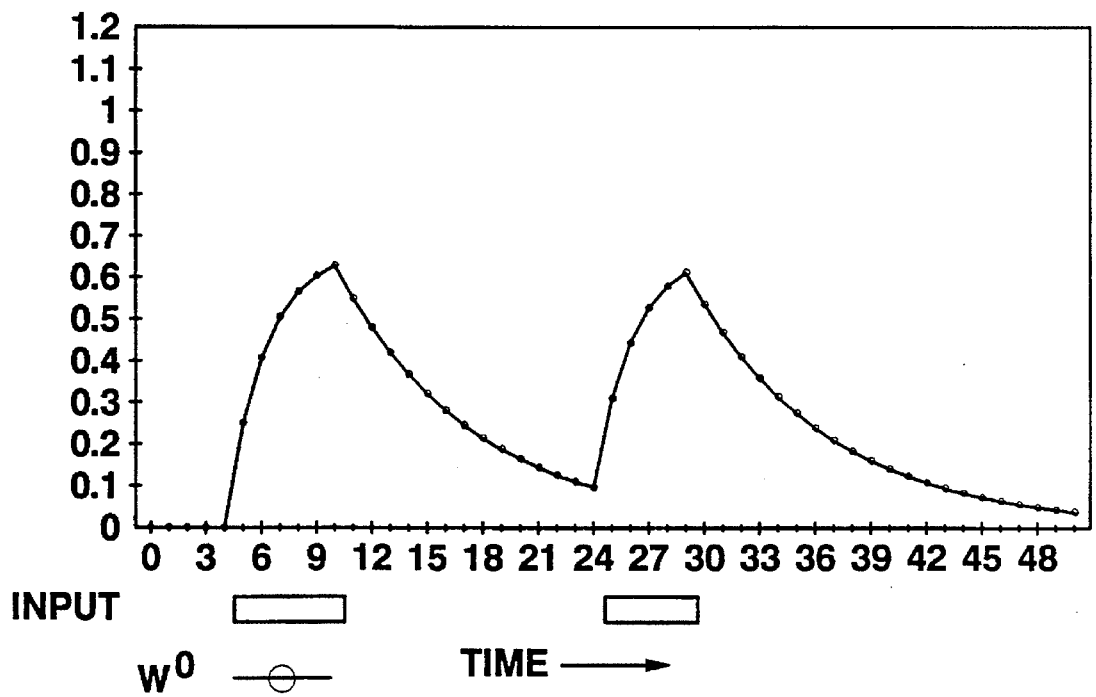
Fig_7C_

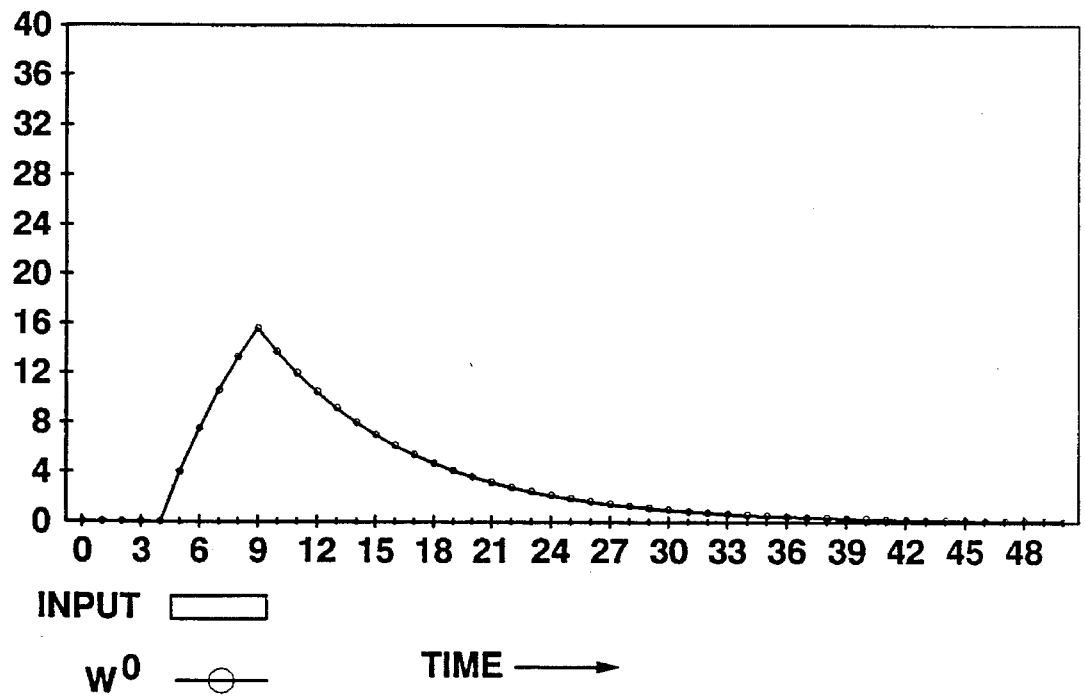
Fig_8A_
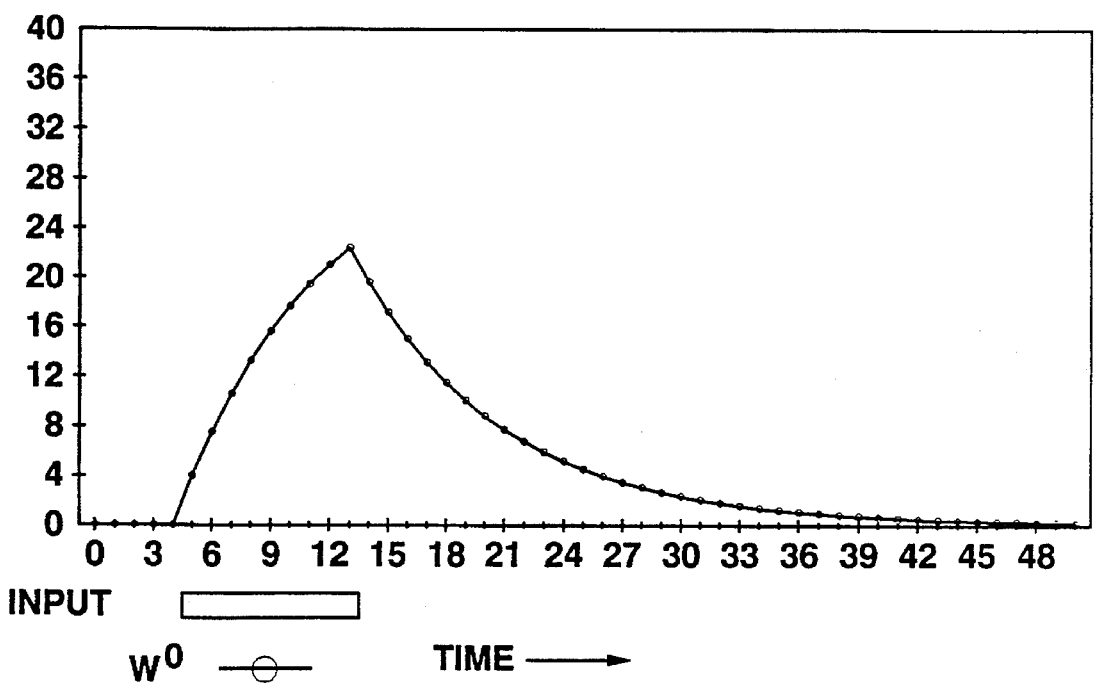
Fig_8B_

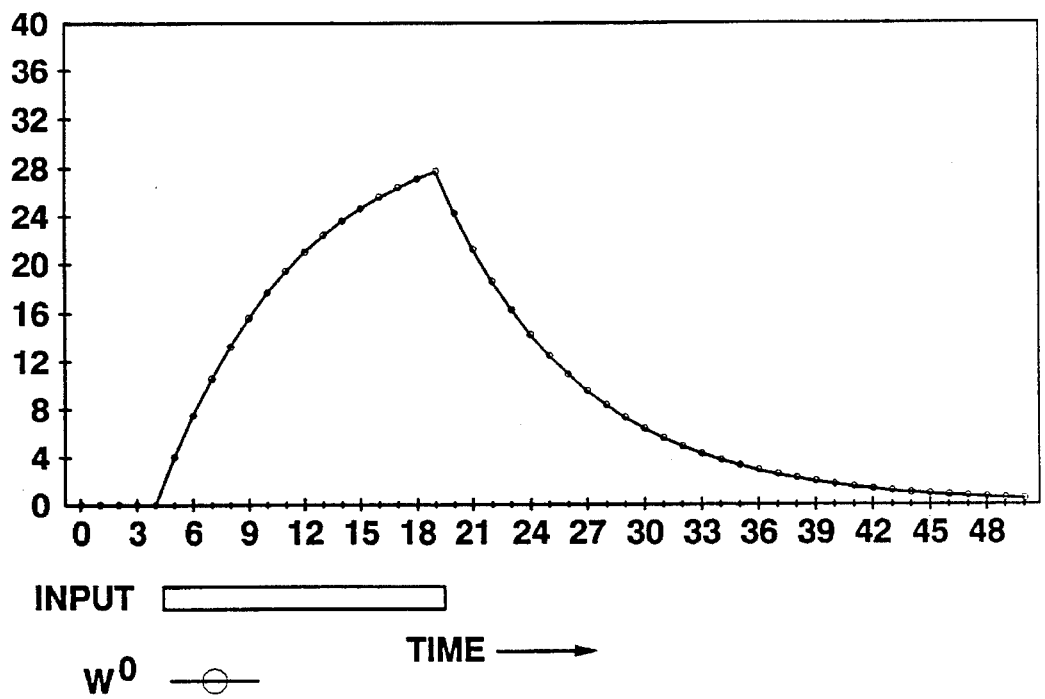
Fig_8C_
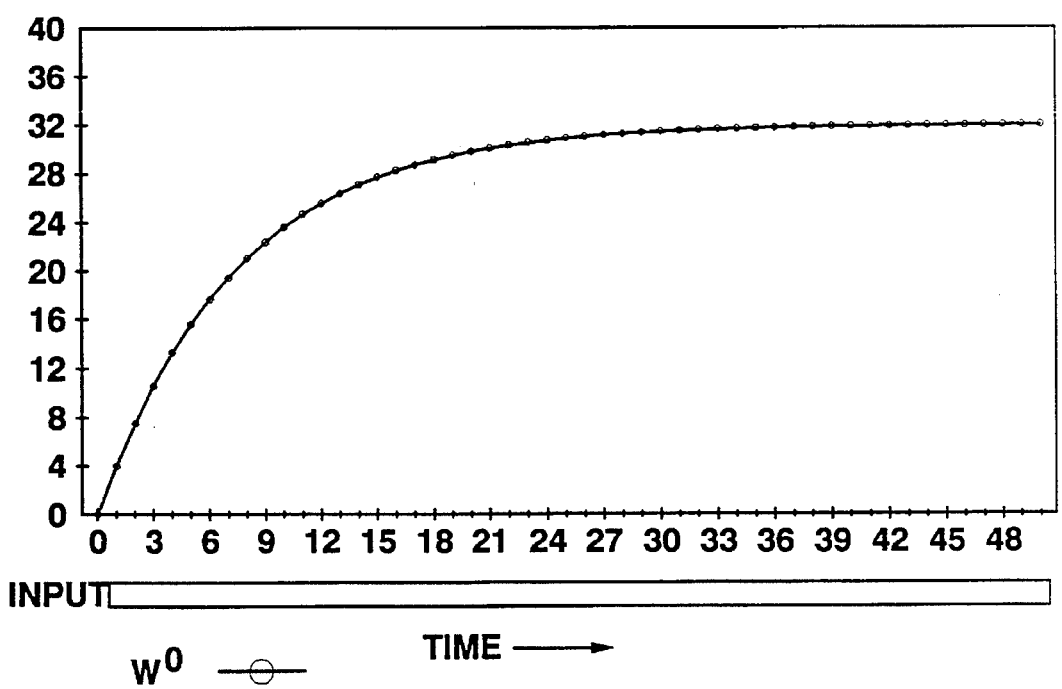
Fig_9A_

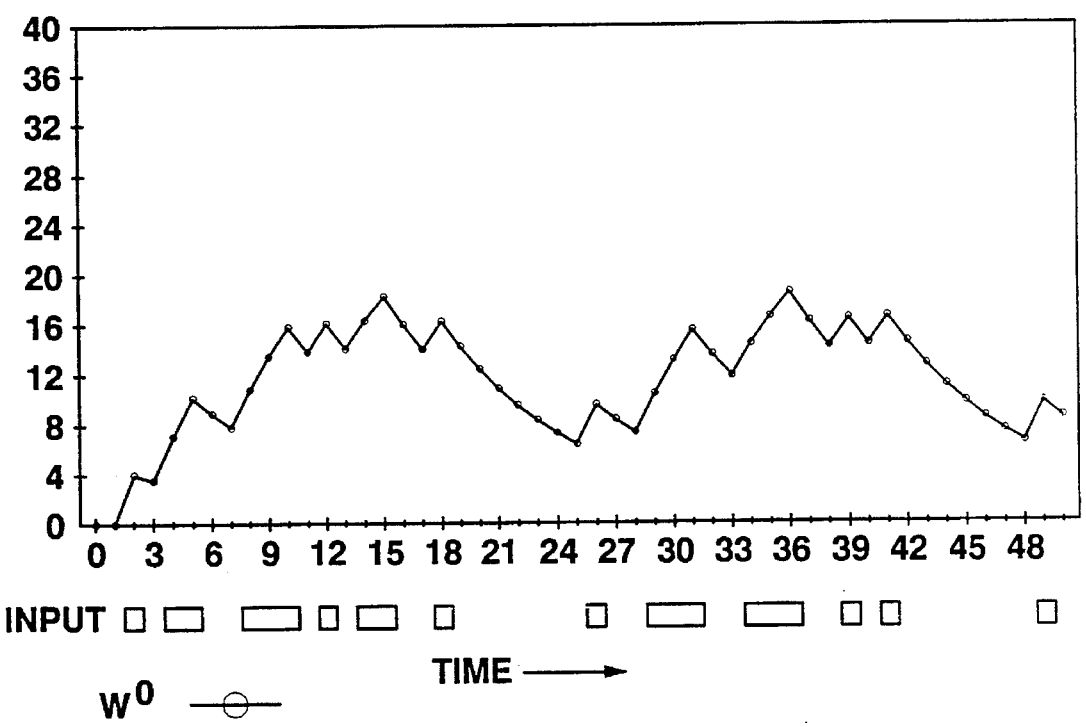
Fig_9B_
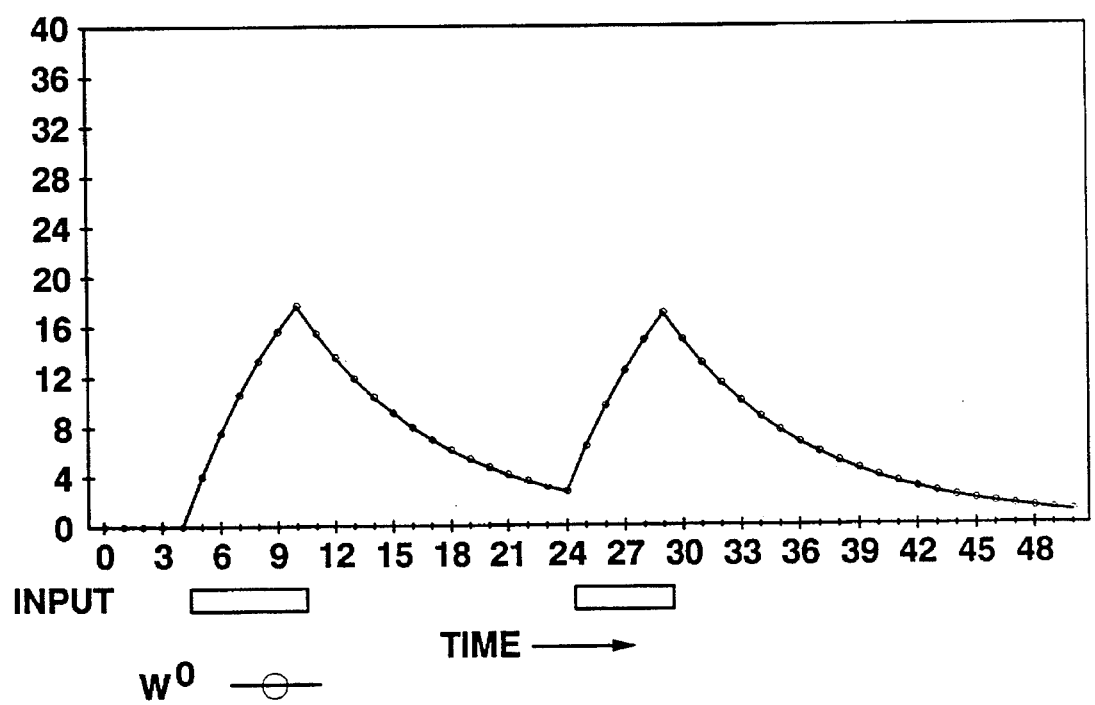
Fig_9C_

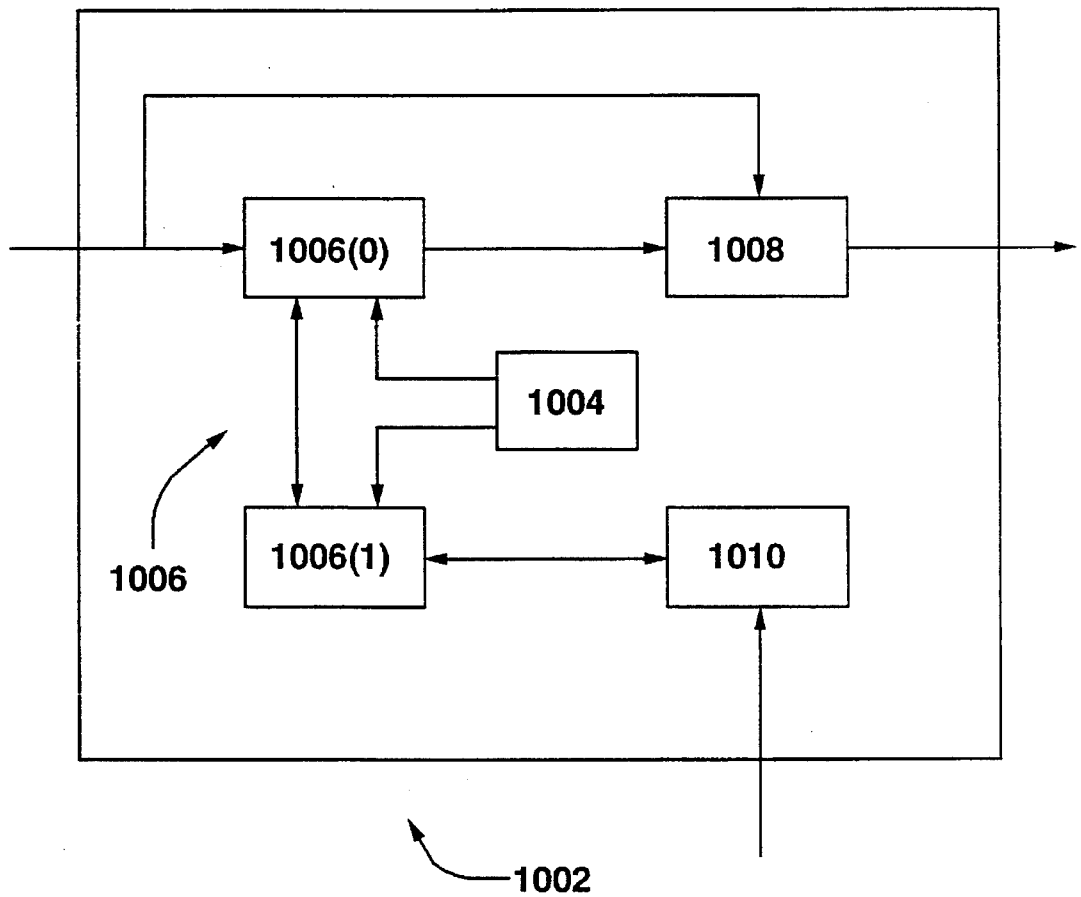
Fig_10_

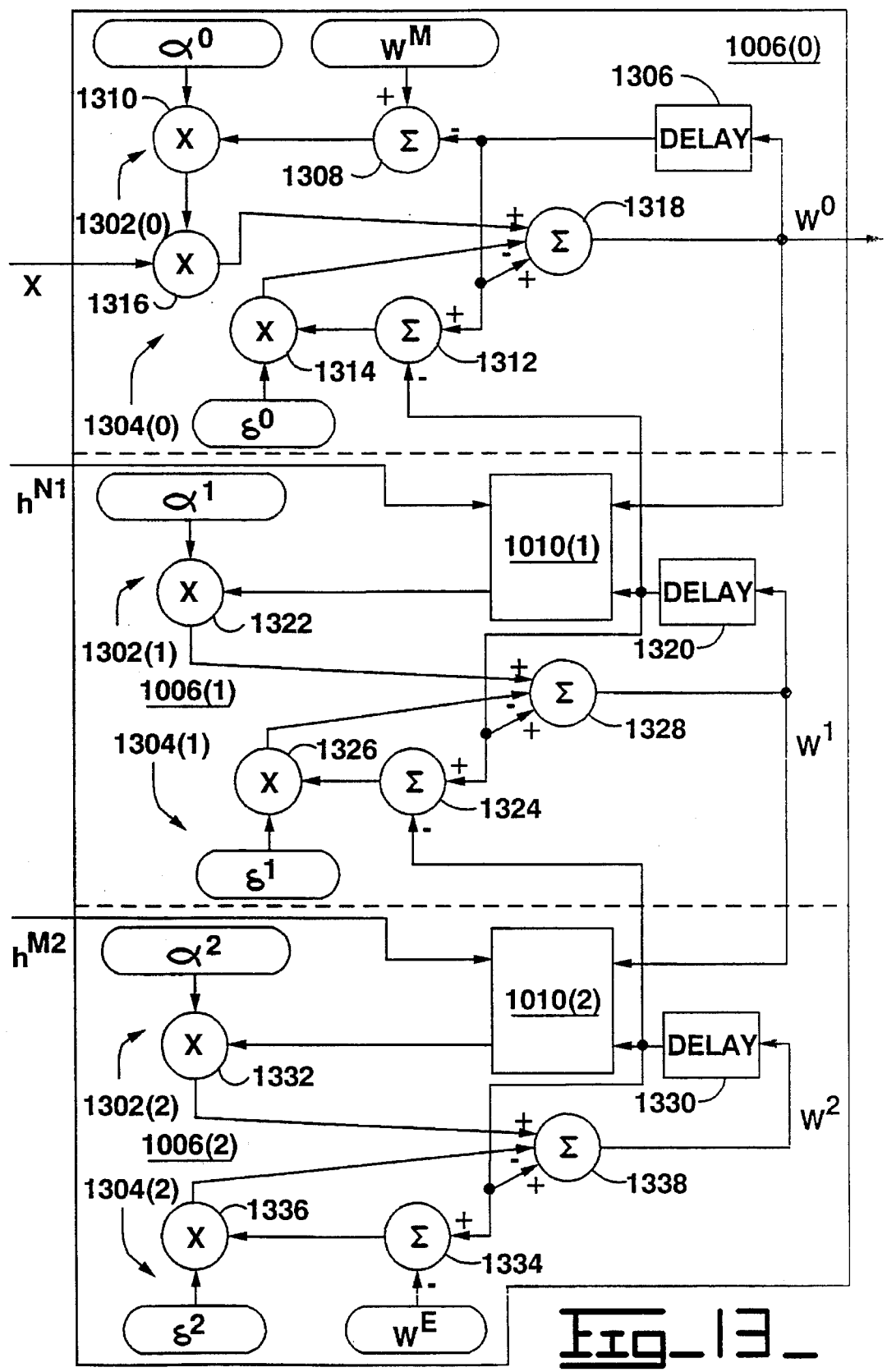
Fig_13_

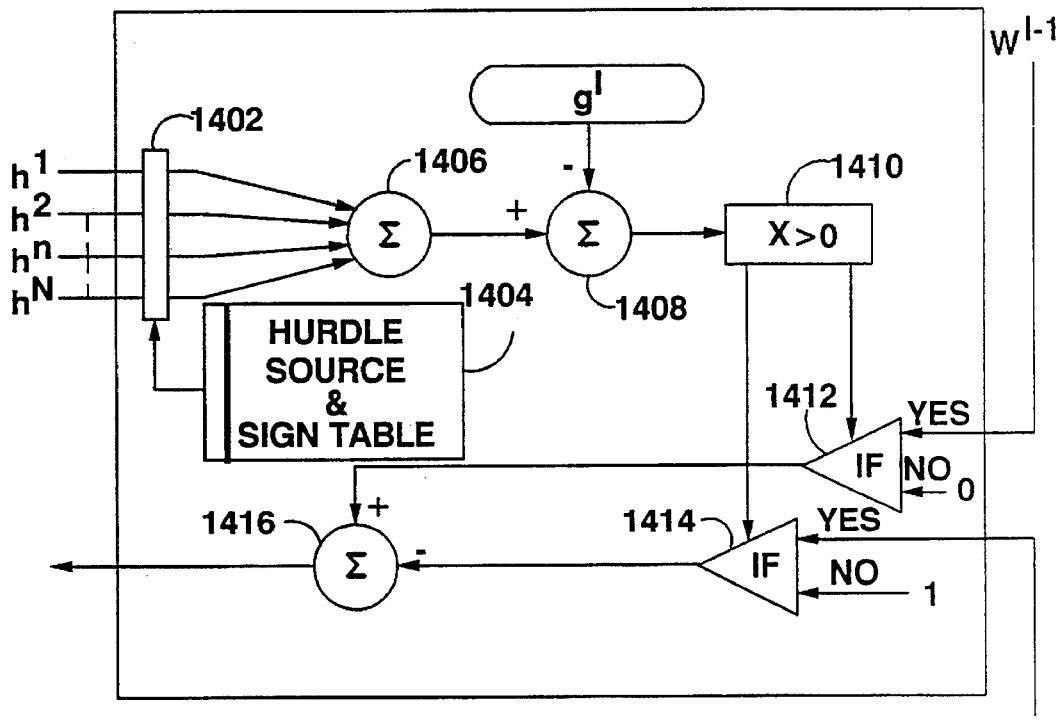
Fig_14_
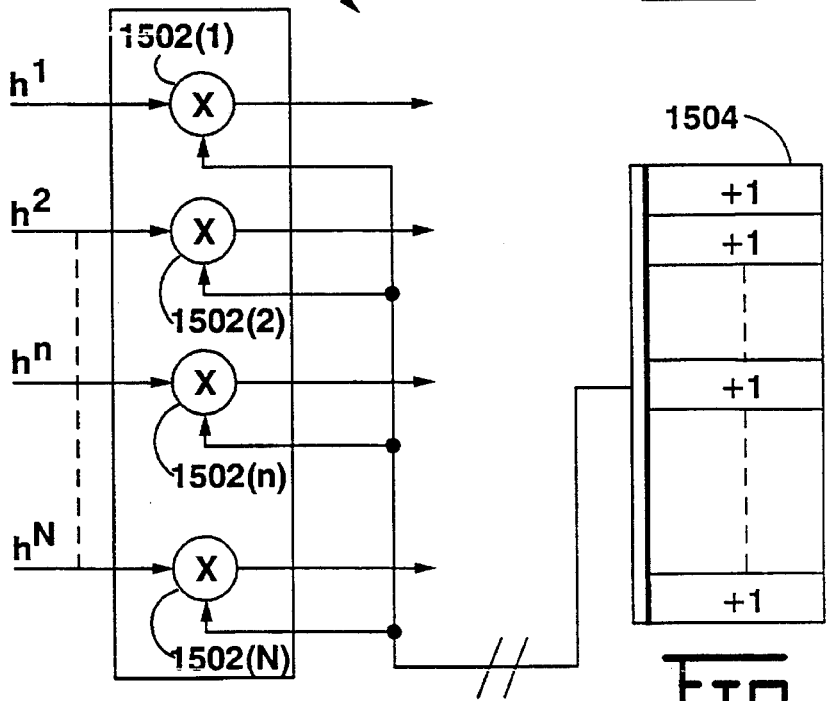
Fig_15_

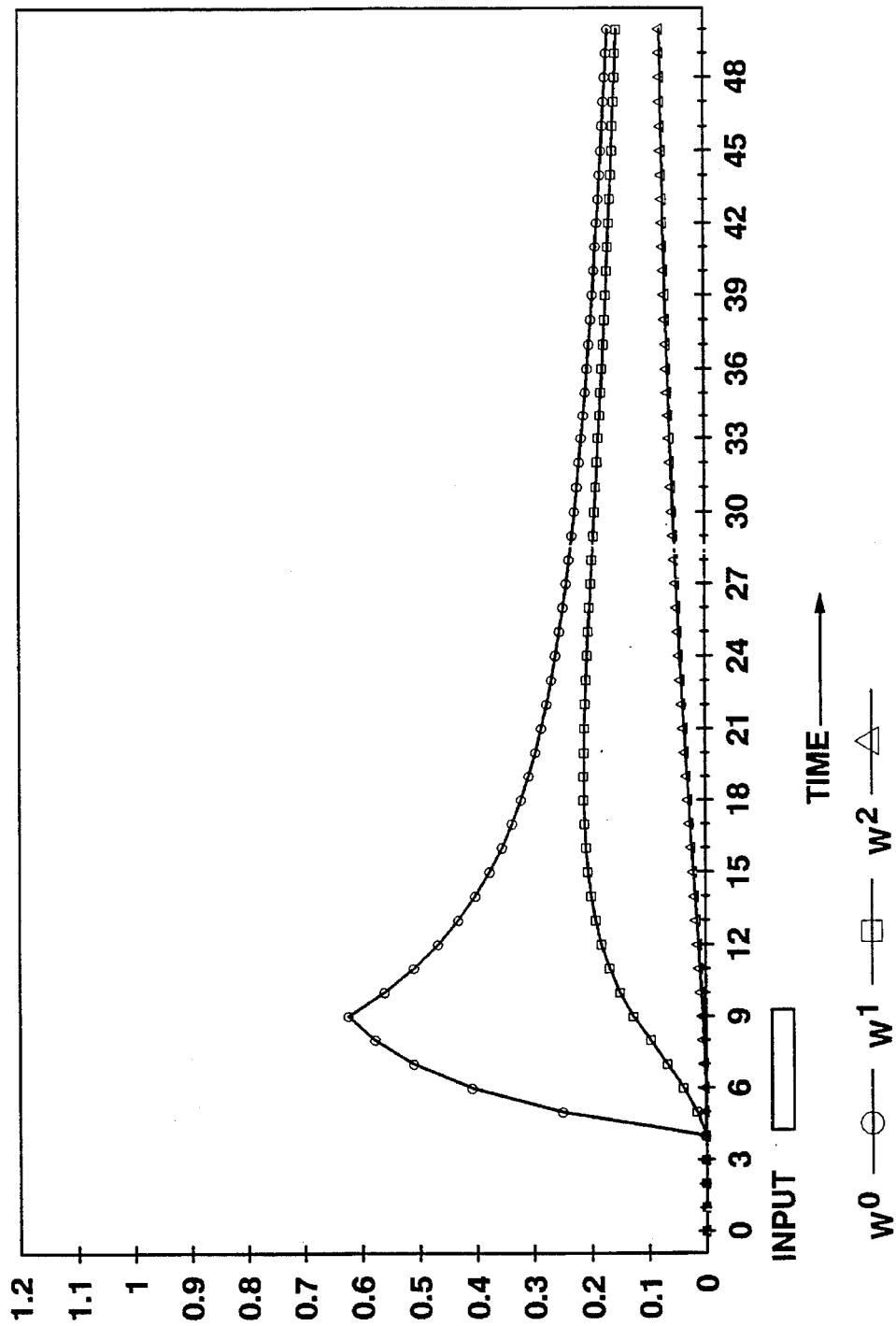

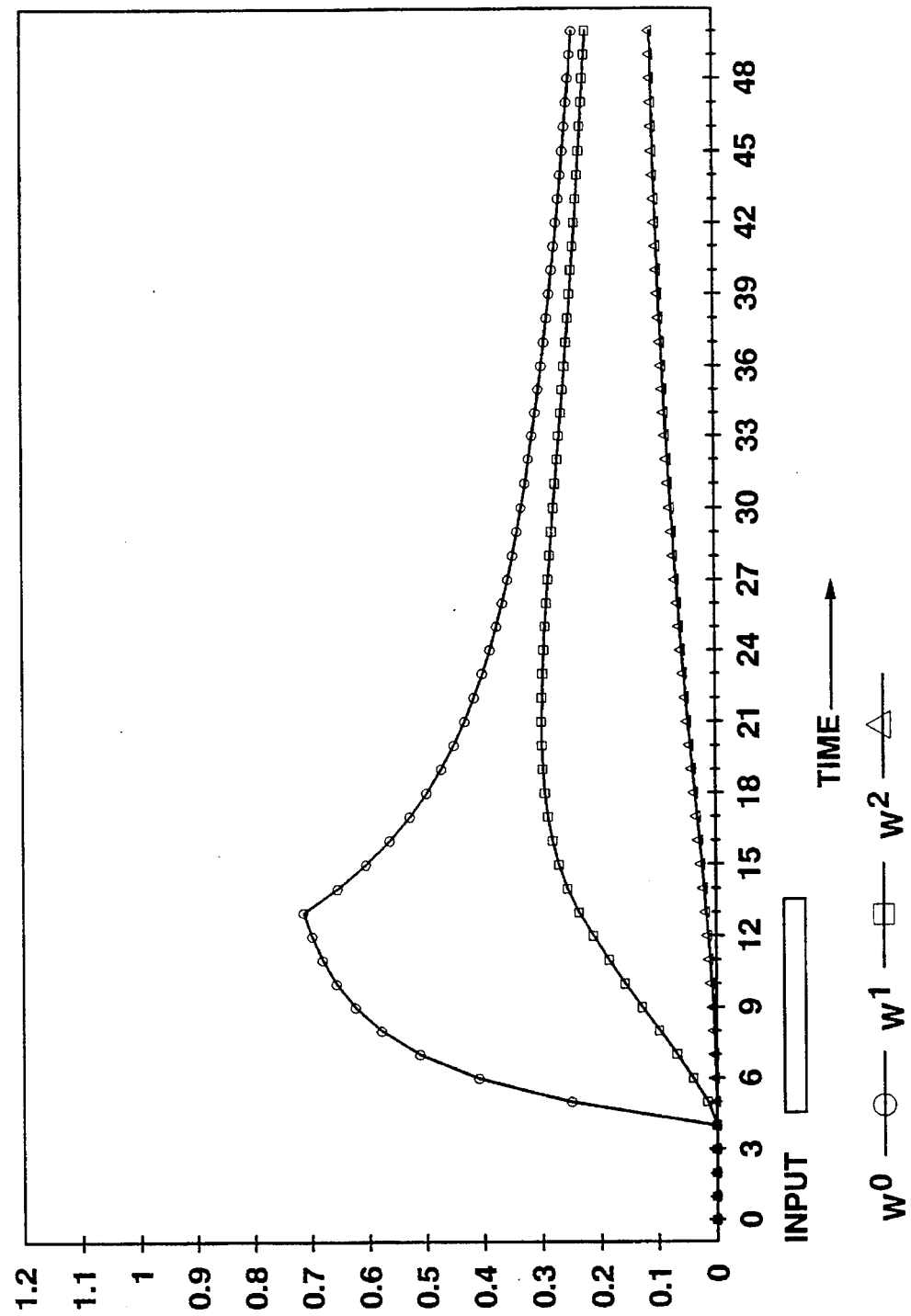

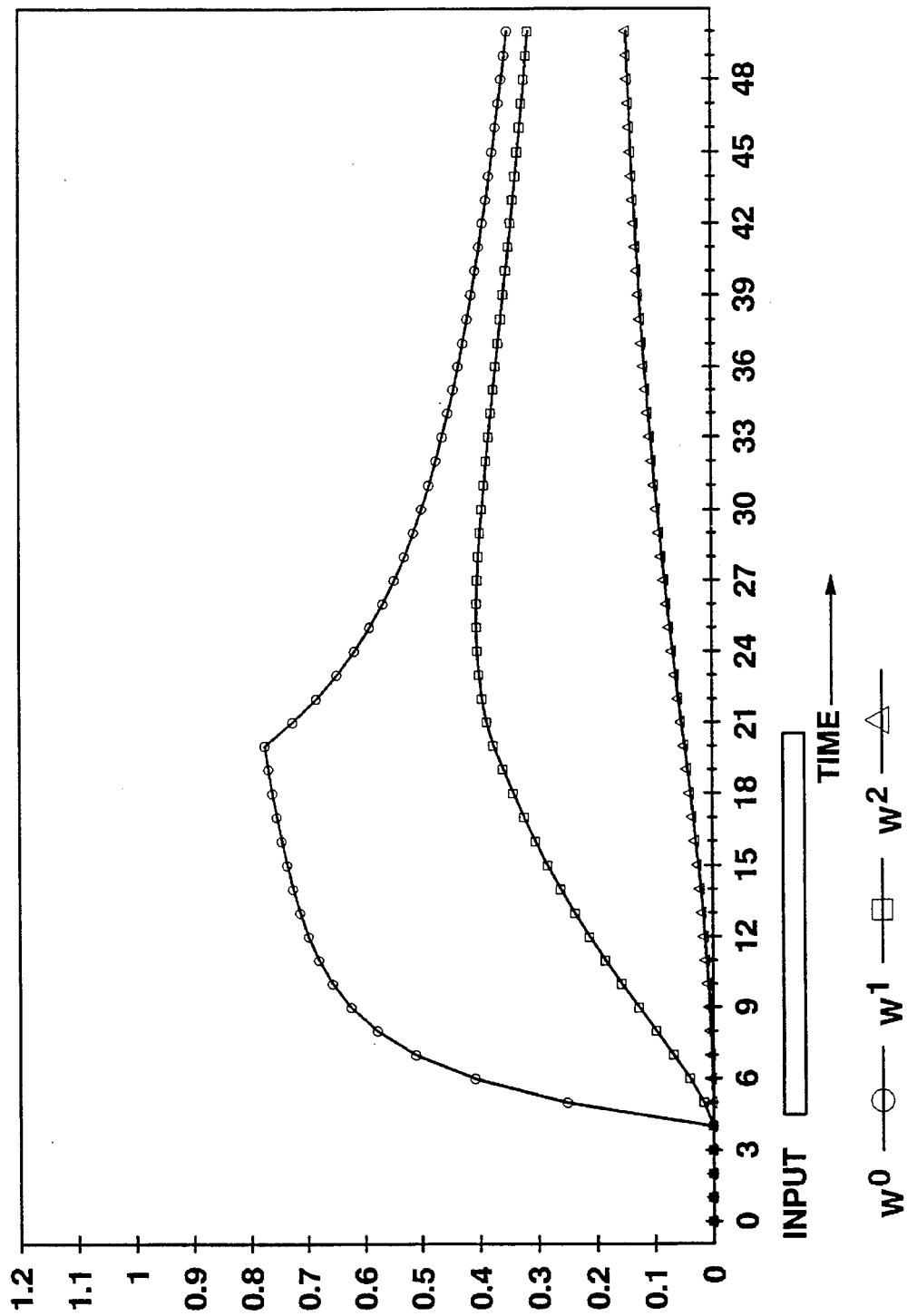

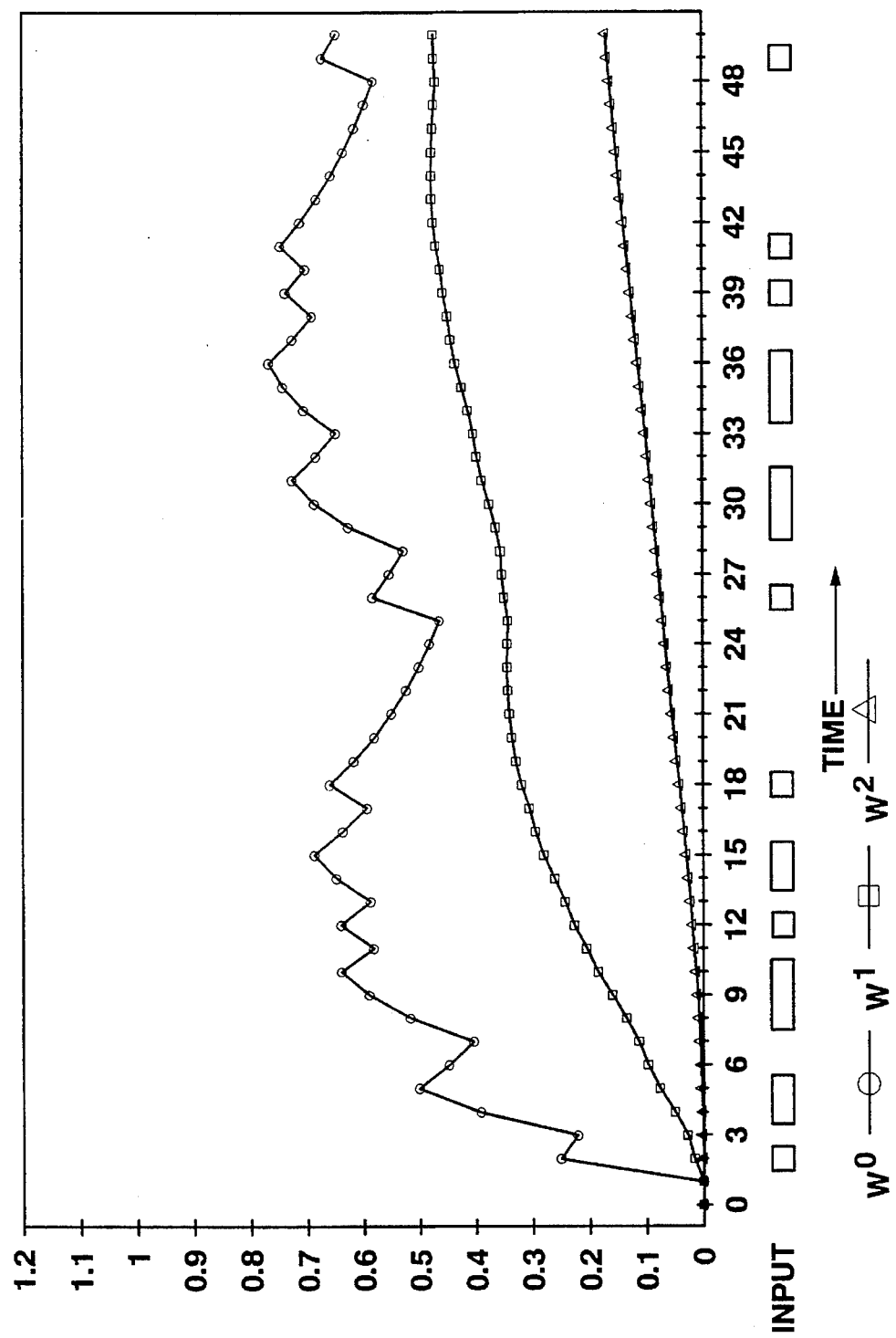
Fig_16E

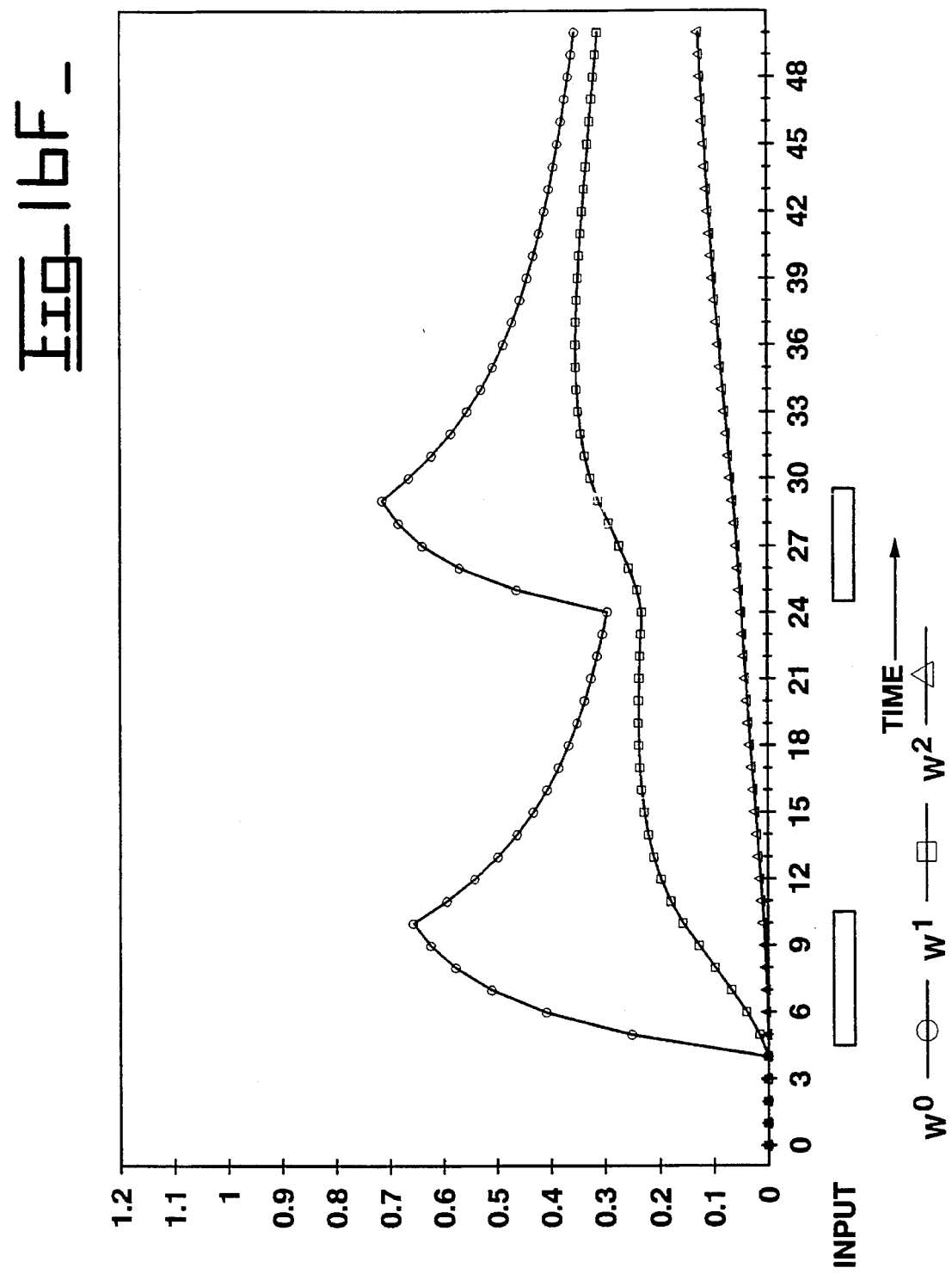

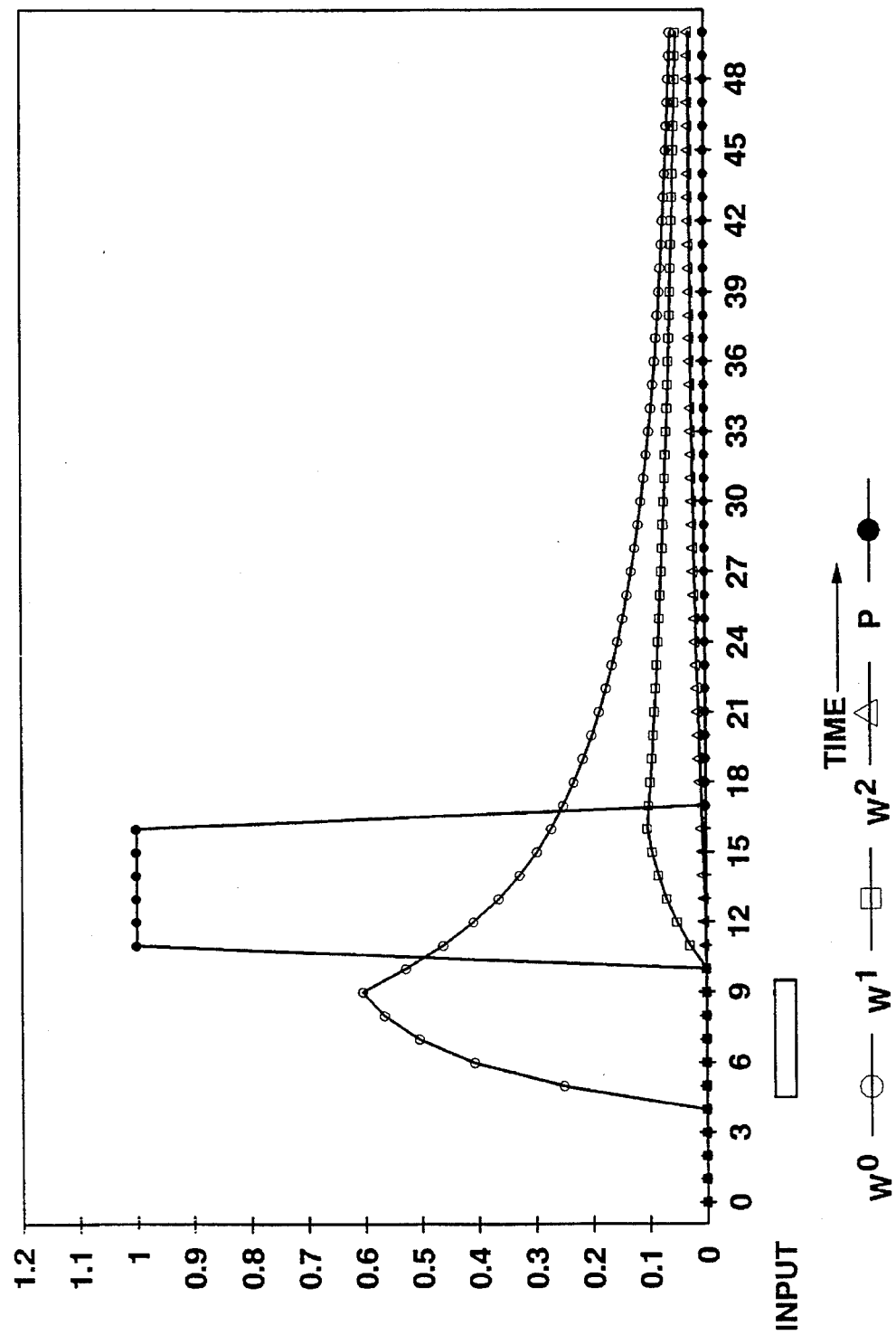

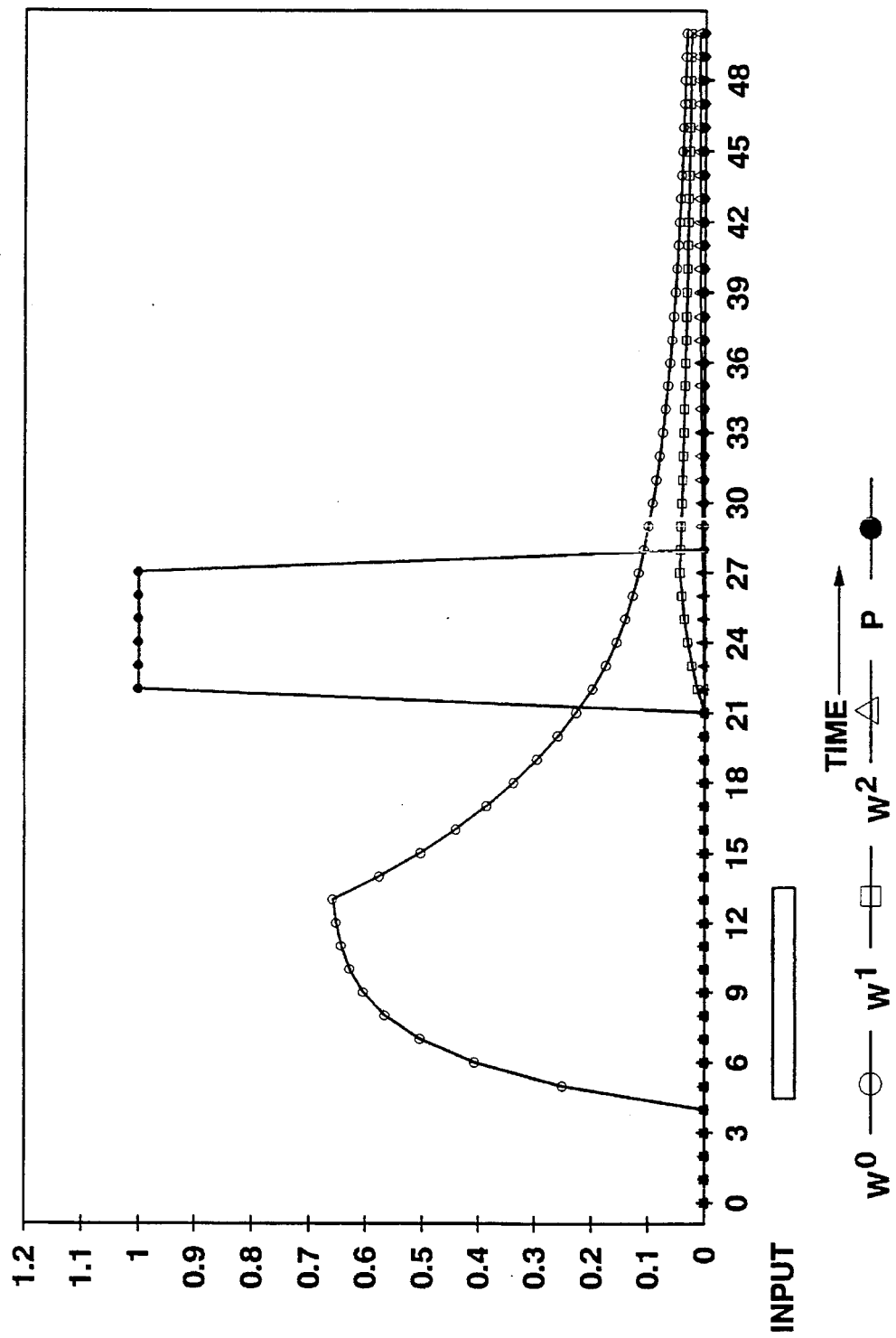

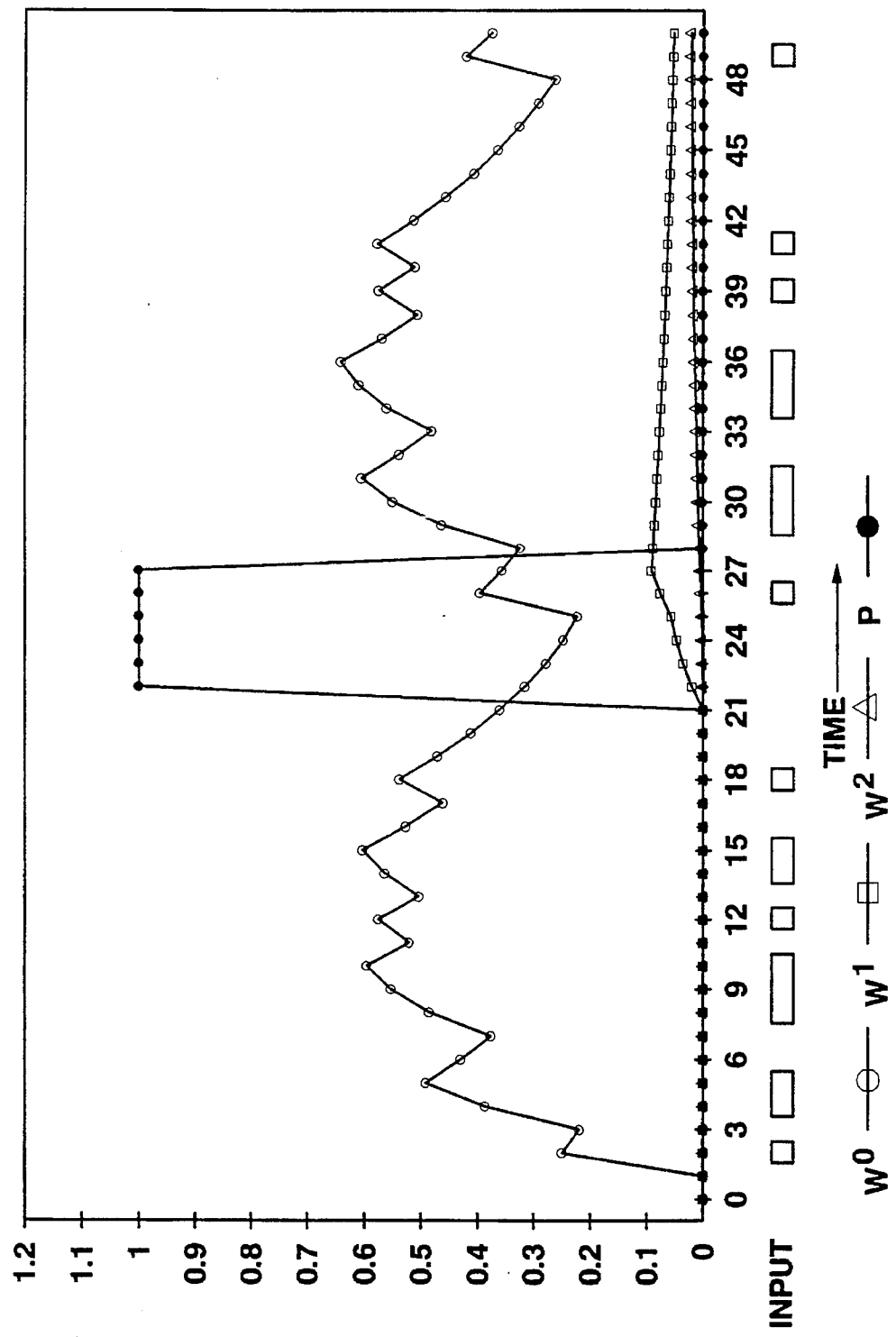

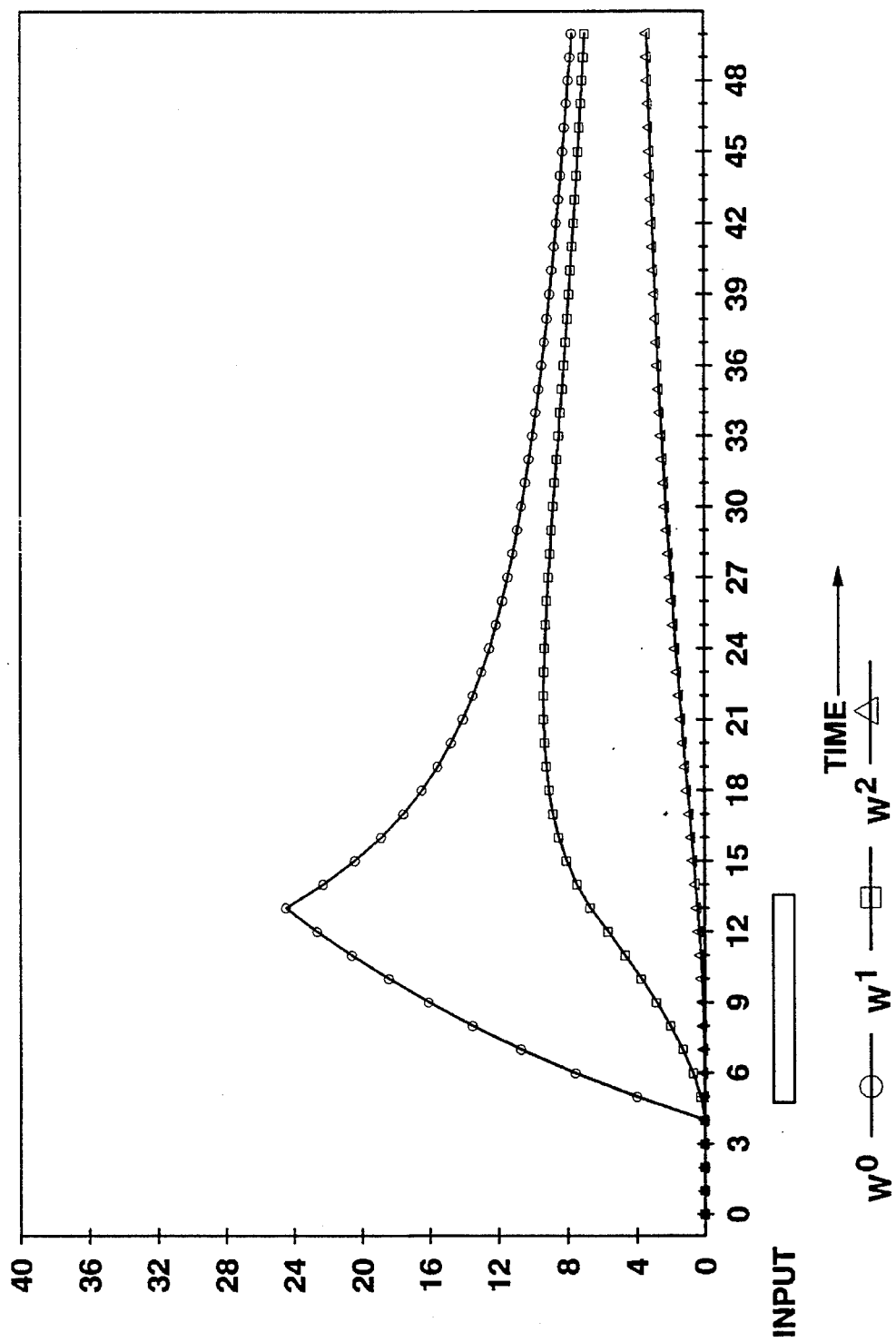

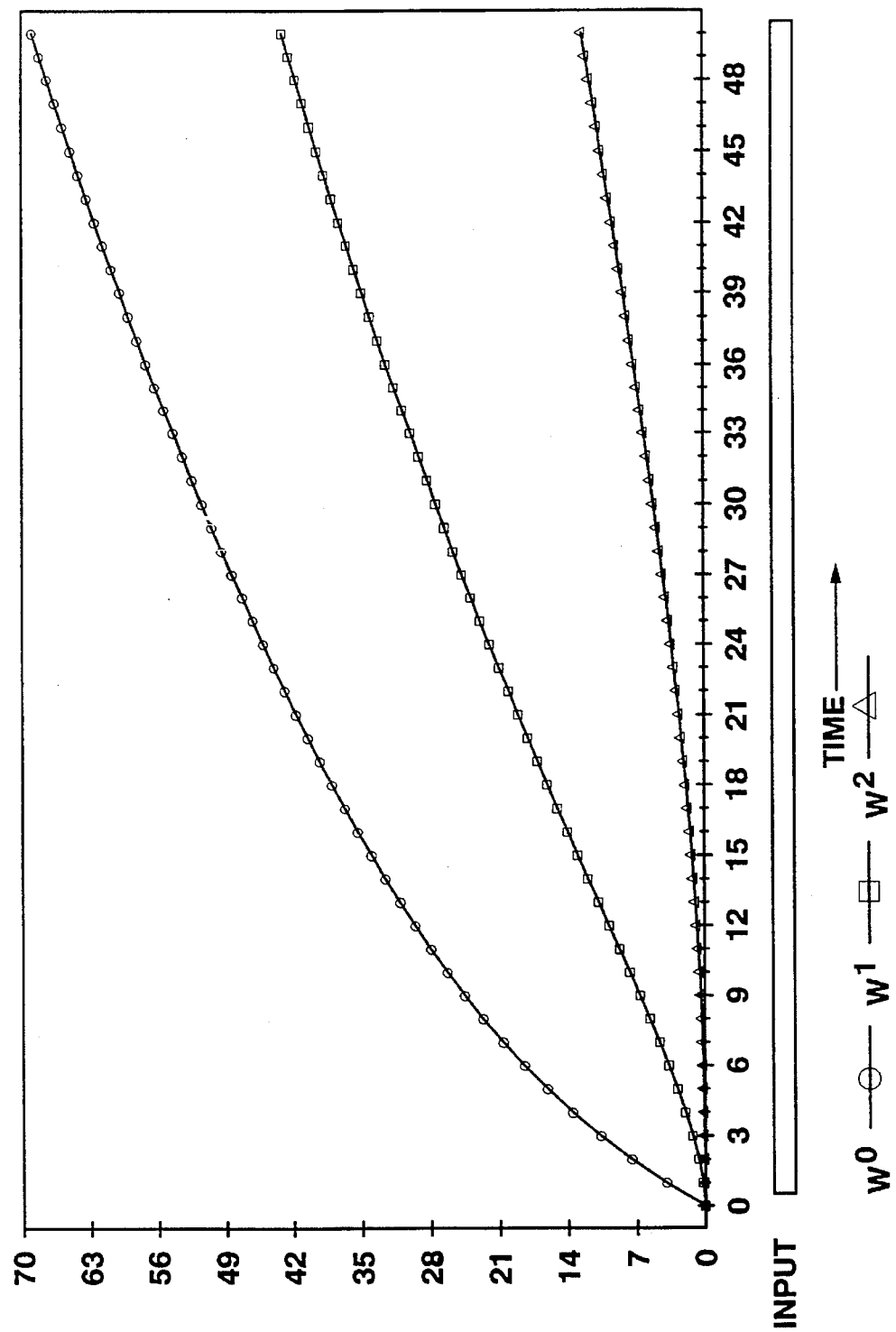

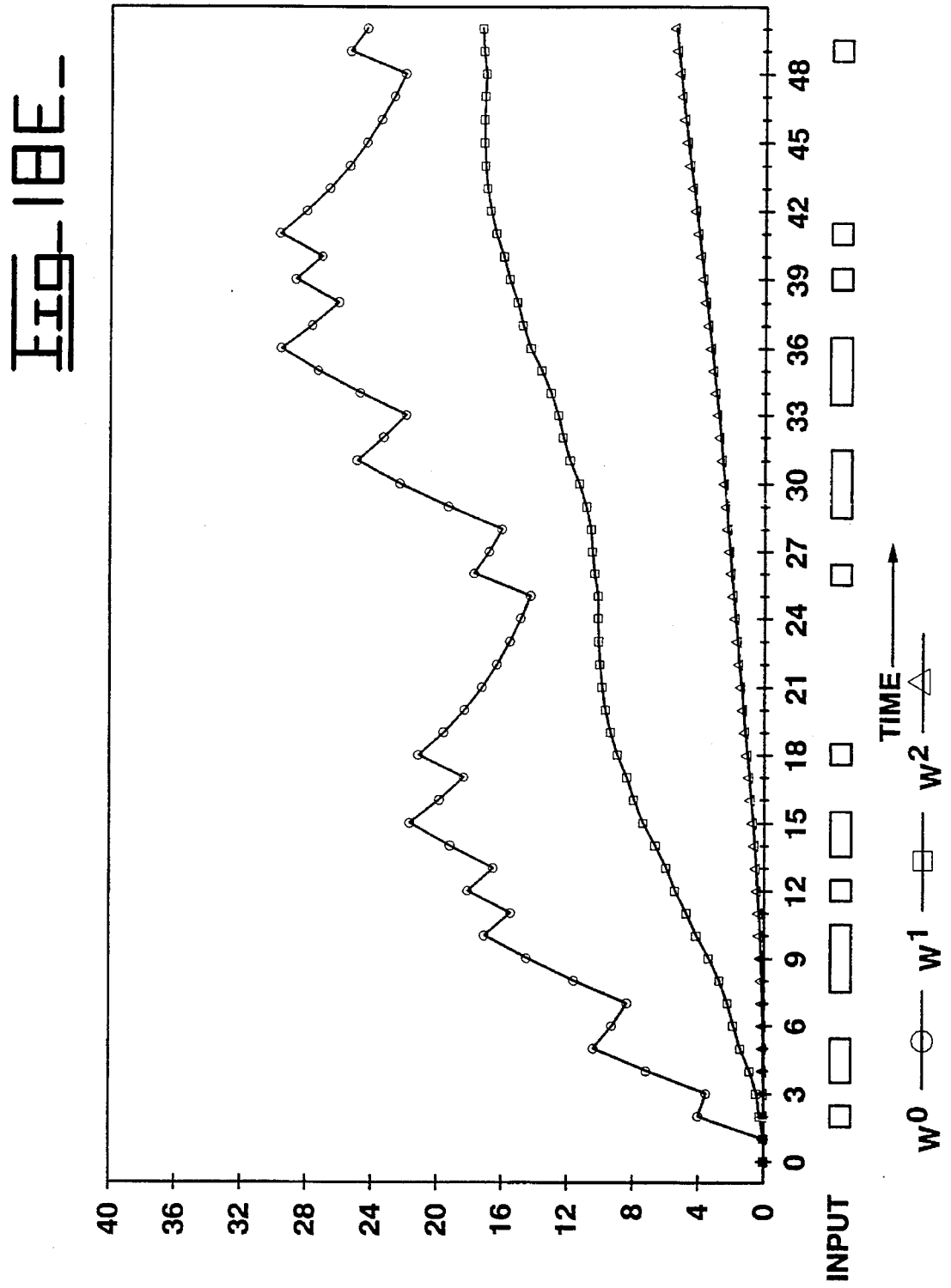

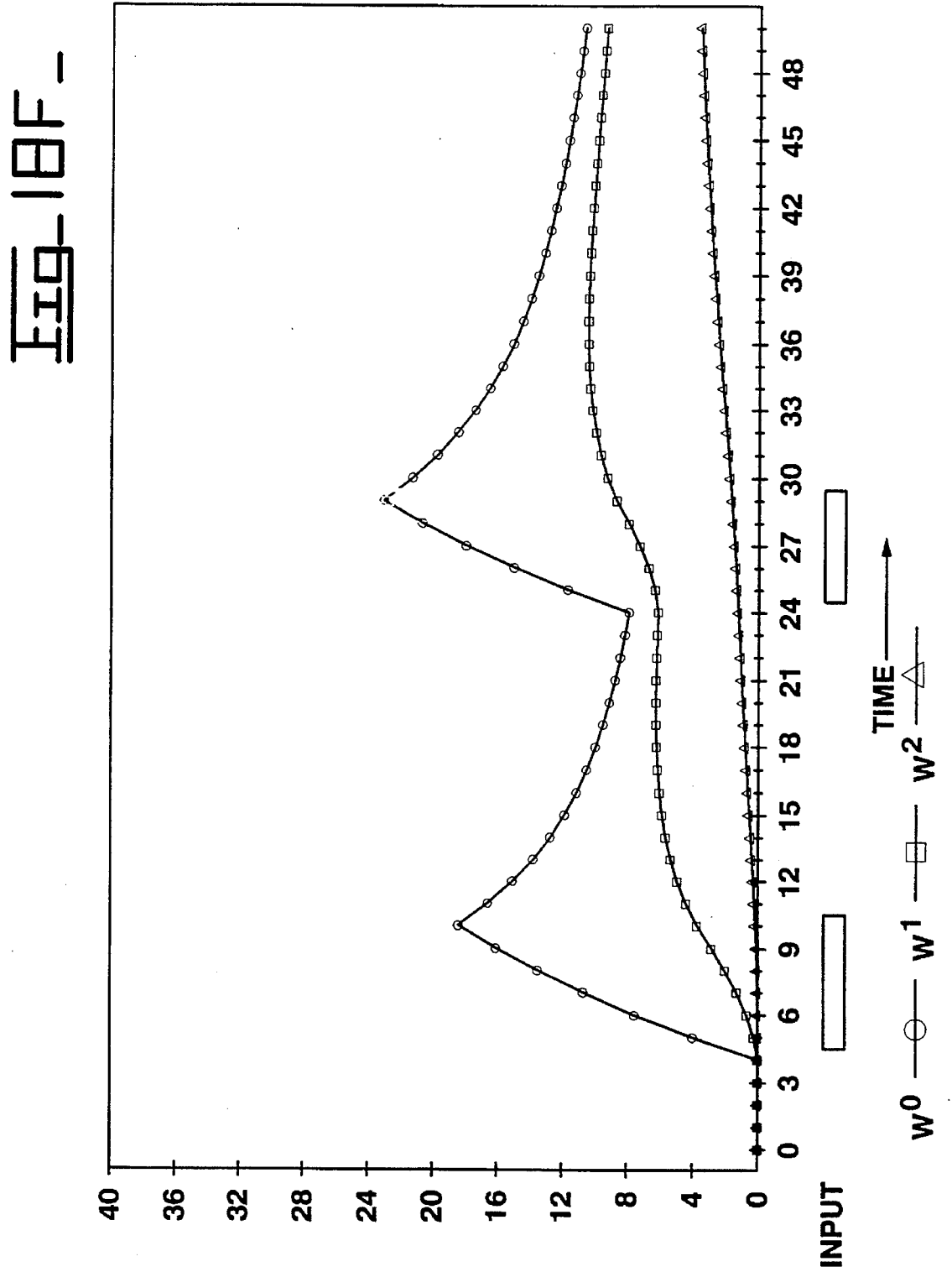
Fig_18F

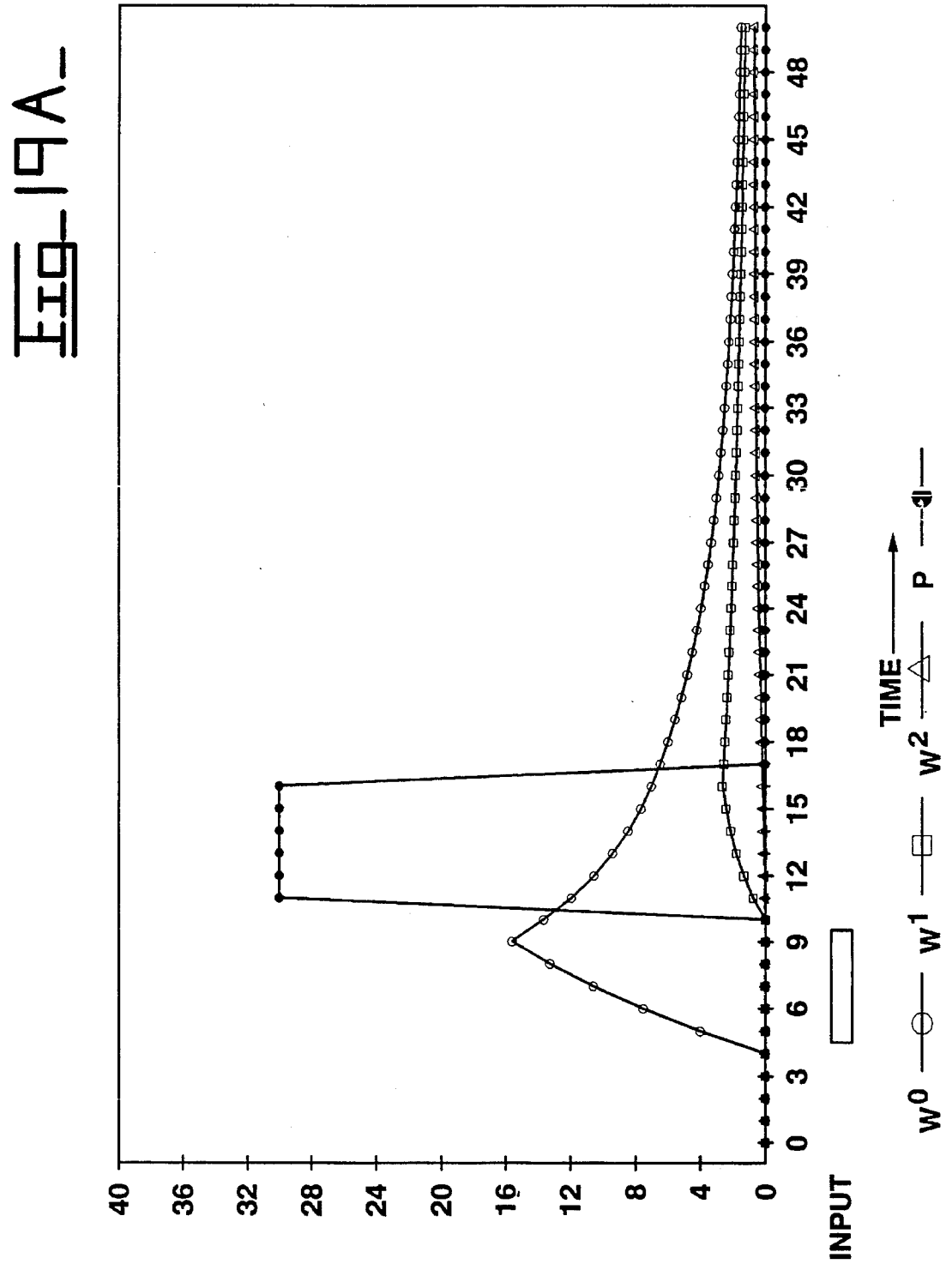

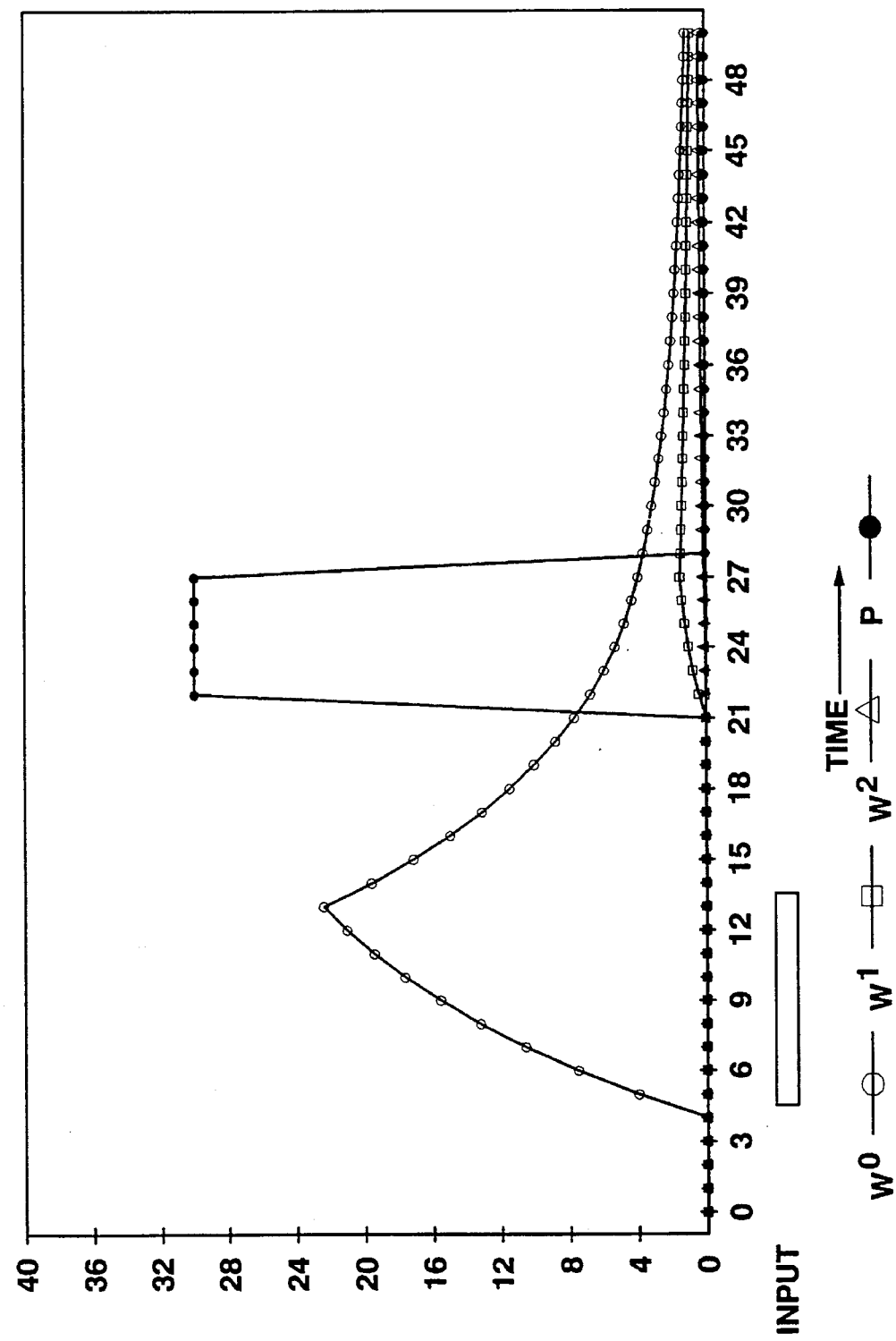

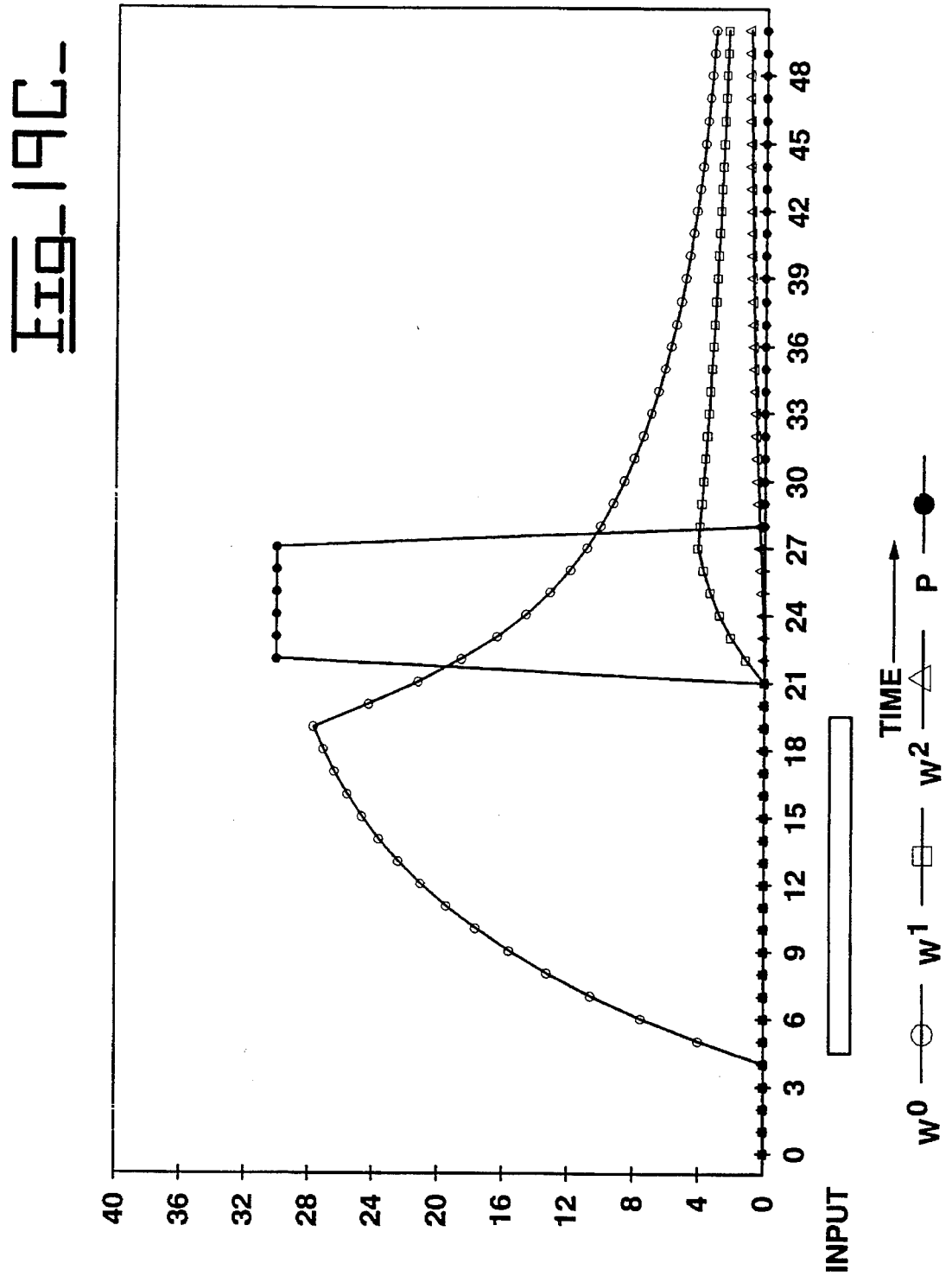
Fig_19C

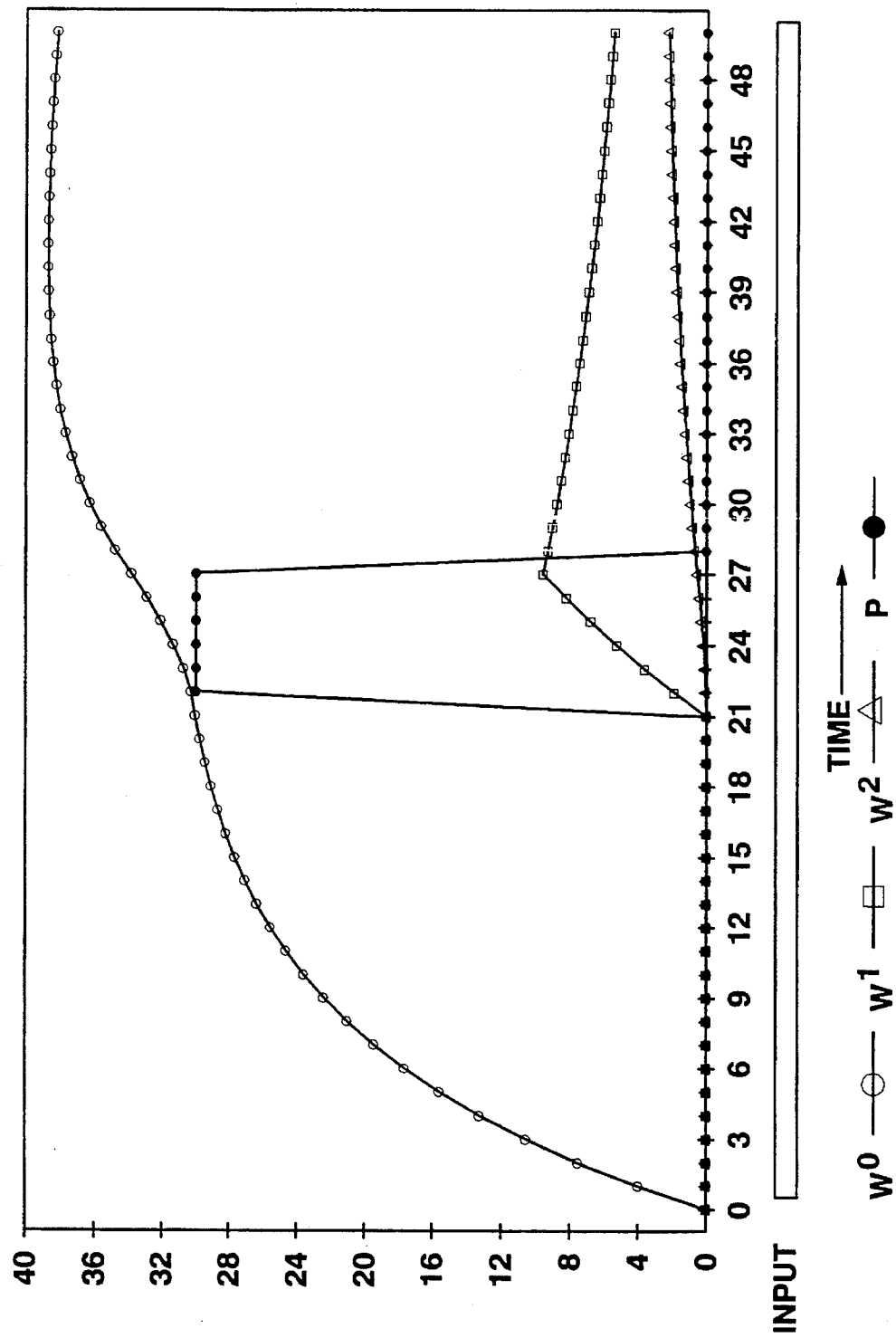

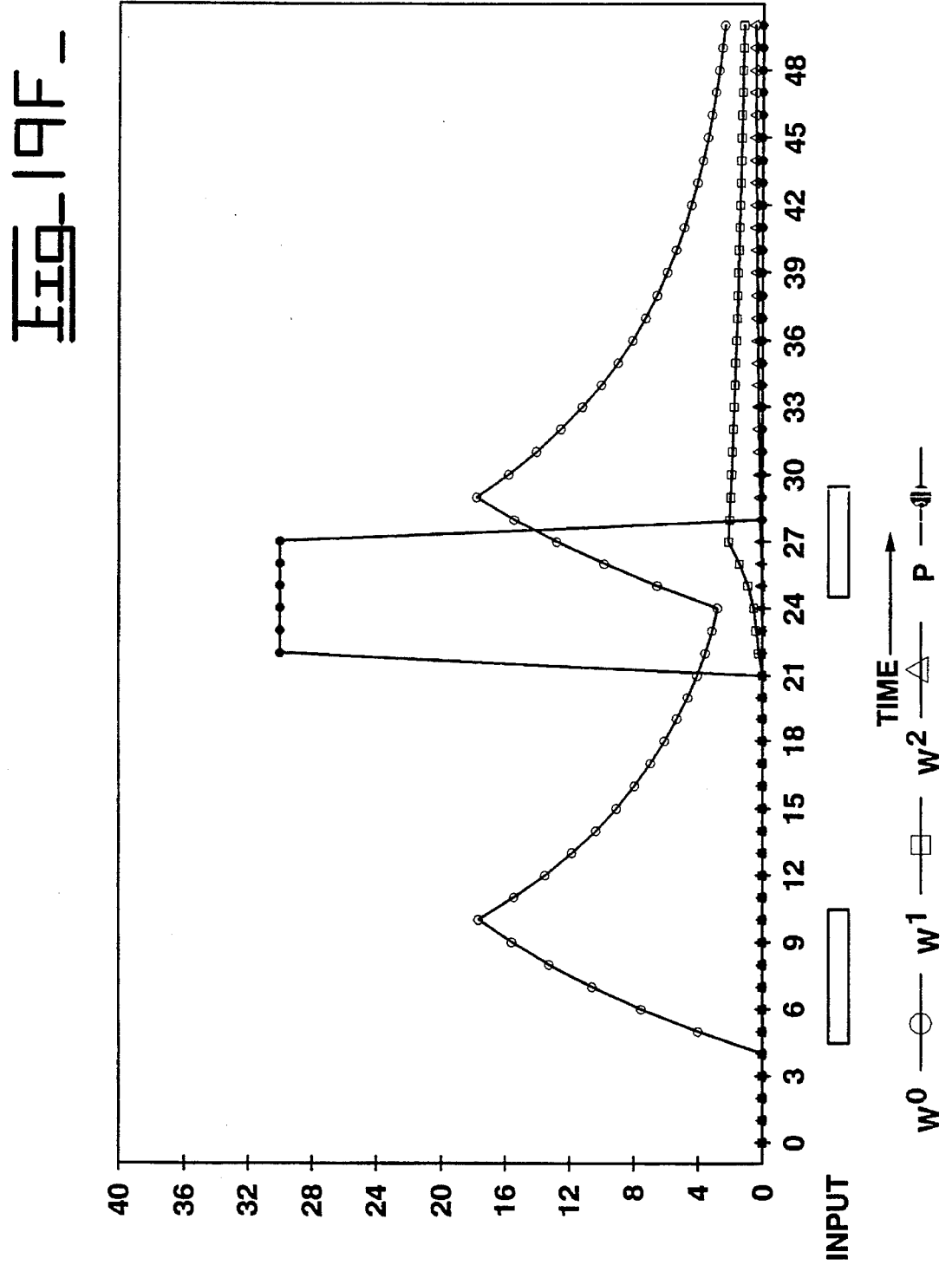
Fig_19F

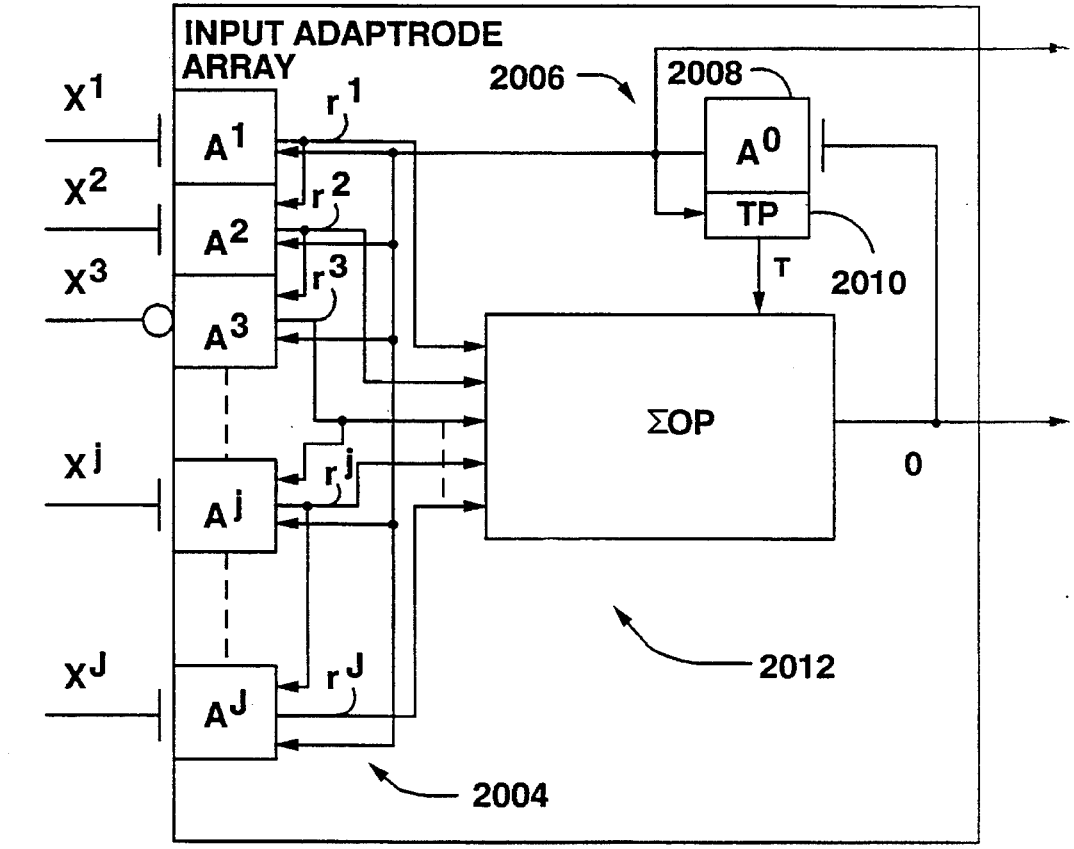

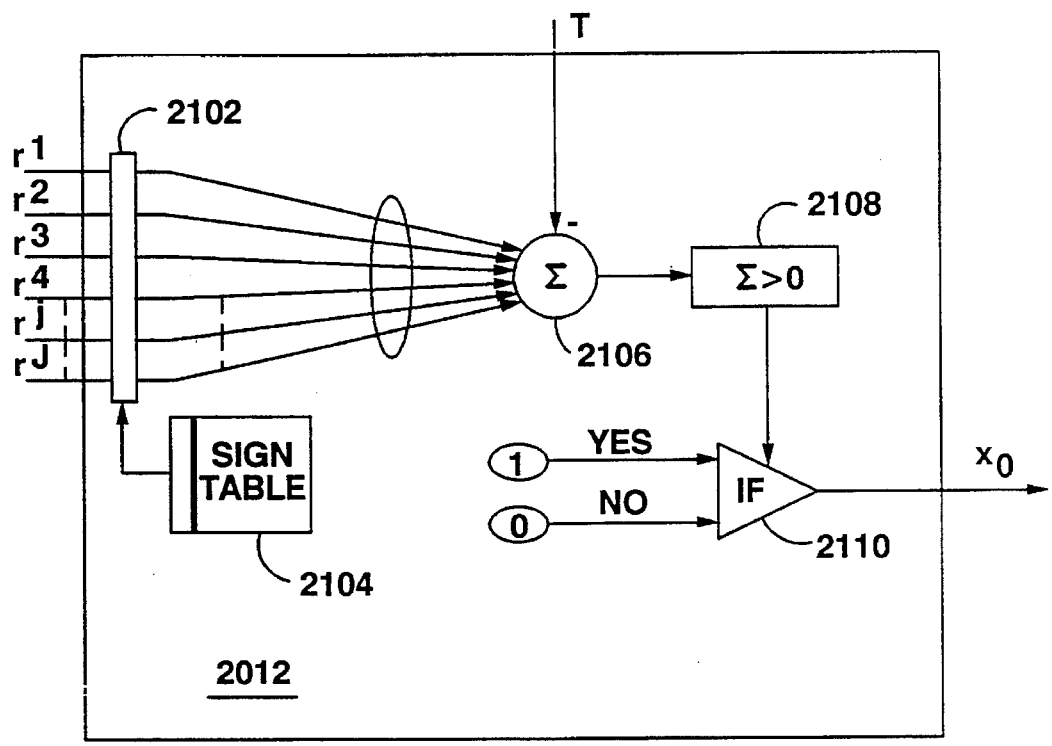
Fig_21_
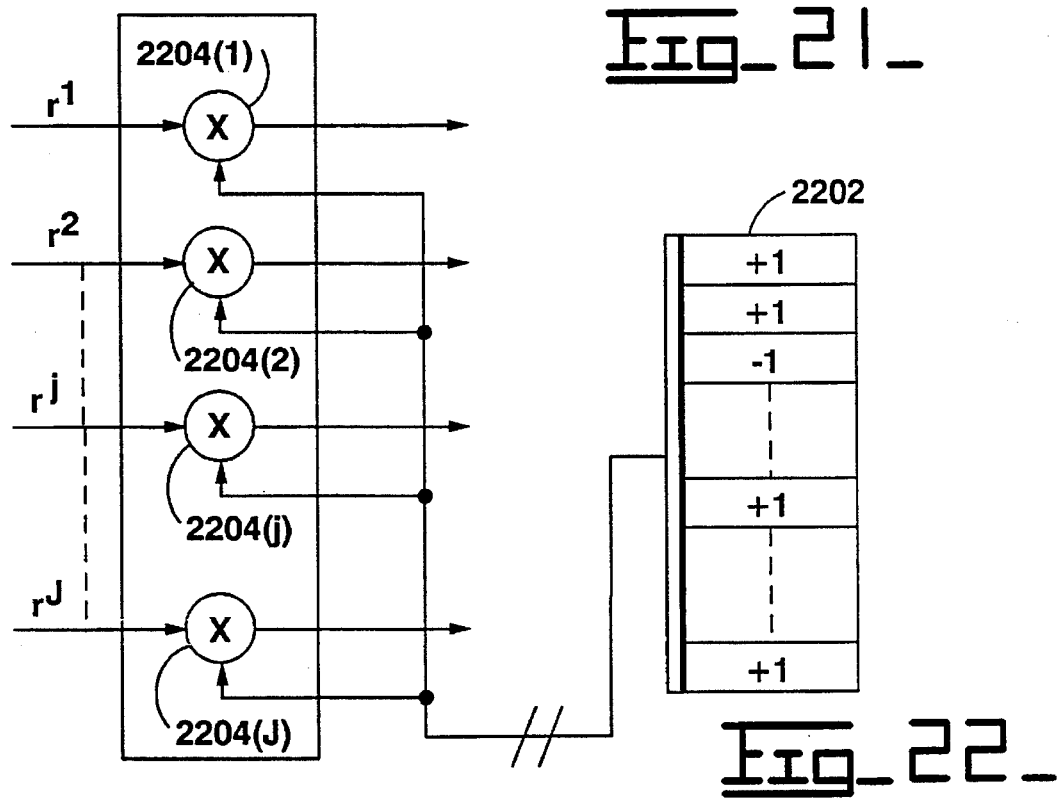
Fig_22_

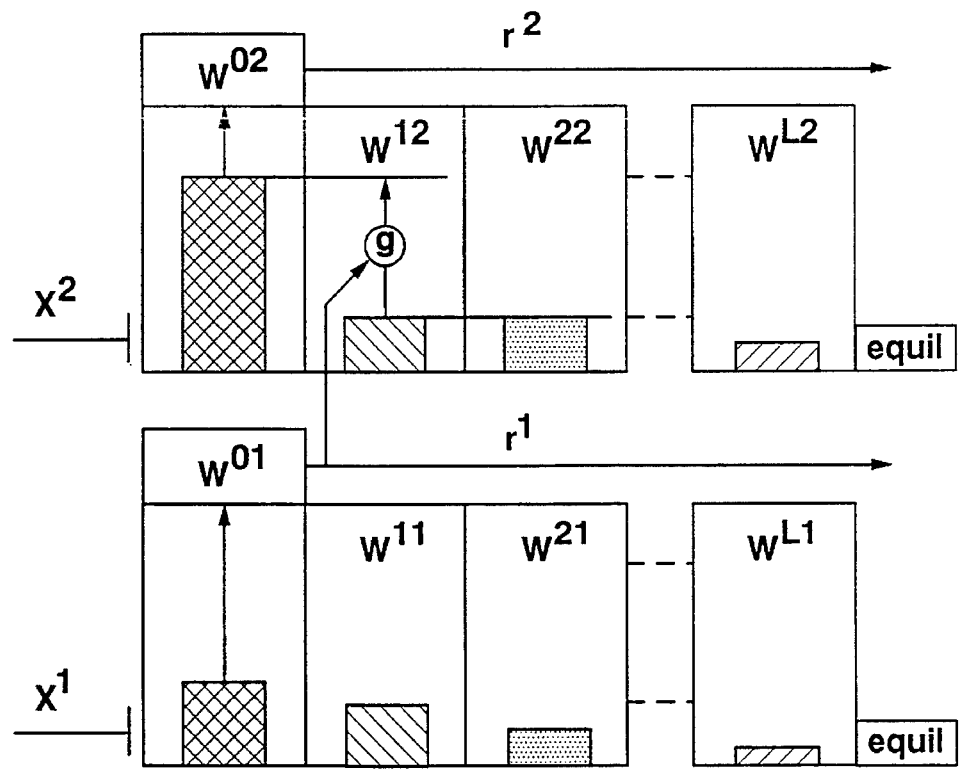
*Fig_24_*
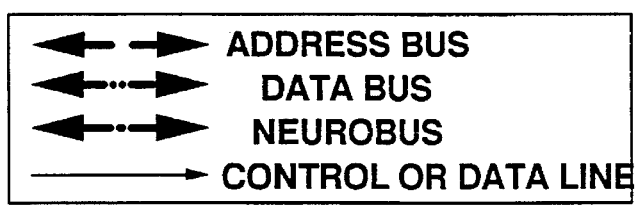
*Fig_25_*  *Fig_28_*
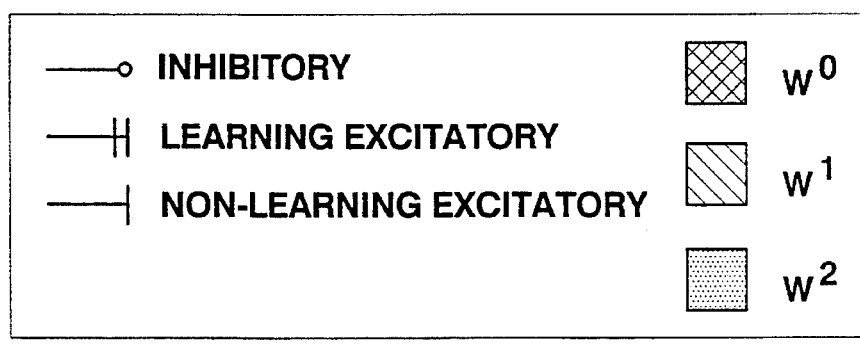

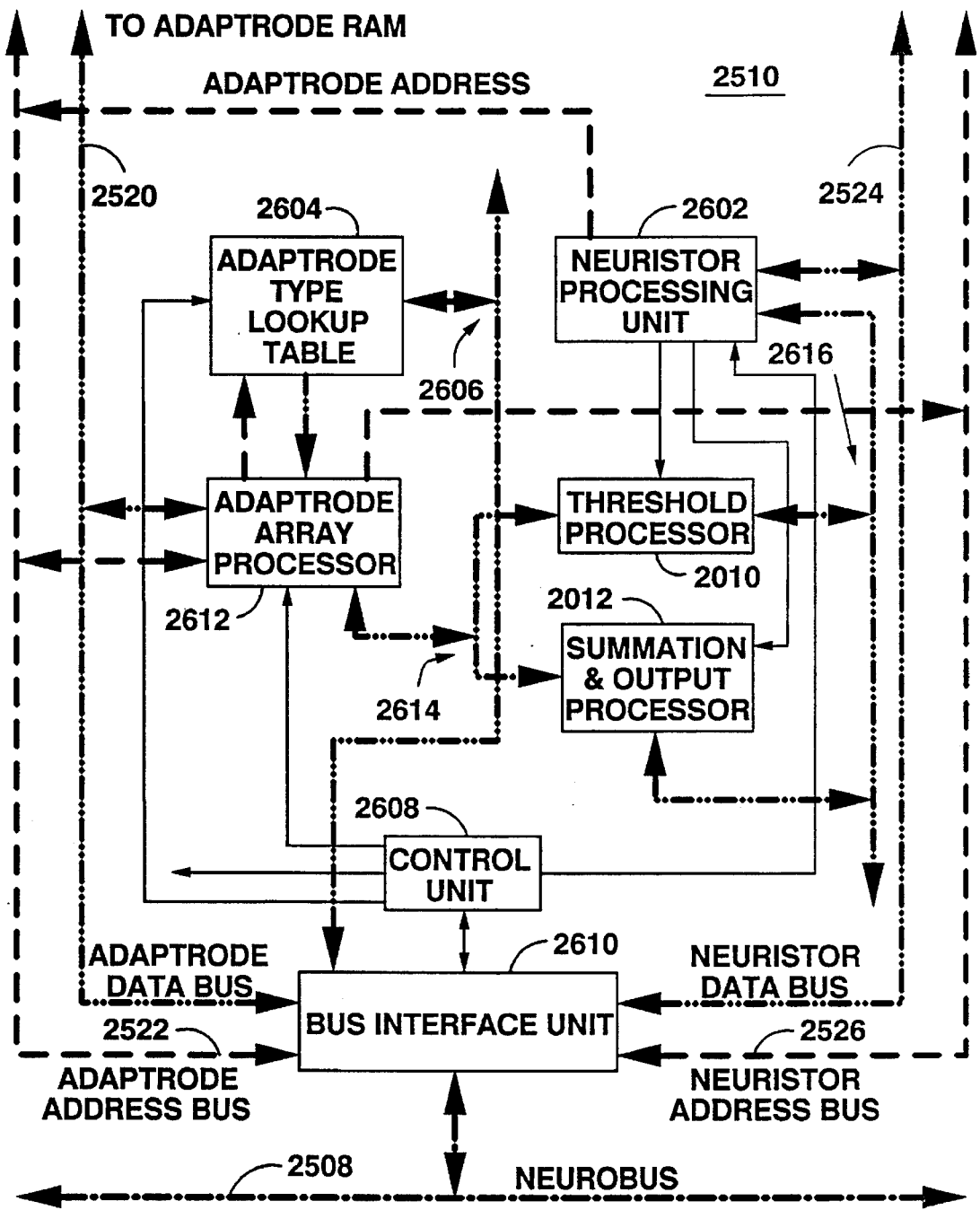
Fig_26_

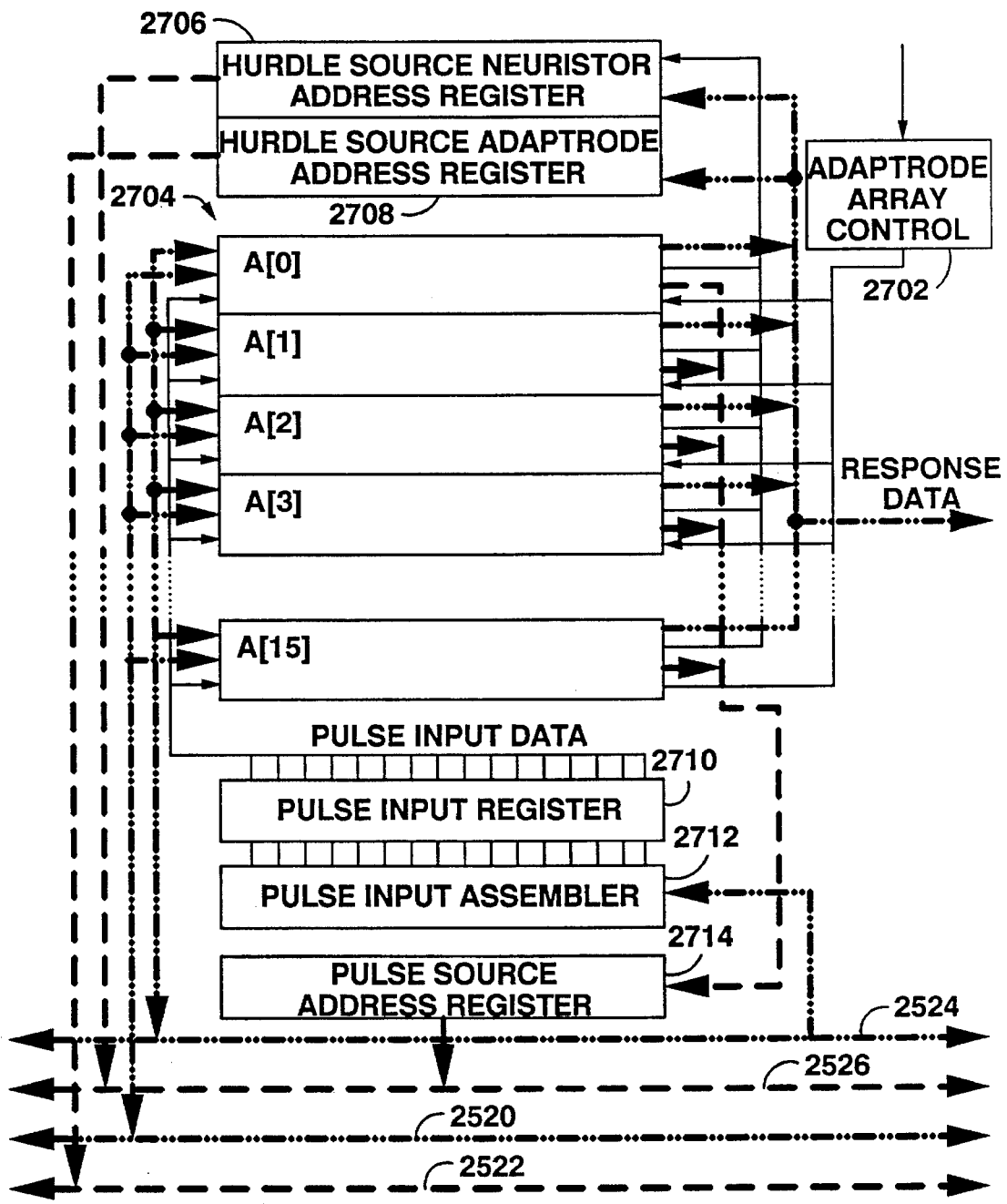
Fig_27_

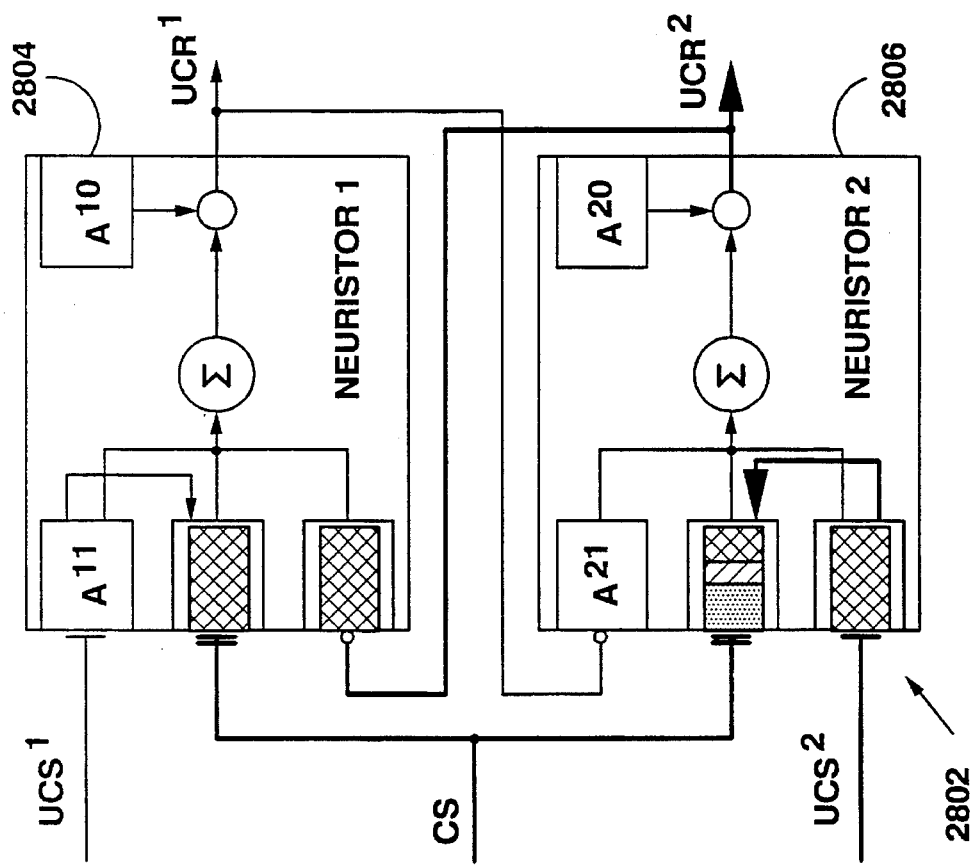
Fig_28B_
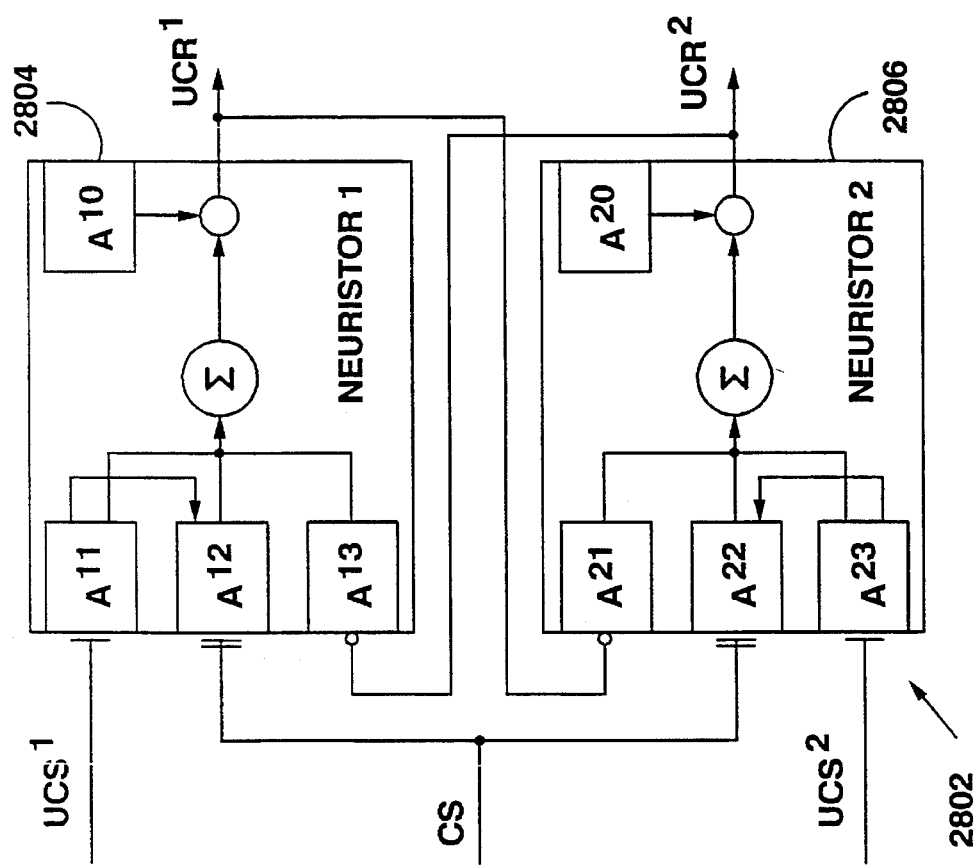
Fig_28A_

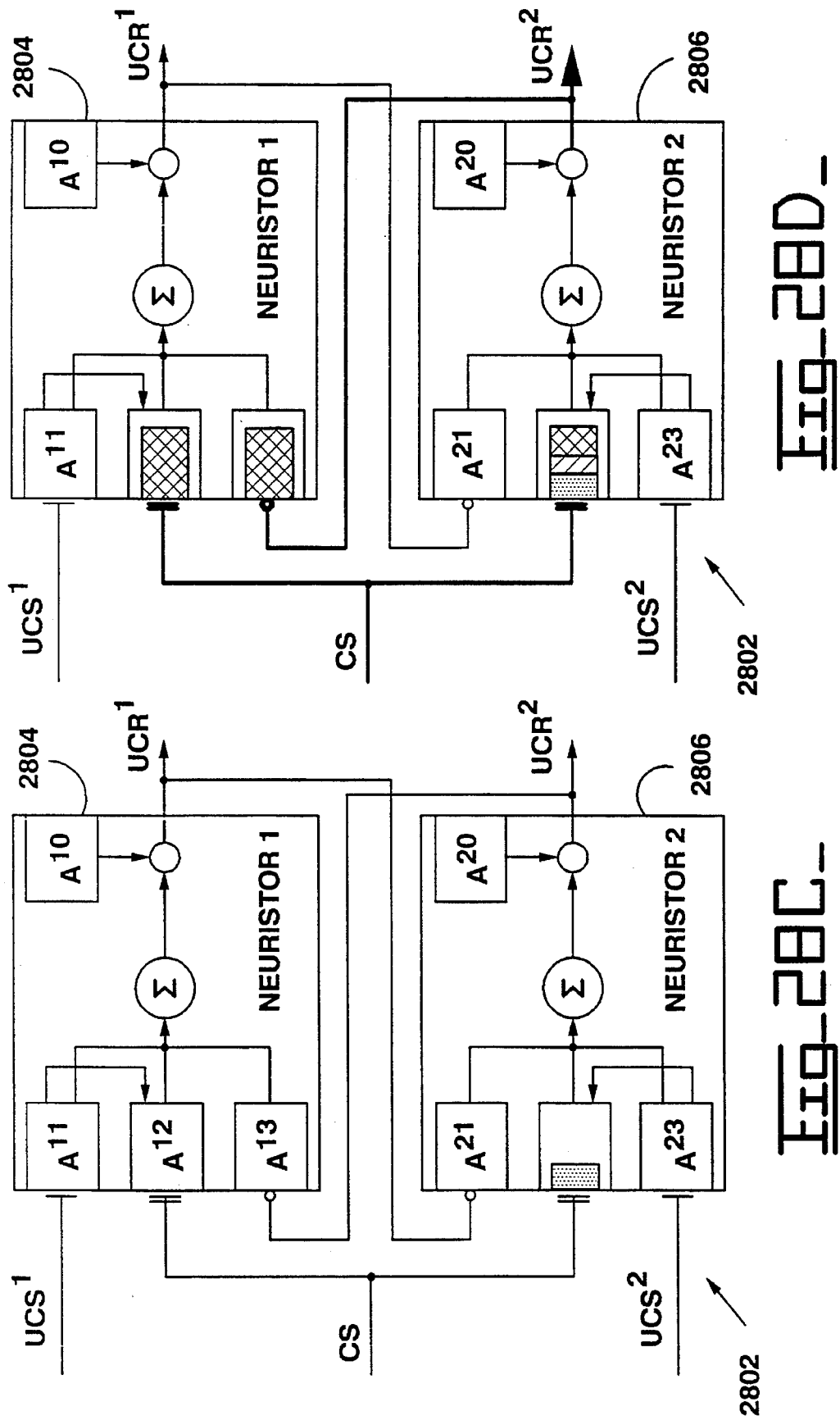

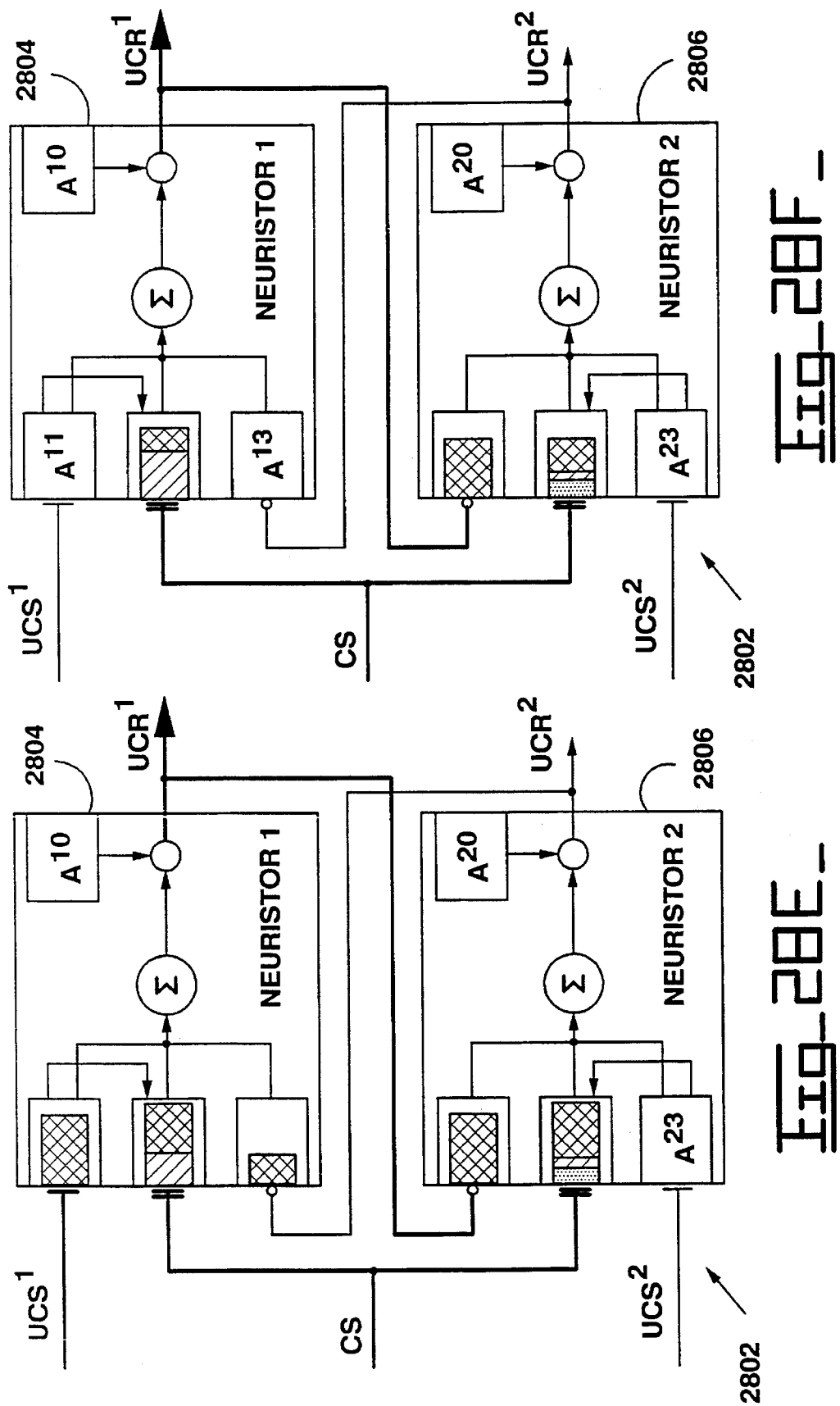

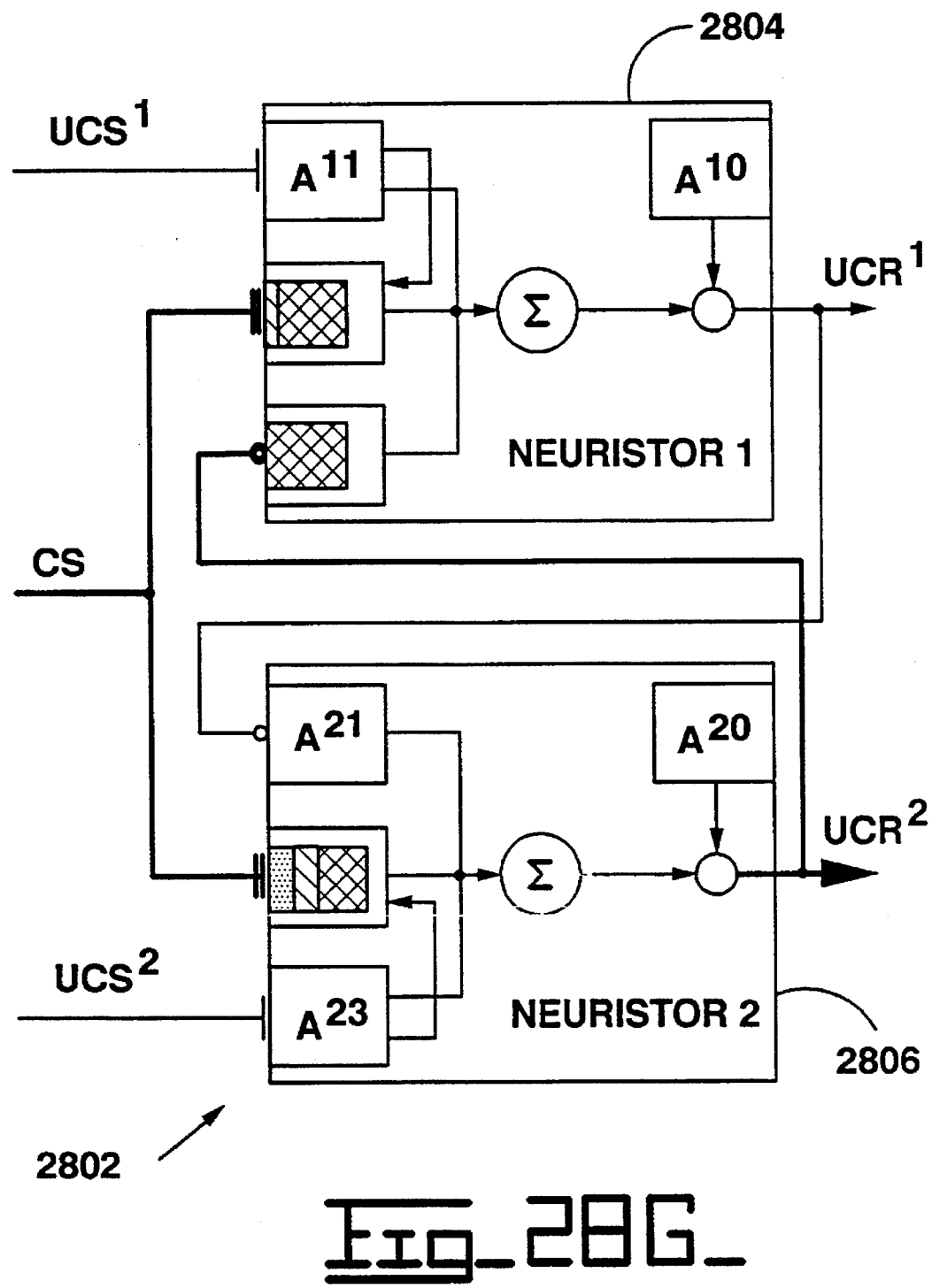
Fig_28G

PROCESSOR AND PROCESSING ELEMENT FOR USE IN A NEURAL NETWORK

This is a file wrapper continuation of application Ser. No. 07/697,142, filed May 8, 1991, now abandoned.

TECHNICAL FIELD

This invention relates generally to neural networks and more specifically to a processor for constructing artificial neurons.

BACKGROUND ART

Interest in the information processing capabilities of the brain has been ongoing since the late 1800s. It is only recently, however, that artificial neuron based networks have gained the capabilities to be truly useful. For example, artificial neural networks are finding uses in vision and speech recognition systems, signal processing, and robotics.

Research and development of neural networks developed from attempts to model the operations and functions of the brain. Therefore, much of the terminology has biological origins.

The basic component of a neural network is a neuron. A neuron can be thought of as a weighted summer. The neuron has a number of inputs. Each input is multiplied by a weight value and the products are added. The weights may be positive (excitatory) or negative (inhibitory). The output of the neuron is a function of the sum of the products.

One neural network is known as the single layer network. Single layer networks are useful for solving linearly separable problems. One application of the single layer network is pattern recognition.

In the simplest case, each neuron is designed to identify a specific pattern in the input signals. Each neuron of the network has the same inputs. The output of each neuron is either a "hit" or a "miss". The sum of the products for each neuron is compared to a threshold value. If a neuron's sum is greater than the threshold value, than it has recognized its pattern and signals a "hit". The number of outputs of the network equals the number of patterns to be recognized and, therefore, the number of neurons. Only one neuron will signal a "hit" at a time (when its pattern appears on the inputs).

In a more complex case, the output of the neuron is not a "hit" or "miss". Rather, it is a graded scale value indicating how close the input pattern is to the neuron's pattern.

For more difficult problems, a multilayered network is needed.

The weights of a neuron may be either fixed or adaptable. Adaptable weights make a neural network much more flexible. Adaptable weights are modified by learning laws or rules.

Most learning laws are based on associativity. Starting with a learning rule proposed by Donald O. Hebb in 1949 (Hebb's rule), learning theory has generally assumed that the essence of learning phenomena involved an association between two or more signals. In Hebb's rule, for instance, the weight associated with an input is increased if both the input line and the output line are concurrently active. There have been many variations on this theme but in one way or another, most of the neural learning rules derive from this basis.

More recently, other learning laws have looked at associative rules based on concurrent input signals. In this approach, the weight of one input is increased if that input and a designated neighboring input are both active within a restricted time window.

It is now generally accepted that in adaptive pattern recognition and classification, for example, it is the correlation between multiple input signals or input signals and output signals, respectively, which constitutes the adaptive mapping mechanism. Any system which would "learn" to recognize and/or categorize a pattern must encode these correlations. Hence, most, if not all, work has focused on associative-based mechanism.

However, each of these learning rules has proved limiting. Each rule works well, given a specific type or group of problems, but none of them, so far, has proved sufficiently general or adaptive to apply to the broad spectrum of problems in the field.

The word adaptive is the key. Adaptation or adaptive response (AR) is the process of altering the response of the network to meet the demands of the new conditions.

In a biological system, such alterations are not made upon the first experience of change. Rather, the change must occur frequently and/or over long time frames before the organism undergoes substantial alteration. Biological systems tend to be very conservative in this regard.

The development of muscle tissue in an athlete provides a good example of this aspect of adaptive response. Consider a would-be weightlifter who is just starting the sport.

After practicing for a week, he may be able to lift considerably more weight than he could at the beginning. Note that the nature of practice is periodic with long intervals (in comparison to the time of the practice itself) between episodes. Over the short run, the body maintains a memory of the physical demand placed on the muscles between episodes.

This memory improves with continuation of the practice. If the weightlifter continues for a week, he will notice that lifting the same weight at the end of that week will be somewhat easier than at the beginning.

If he continues to train for a month, he will find he can lift even more weight with the same apparent effort as was required for the lesser weight in the early days.

Continued regular training will lead to physical changes in the musculature. Muscle bundles will bulk out, as new tissue is built to help meet the continuing demand. A form of long-term memory ensues, in that, this new tissue will remain for some period, even if training is forgone for a while.

Why doesn't the body produce this new tissue at the first or even second episode of demand? The reason is that biological tissues have evolved to deal with the stochastic nature of the environment. They are inherently conservative, maintaining only the amount of response capability as is "normally" required to handle daily life. Only after repeated exposure to the new level of demand will the body respond by producing new muscle fiber.

What happens to the athlete who falls off in training? Up to a point it depends on how long he has been training. If he quits after only a week, then within another week or so he will have reverted to his capacity prior to training. If, however, he stops after six months of training, it may take many months for the new capacity to atrophy back to the pre-training level. In fact, should the athlete reinstitute a training program within several months of stopping, chances are he can regain his peak performance in a relatively short time compared to the initial process. This is due to the long-term memory effect of adaptive response.

In fact, the adaptive response of biological systems illustrates that learning is not strictly a correlation between two signals. Rather, a more general approach is that learning is based on the encoding of information inherent in the time-varying signal along a single input channel.

The present invention is directed at providing a processor as a building block of a neural network which is based on this more fundamental learning law.

DISCLOSURE OF THE INVENTION

In a first aspect of the present invention, a synaptic processor for producing a result signal in response to an input signal is provided. The synaptic processor includes an input expectation. The synaptic processor determines a net modification to the input expectation. The net modification has an increase term and a decrease term. The increase term is responsive to the magnitude of the input signal and the decrease term is independent of the magnitude of the input signal and a function of a decay constant. The result signal is determined in response to the input expectation.

In a second aspect of the present invention, a synaptic processor for producing a result signal in response to an input signal is provided. The synaptic processor includes first and second expectations. The synaptic processor modifies the first expectation as a function of the input signal and the second expectation and modifies the second expectation as a function of the first expectation. The result signal is determined in response to the first expectation.

In a third aspect of the present invention, a synaptic processor for producing a result signal in response to first and second input signals is provided. The synaptic processor includes first and second expectations. The synaptic processor modifies the first expectation as a function of the input signal and the second expectation and modifies the second expectation as a function of the first expectation and the second input signal. The result signal is determined in response to the first expectation.

In a fourth aspect of the present invention, a processing element is provided. The processing element includes a first synaptic processor for producing a first result signal in response to a first input signal and a second synaptic processor for producing a second result signal in response to a second input signal. The first synaptic processor includes an input expectation. The first synaptic processor determines a net modification to the input expectation. The net modification has an increase term and a decrease term. The increase term is responsive to the magnitude of the first input signal and the decrease term is independent of the magnitude of the first input signal and a function of a decay constant. The first result signal is determined in response to the input expectation. The second synaptic processor includes first and second expectations. The second synaptic processor receives the first result signal and produces a potentiation signal. The second synaptic processor modifies the first expectation as a function of the second input signal and the second expectation and modifies the second expectation as a function of the first expectation and the potentiation signal. The second result signal is determined in response to the first expectation.

In a fifth aspect of the present invention, a processing element is provided. The processing element includes an input synaptic processor for producing a result signal in response to an input signal. The input synaptic processor includes an input expectation. The synaptic processor determines a net modification to the input expectation. The net modification has an increase term and a decrease term. The increase term is responsive to the magnitude of the input signal and the decrease term is independent of the magnitude of the input signal and a function of a decay constant. The result signal is determined in response to the input expectation. The processing element produces an output signal in response to the result signal and a threshold signal.

In a sixth aspect of the present invention, a processing element is provided. The processing element includes at least two input synaptic processors for producing result signals in response to respective input signals. Each input synaptic processor includes an input expectation. The synaptic processor determines a net modification to the input expectation. The net modification has an increase term and a decrease term. The increase term is responsive to the magnitude of the input signal and the decrease term is independent of the magnitude of the input signal and a function of a decay constant. The result signal is determined in response to the input expectation. The processing element sums the result signals and responsively produces a sigma signal. The processing element produces an output signal in response to the sigma signal and a threshold signal.

In a seventh aspect of the present invention, a processing element is provided. The processing element includes an input synaptic processor for producing a result signal in response to an input signal. The input synaptic processor includes first and second expectations. The synaptic processor modifies the first expectation as a function of the input signal and the second expectation and modifies the second expectation as a function of the first expectation. The result signal is determined in response to the first expectation. The processing element produces an output signal in response to the result signal and a threshold signal.

In an eighth aspect of the present invention, a processing element is provided. The processing element includes at least two input synaptic processors for producing result signals in response to respective input signals. Each input synaptic processor includes first and second expectations. The synaptic processor modifies the first expectation as a function of the input signal and the second expectation and modifies the second expectation as a function of the first expectation. The result signal is determined in response to the first expectation. The processing element sums the result signals and responsively produces a sigma signal. The processing element produces an output signal in response to the sigma signal and a threshold signal.

BRIEF DESCRIPTION OF THE DRAWINGS

FIG. 1 is a block diagram of a synaptic processor or Adaptrode according to an embodiment of the present invention;

FIG. 2 is a schematic of the input expectation modifying means of the synaptic processor of FIG. 1, according to an embodiment of the present invention;

FIG. 3 is a schematic of the result signal producing means of the synaptic processor of FIG. 1;

FIG. 4 is a graphical representation of a single leveled Adaptrode having a high input expectation;

FIG. 5 is a graphical representation of a single leveled Adaptrode having a low input expectation;

FIG. 6C is a graph illustrating the response of the input expectation of a single leveled Adaptrode with a nonlinear gain to a high intensity, long duration input signal;

FIG. 7A is a graph illustrating the response of the input expectation of a single leveled Adaptrode with a nonlinear gain to a saturating input signal;

FIG. 7B is a graph illustrating the response of the input expectation of a single leveled Adaptrode with a nonlinear gain to a stochastic input signal;

FIG. 7C is a graph illustrating the response of the input expectation of a single leveled Adaptrode with a nonlinear gain to a sequential input signal;

FIG. 8A is a graph illustrating the response of the input expectation of a single leveled Adaptrode with a linear gain to a high intensity, short duration input signal;

FIG. 8B is a graph illustrating the response of the input expectation of a single leveled Adaptrode with a linear gain to a high intensity, intermediate duration input signal;

FIG. 8C is a graph illustrating the response of the input expectation of a single leveled Adaptrode with a linear gain to a high intensity, long duration input signal;

FIG. 9A is a graph illustrating the response of the input expectation of a single leveled Adaptrode with a linear gain to a saturating input signal;

FIG. 9B is a graph illustrating the response of the input expectation of a single leveled Adaptrode with a linear gain to a stochastic input signal;

FIG. 9C is a graph illustrating the response of the input expectation of a single leveled Adaptrode with a linear gain to a sequential input signal;

FIG. 10 is a block diagram of a multi-leveled synaptic processor or Adaptrode, according to an embodiment of the present invention;

FIG. 13 is a schematic of the expectation modifying means of a three-leveled synaptic processor;

FIG. 14 is a schematic of the potentiation signal producing means of FIG. 10;

FIG. 15 is a schematic of the hurdle sign source of FIG. 14;

FIG. 16A is a graph illustrating the responses of the expectations of a three-leveled Adaptrode with nonlinear gains to a high intensity, short duration input signal;

FIG. 16B is a graph illustrating the responses of the expectations of a three-leveled Adaptrode with nonlinear gains to a high intensity, intermediate duration input signal;

FIG. 16C is a graph illustrating the responses of the expectations of a three-leveled Adaptrode with nonlinear gains to a high intensity, long duration input signal;

FIG. 16E is a graph illustrating the responses of the expectations of a three-leveled Adaptrode with nonlinear gains to a stochastic input signal;

FIG. 16F is a graph illustrating the responses of the expectations of a three-leveled Adaptrode with nonlinear gains to a sequential input signal;

FIG. 17A is a graph illustrating the responses of the expectations of a three-leveled Adaptrode with nonlinear gains to a high intensity, short duration input signal, wherein the second expectation is gated;

FIG. 17B is a graph illustrating the responses of the expectations of a three-leveled Adaptrode with nonlinear gains to a high intensity, intermediate duration input signal, wherein the second expectation is gated;

FIG. 17E is a graph illustrating the responses of the expectations of a three-leveled Adaptrode with nonlinear gains to a stochastic input signal, wherein the second expectation is gated;

FIG. 18B is a graph illustrating the responses of the expectations of a three-leveled Adaptrode to a high intensity, intermediate duration input signal, wherein the first expectation has a linear gain;

FIG. 18D is a graph illustrating the responses of the expectations of a three-leveled Adaptrode to a high intensity, saturating input signal, wherein the first expectation has a linear gain;

FIG. 18E is a graph illustrating the responses of the expectations of a three-leveled Adaptrode to a stochastic input signal, wherein the first expectation has a linear gain;

FIG. 18F is a graph illustrating the responses of the expectations of a three-leveled Adaptrode to a sequential input signal, wherein the first expectation has a linear gain;

FIG. 19A is a graph illustrating the responses of the expectations of a three-leveled Adaptrode to a high intensity, short duration input signal, wherein the first expectation has a linear gain and the second expectation is gated;

FIG. 19B is a graph illustrating the responses of the expectations of a three-leveled Adaptrode to a high intensity, intermediate duration input signal, wherein the first expectation has a linear gain and the second expectation is gated;

, FIG. 19C is a graph illustrating the responses of the expectations of a three-leveled Adaptrode to a high intensity, long duration input signal, wherein the first expectation has a linear gain and the second expectation is gated;

FIG. 19D is a graph illustrating the responses of the expectations of a three-leveled Adaptrode to a high intensity, saturating input signal, wherein the first expectation has a linear gain and the second expectation is gated;

FIG. 19F is a graph illustrating the responses of the expectations of a three-leveled Adaptrode to a sequential input signal, wherein the first expectation has a linear gain and the second expectation is gated;

FIG. 20 is a block diagram of a processing element having an input Adaptrode array, a summation and output processor, and a threshold processor, according to an embodiment of the present invention;

FIG. 21 is a schematic of the summation and output processor of FIG. 20;

FIG. 22 is a schematic of the multiplying bar of FIG. 21;

FIG. 24 is a graphical representation of two synaptic processors in which the output of one is used to gate the other;

FIG. 25 is a legend for FIGS. 25A, 26, and 28;

FIG. 26 is a block diagram of the Neuroprocessor of FIG. 26, including a Neuristor processing unit (NPU) and an Adaptrode array processor;

FIG. 27 is a block diagram of the Adaptrode array processor of FIG. 26;

FIG. 28 is a legend for FIGS. 28A–28G;

FIG. 28A is a block diagram of a two Neuristor associative network illustrating association by conditioned response;

FIG. 28B is a block diagram of the network of FIG. 28A in which a conditional stimulus has become associated with an unconditioned stimulus/response;

FIG. 28C is a block diagram of the network of FIG. 28B after a period of no stimulus;

FIG. 28D is a block diagram of the network illustrating the conditioned stimulus/response association of FIG. 28C;

FIG. 28E is a block diagram of the network of FIG. 28D illustrating the effect of a contrary unconditioned stimulus;

FIG. 28F is a block diagram of the network of FIG. 28E illustrating the effect of a subsequent temporarily conditioned stimulus/response association of FIG. 28E; and FIG. 28G is a block diagram of the network of FIG. 28F illustrating the longer term association between the conditionable response and the first unconditioned stimulus.

BEST MODE FOR CARRYING OUT THE INVENTION

Figure 6A:
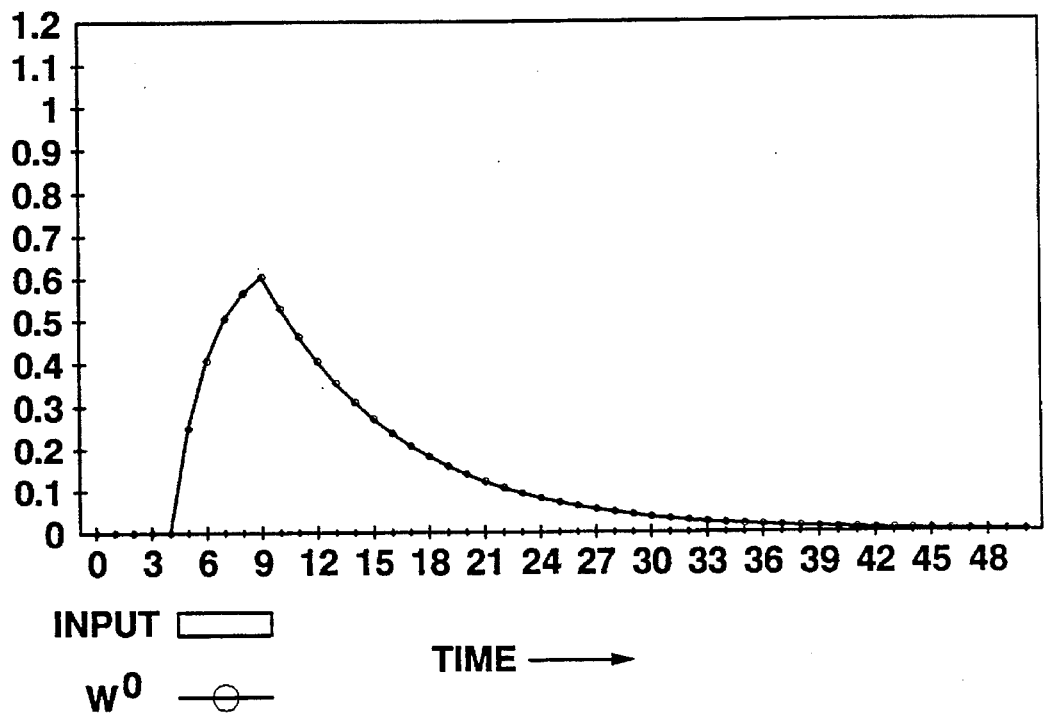
FIG. 6A is a graph illustrating the response of the input expectation of a single leveled Adaptrode with a nonlinear gain to a high intensity, short duration input signal.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

With reference to FIG. 1, an embodiment of a synaptic processor 102, or single leveled Adaptrode, for use in a neural network is shown.

Traditionally, neural networks have been implemented using a wide range of technologies. These technologies may be analog or digital. Actual implementation varies with application based on for example, network complexity. While analog circuits provide a low-cost, but fast implementation, larger networks become cumbersome and some accuracy is lost.

More complex networks are generally implemented on general purpose computers or specially designed hardware. For this reason, it is convenient to describe the present invention mathematically. It should be noted, however, that the present invention is not limited to such a mathematical implementation or even to an analog or digital implementation.

The synaptic processor 102 receives an input signal, X, and produces a result signal, r. The result signal is a function of an input expectation, $W^0$, as discussed below.

In parts of the following discussion, a distinction is made between a continuous system and a discrete system. In a continuous system, system parameters are updated continuously and are said to be continuously variable. In a discrete system, system parameters are updated at discrete time intervals, typically denoted as $\Delta t$.

Furthermore, the term intensity, as in high intensity or medium intensity, is used in describing the input signal. For example, in a discrete system, in which the input signal is modeled as a series of pulses having a set width, a high intensity input signal is one composed mostly of pulses.

The single leveled Adaptrode 102 includes means 104 for initializing the input expectation. The input expectation, $W^0$, is bounded by a maximum expectation and an equilibrium expectation, $W^M$, $W^E$. In one embodiment, the input expectation, $W^0$, is given an initial value equal to $W^E$, typically zero (0).

A means 106 receives the input signal and detects a magnitude of the input signal. The magnitude of the input signal is dependent upon the exact nature of the signal. For example, in a continuous system, the input signal may have a varying frequency. The input signal may also have a varying continuous voltage or current. If the neural network has a digital implementation, the input signal is a logic level low (zero) or logic level high (nonzero).

A means or process unit 108 modifies the input expectation, $W^0$. The means 108 calculates a net modification to the input expectation. The net modification is added to the previous input expectation to form a new input expectation. The net modification has an increase term and a decrease term. The increase term tends to increase the input expectation and the decrease term tends to decrease the input expectation. The net effect of the two terms depends upon their relative magnitude.

The input expectation, $W^0$, represents the current expectation of the Adaptrode with respect to the intensity of the input signal. The Adaptrode adapts or learns from the input signal. That is, the Adaptrode retains a memory through the input expectation of its history. Its expectation of the future input signal is based on that history.

The increase term is a function of the input signal and tends to "pull up" the input expectation. The decrease term is not a function of the input signal and gives the Adaptrode a built-in bias to expect that it will receive a sparse signal in the long run.

In one embodiment, the increase term is a function of the input signal and the decrease term is independent of the input signal. In another embodiment, the increase term is a function of a rise constant, $\alpha^0$, and the decrease term is a function of a decay constant, $\delta^0$. Furthermore, the rise and decay constants are independent. In still another embodiment, the increase term is a function of only one input signal.

In a first embodiment, the input expectation is modified according to:

$$W^o = W_p^o + X \cdot \alpha^o \cdot [W^M - W_p^o] - \delta^o \cdot [W_p^o - W^E], \quad \text{EQN. 1}$$

where,
- $W^o$ = the new input expectation,
- $W_p^o$ = the previous input expectation,
- $X$ = the input signal,
- $\alpha^o$ = a rise constant,
- $W^M$ = the maximum expectation,
- $\delta^o$ = a decay constant, and
- $W^E$ = the equilibrium expectation.

In the first embodiment, the increase term is a nonlinear function. Therefore, a single leveled Adaptrode according to the first embodiment is said to have an nonlinear gain.

In a second embodiment, the input expectation is modified according to:

$$W^o = W_p^o + X \cdot \alpha^o - \delta^o \cdot [W_p^o - W^E]. \quad \text{EQN. 2}$$

In the second embodiment, the increase term is a linear function. Therefore, an Adaptrode according to the second embodiment is said to have a linear gain. Furthermore, the input expectation, $W^o$, is not expressly limited to a maximum value. However, simulation has shown that EQN. 2 reaches a maximum steady state equilibrium value given a continuous input signal for a suitable period of time. The exact maximum value is a function of the equation parameters, the intensity of the input signal, and the magnitude of the input signal.

In both the linear and nonlinear gain models, the rate constant are set such that the rate of decay is over a longer time frame than the rate of increase. That is, $\alpha^o > \delta^o$.

With reference to FIG. 2, the input expectation modifying means 108 includes means 202 for determining the increase term and means 204 for determining the decrease term.

From EQN. 1, the increase term is:

$$X \cdot \alpha^o \cdot [W^M - W_p^o].$$

In the preferred embodiment, the increase term is positive and is added to the input expectation. The increase term determining means 202 includes a delay block 206 for producing a delayed or previous input expectation, $W_p^o$. The delayed input expectation ($W_p^o$) is subtracted from the maximum expectation, $W^M$, by a first summer 208. A first multiplier 210 multiplies the output of the first summer 208 by the rise constant, $\alpha^o$.

Likewise, the decrease term is defined in EQN. 1 as:

$$\delta^o \cdot [W_p^o - W^E].$$

In the preferred embodiment, the decrease term is positive and is subtracted from the input expectation. The decrease term determining means 204 includes a second summer 212 for subtracting the equilibrium expectation from the delayed input expectation. A second multiplier 214 multiplies the output of the second summer 212 by the decay constant, $\delta^o$. A third multiplier 216 multiplies the output of the first multiplier 210 by the input signal, X. A third summer 218 adds the output of the third multiplier 216 and subtracts the output of the second multiplier 214 from the delayed input expectation to form the new input expectation, $W^o$.

Referring again to FIG. 1, a means 110 produces the result signal, r, as a function of the input expectation, $W^o$. In one embodiment, the result signal is a linear function of the input expectation.

In another embodiment, the result signal is a nonlinear function of the input expectation. For example, in a continuous system:

$$r = k \cdot W^o \cdot e^{-\lambda \tau}, \quad \text{EQN. 3A}$$

where,
- r = the result signal,
- k = a first constant,
- $W^o$ = the input expectation,
- $\lambda$ = a second constant, and
- $\tau$ = a predetermined time differential.

The time differential, $\tau$, is determined as the current time minus the time at which the magnitude of the input signal became nonzero.

In another example, for a discrete system:
$r(t) = k \cdot W^o$, if $X > 0$, or $$r(t) = r(t - \Delta t) - \lambda \cdot r(t - \Delta t), \quad \text{EQN. 3B}$$

otherwise,
where,
- r = the result signal,
- k = a first constant,
- $W^o$ = the input expectation, and
- $\lambda$ = a second constant.

With reference to FIG. 3, the result signal producing means 110 for implementing EQN. 3B, is shown. The means 110 includes a fourth multiplier 302 for multiplying the input expectation, $W^o$, by a constant, k. A second delay block 303 feeds the result signal to a fifth multiplier 304 and a fourth summer 306. The fifth multiplier 304 multiplies the delayed result signal by the constant, $\lambda$. The fourth summer 306 subtracts the output of the fifth multiplier 304 from the delayed result signal. The decision block 308 compares the input signal, X, with a threshold (for example, zero). If the input signal is greater than the threshold the output of the fourth multiplier 302 is passed by the control block 310. Otherwise, the output of the fourth summer 306 is passed.

To illustrate certain operating states of the Adaptrode 102, a graphic representation of the Adaptrode 102 is used. With reference to FIGS. 4 and 5, the input signal, X, is applied to the input expectation modifying means 108. The increase and decrease terms are determined and are used to determine the new input expectation. The result signal producing means 110 (response unit) determines the result signal as a function of the input expectation.

The Adaptrode 102 of FIG. 4 has a high input expectation, as illustrated by the bar 402. In contrast, the bar 502 of the Adaptrode 102 of FIG. 5 has a relatively low input expectation. Similar representations will be used throughout the following discussion to illustrate important features of the present invention.

With reference to FIGS. 6A–7C, the input expectation, $W^o$, of a single leveled Adaptrode 102 with a nonlinear gain, is shown for a variety of input signals. In each example the rise constant, $\alpha^o$ and the decay constant $\delta^o$ are 0.25 and 0.125, respectively. Note that these constants are for illustration purposes only. The maximum expectation, $W^M$, is set at 1 and the equilibrium expectation, $W^E$ is set at zero. The input expectation is initialized at zero. Furthermore, the input signal has a magnitude of 1.0.

The graphs used in the following discussion represent the response of the input expectation modifying means 108 for a discrete system. That is, the input expectation is modified at discrete time intervals of $\Delta t$. For a single leveled Adaptrode 102 with a nonlinear gain, the input expectation is determined by:

$$W^0(t) = W^0(t - \Delta t) + X(t) \cdot \alpha^0 \cdot [W^M -$$  EQN. 4A $$W^0(t - \Delta t)] - \delta^0 \cdot [W^0(t - \Delta t) - W^E].$$

With reference to FIGS. 6A–9C and 16A–19F, the input signal is a series of pulses having a constant width and magnitude. The input signal is shown at the bottom of each graph as a bar. The bar corresponds to the input signal being nonzero. It should be noted that, while the graphs in FIGS. 6A–9C and 16A–19F are based on discrete data, the data is represented by a line graph. The line graph is especially useful in examining the response characteristics of the Adaptrode.

In FIG. 6A, at time t=0, the input signal is zero and the input expectation is also 0. At time, t=5, the input signal is nonzero and has a magnitude of 1.0. The input remains nonzero until t=9.

As shown, while the input is nonzero the increase term is larger than the decrease term and the input expectation rises exponentially. After the input signal becomes zero again, the input expectation "falls off" or decays toward the equilibrium expectation, $W^E$.

Figure 6B:
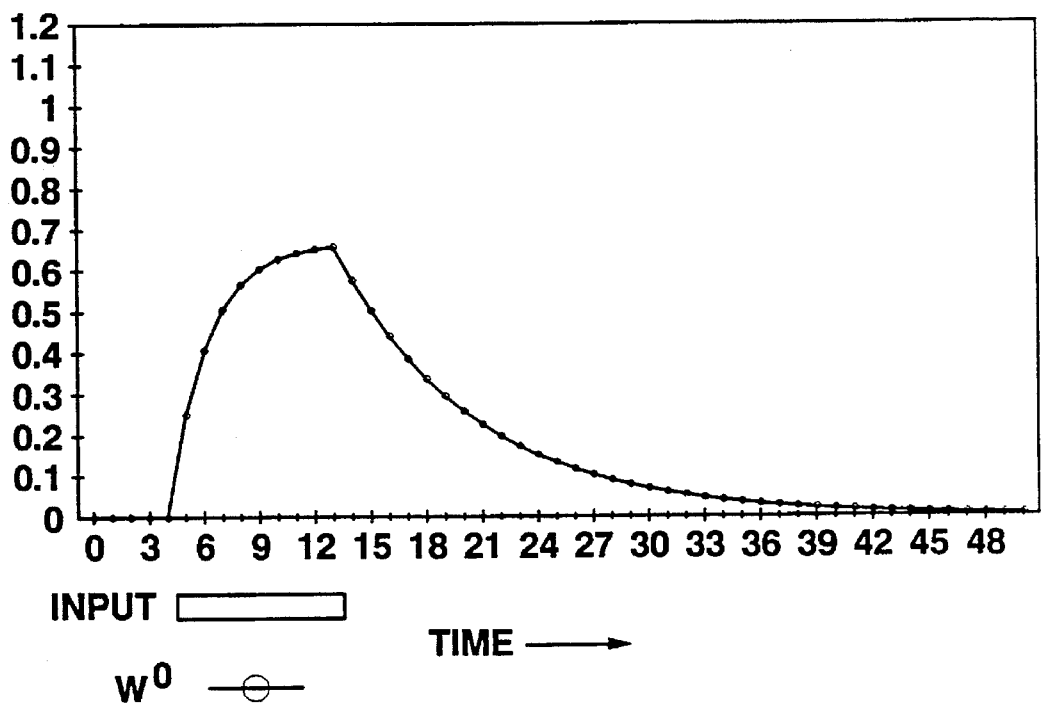
FIG. 6B is a graph illustrating the response of the input expectation of a single leveled Adaptrode with a nonlinear gain to a high intensity, intermediate duration input signal.

In FIG. 6B an input signal of intermediate duration is applied to the Adaptrode. As shown, an input signal having a magnitude of 1.0 is applied at time t=5 and becomes zero again at t=14. It should be noted that, although the input expectation increases throughout the time period the input signal is nonzero, the net modification is actually decreasing. This is attributed to the fact that the increase term is a function of the difference between the maximum expectation and the current expectation and due to the increasing effects of the decrease term.

This effect is shown further in FIG. 6C, in which a high intensity input signal of long duration is applied to the Adaptrode. The input expectation appears to level off.

In fact, as illustrated is FIG. 7A, given a maximum intensity input signal of a constant magnitude, the input expectation reaches a saturating point or steady state value. In this situation, the increase term and the decrease term offset each other and the net modification is zero.

In FIG. 7B, a stochastic or random input signal has been applied to the Adaptrode 102, as shown. When, the input signal is nonzero, the increase term drives the net modification positive and when the input signal is zero, the decrease term drives the net modification negative.

In FIG. 7C, a sequential input signal has been applied to the Adaptrode. That is, the input signal is nonzero for a first short period of time (5≤t≤10), zero for a second period of time (11≤t≤24), and then nonzero for a third period of time (25≤t≤29). The resulting input expectation illustrates the learning capability of the single-leveled Adaptrode. During the first and second time periods, the input expectation rises and falls as expected and described above. At t=25, the input signal becomes nonzero and the input expectation begins to rise again. However, it rises from its current value.

The rise and decay constants will affect the nature of the rates of increase and decrease of the input expectation. For example, if the rise and decay constants are similar in magnitude, the rates of increase and decrease of the input expectation will be similar. On the other hand, if the decay constant is relatively much smaller than the rise constant ($\delta^0 << \alpha^0$) the Adaptrode will exhibit "fast" learning and slow "forgetting".

With reference to FIGS. 8A–9C, the input expectation, $W^0$, of a single leveled Adaptrode 102 with a linear gain, is shown for a variety of input signals. In each example the rise constant, $\alpha^0$, and the decay constant, $\delta^0$, are 4.0 and 0.125, respectively. The equilibrium expectation, $W^E$ is set at zero and the input expectation is initialized at zero.

FIGS. 8A–9C represent the response of the input expectation modifying means for a discrete system. Therefore, for a single-leveled adaptrode with a linear gain, the input expectation is determined by:

$$W^0(t) = W^0(t - \Delta t) + X(t) \cdot \alpha^0 - \delta^0 \cdot [W^0(t - \Delta t) - W^E].$$  EQN. 4B In FIG. 8A, an input signal of high intensity and short duration is applied to the single leveled Adaptrode 102. In FIGS. 8B and 8C an input signal of high intensity and intermediate and long duration is applied to the Adaptrode 102, respectively. It should be noted, however, that although the increase term is defined as a linear function, the input expectation is not a linear function due to the decrease term.

In FIG. 9A, a maximum intensity input signal of a constant magnitude (1.0) is applied to the single-leveled Adaptrode 102. As with the single-leveled Adaptrode 102 with the nonlinear gain, the input expectation of the single leveled Adaptrode with a linear gain also reaches a steady state value. Notice, however, that the input expectation, $W^0$, is not constrained to a maximum value by EQN. 4. Rather, the steady state value is a function of the Adaptrode parameters, the intensity of the input signal, and the magnitude of the input signal. For a given Adaptrode, the steady state value would reach a maximum expectation when an input signal of maximum intensity and maximum magnitude is applied for a suitable duration.

In FIG. 9B, a stochastic input signal is applied to the single-leveled Adaptrode 102. In FIG. 9C, a sequential input signal is applied to the single-leveled Adaptrode. Both graphs illustrate that the single-leveled Adaptrode with a linear gain has a similar learning ability as the Adaptrode with the nonlinear gain.

These examples demonstrate the "learning" (rise) and "forgetting" (decay) aspects of the single leveled Adaptrode. Furthermore, as a result of the rise and decay constants being independent, the "learning" and "forgetting" aspect of each Adaptrode may be independently set. That is, both may be fast, both may be slow, or any combination, according to desired characteristics.

The single leveled Adaptrode displays memory capabilities in one time domain. By allowing the equilibrium expectation (for the input expectation) to vary, the memory capability demonstrated by the Adaptrode is in multiple time domains. Such an Adaptrode is called a multi-leveled Adaptrode.

With reference to FIG. 10, a synaptic processor 1002, or multi-leveled Adaptrode, has a plurality of expectations. The expectations are generally denoted by $W^l$, where $0 \leq l \leq L$.

A means 1004 initializes the expectations, $W^l$. The expectations are bounded by a maximum expectation, $W^M$, and an equilibrium expectation, $W^E$. Generally, the expectations have the relationships:

$$W^M \geq W^0 \geq W^l \geq W^L \geq W^E.$$

A means or process unit 1006(l) modifies the expectation, $W^l$. The modifying means 1006(l) determines a net modification and adds the net modification to the expectation, $W^l$. The net modification has an increase term and a decrease term. Generally, the increase term is a function of the preceding expectation: $W^{l-1}$, if l>0. If l=0 then the increase term is a function of the maximum expectation, $W^M$. The decrease term is a function of the following expectation $W^{l+1}$, if l<L or $W^E$, if l=L.

In a first embodiment, the first expectation, $W^0$, is a function of the magnitude of the input signal.

In a second embodiment, the first expectation, $W^0$, has a linear gain (as described above).

In a third embodiment, the first expectation, $W^0$, has a nonlinear gain (as described above).

In a fourth embodiment, the increase term of each expectation, $W^l$, is a function a rise constant, $\alpha^l$ and the decrease term is a function of a decay constant, $\delta^l$.

In a fifth embodiment, the increase term of each other expectation, $W^l$ (l>0), is a function of the difference between the preceding expectation, $W^{l-1}$, and the current expectation, $W^l$.

In a sixth embodiment, the decrease term of each expectation, $W^l$ is a function of the difference between the current expectation, $W^l$ and the following expectation, $W^{l+1}$ or a function of the difference between the current expectation, $W^l$ and the equilibrium expectation, $W^E$, if l=L.

In a seventh embodiment, the first expectation is modified according to:

$$W^0 = W^0 + X \cdot \alpha^0 \cdot [W^M - W_p^0] - \delta^0 \cdot [W_p^0 - W^1], \qquad \text{EQN. 5A}$$

where $W_p^0$ is the previous first expectation.

In a eighth embodiment, the first expectation is modified according to:

$$W^0 = W_p^0 + X \cdot \alpha^0 - \delta^0 \cdot [W_p^0 - W^1]. \qquad \text{EQN. 5B}$$

Each other expectation ($W^l$, for l>0) is modified according to:

$$W^l = W_p^l + \alpha^l \cdot [W^{l-1} - W_p^l] - \delta^l \cdot [W_p^0 - W^{l+1}], \qquad \text{EQN. 6}$$

where $W_p^l$ is the previous expectation $W^{l+1}$ is the expectation of the next level, if l<L, or the equilibrium expectation, $W^E$, if l=L, and $W^{l-1}$ is the preceding expectation.

As in the single leveled Adaptrode, the rate constants for each level are typically set such that the rate of decay is over a longer time frame than the rate of increase. That is, $\alpha^l > \delta^l$. Further, in a multi-leveled Adaptrode, each of the rate constants for each level (l) are set such that the rates of increase and decay of one level (l) are over a longer time frame than the rates of increase and decay of the preceding level (l–1). That is:

$$\alpha^0 \geq \alpha^1 624 \ \alpha^l 624 \ \alpha^L$$

and $$\delta^0 \geq \delta^1 \geq \delta^l \geq \delta^L.$$

A means 1008 produces the result signal as a function of the first expectation, $W^0$. As discussed above the result signal may be a linear or nonlinear function of the first expectation, $W^0$.

Figure 11:
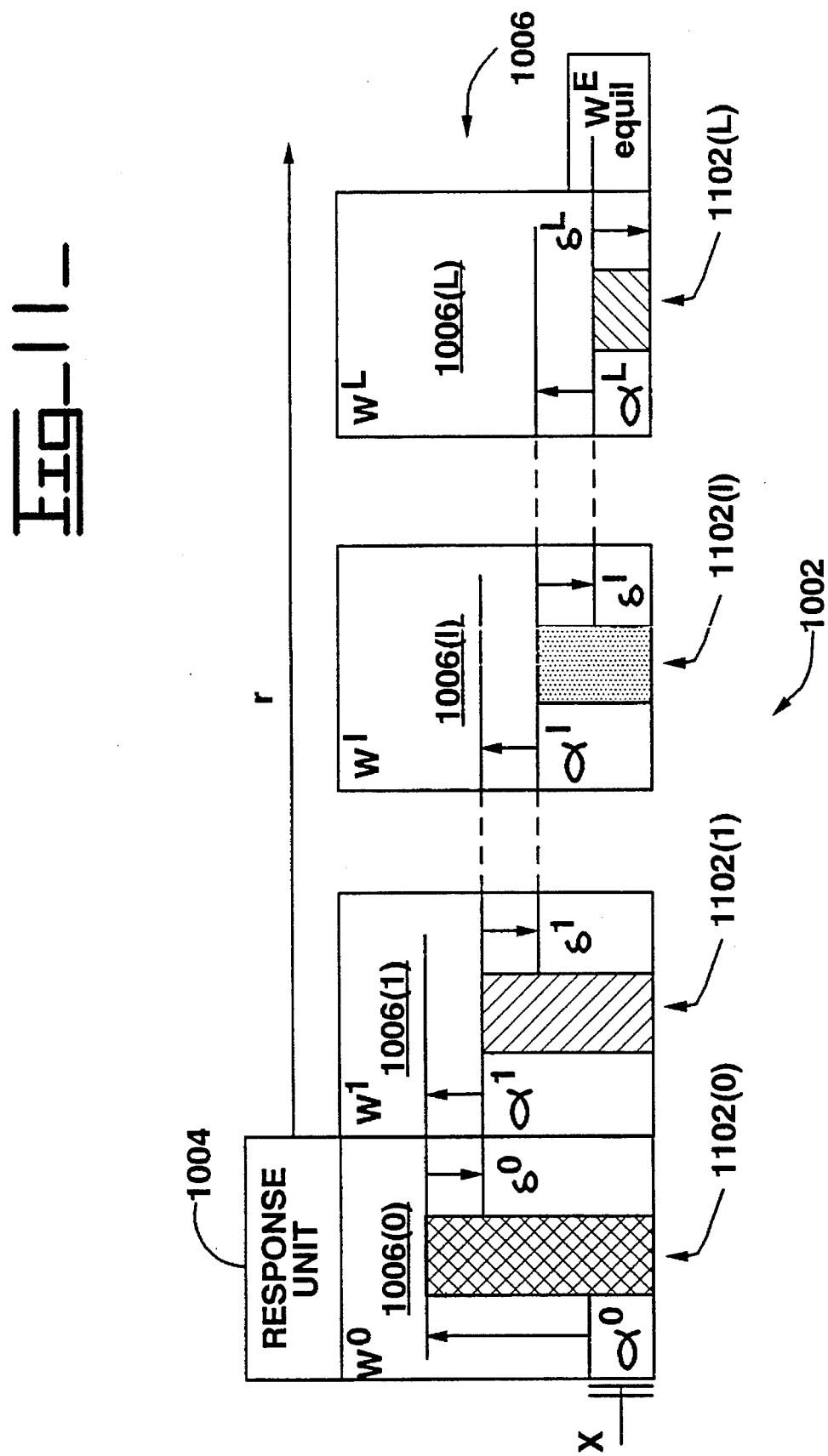
FIG. 11 is a graphical representation of the multi-leveled synaptic processor of FIG. 10.

With reference to FIG. 11, the multi-leveled Adaptrode 1002 is graphically represented as shown. The graphic representation illustrates several important features of the multi-leveled Adaptrode 1002. First, the first expectation, $W^0$, is the only expectation directly affected by the input signal, X. Second, the result signal, r, is a function of only the first expectation, $W^0$.

Also, the size of the bars 1102(l) is indicative of the relative size of the respective expectation. Further, the arrows illustrate that each expectation is affected both positively (by the increase term) and negatively (by the decrease term).

Referring again to FIG. 10, in a still further embodiment, the multi-leveled Adaptrode 1002 includes means 1010 for receiving a second input signal, $H^l$, and responsively producing a potentiation signal, $P^l$. The potentiation signal is associated with one of the expectations for l>0.

In a first embodiment, the initializing means 1004 initializes a gating signal, $g^l$. The potentiation signal producing means 1010 compares the second input signal, $H^l$, to the gating signal and responsively produces the potentiation signal, $P^l$. For example, in a discrete system $P^l$ may be determined by:

$$p^l = 1 \text{ if } H^l > g^l,$$

or $$p^l = 0,$$

otherwise.

In a continuous system, $P^l$ is a function of the difference between the second input signal $H^l$, and the gating signal, $g^l$.

In a second embodiment, the second input signal, $H^l$, is determined as a function of the sum of a plurality of interaction signals, $h^n$, where N denotes the number of interaction signals and $0 \leq n \leq N$. The interaction signals are discussed further below.

In a third embodiment the gating signal, $g^l$, is varied as a function of a parameter of the Adaptrode 1002. For example, the gating signal may be a function of $W^0$ or the result signal, r.

Figure 12:
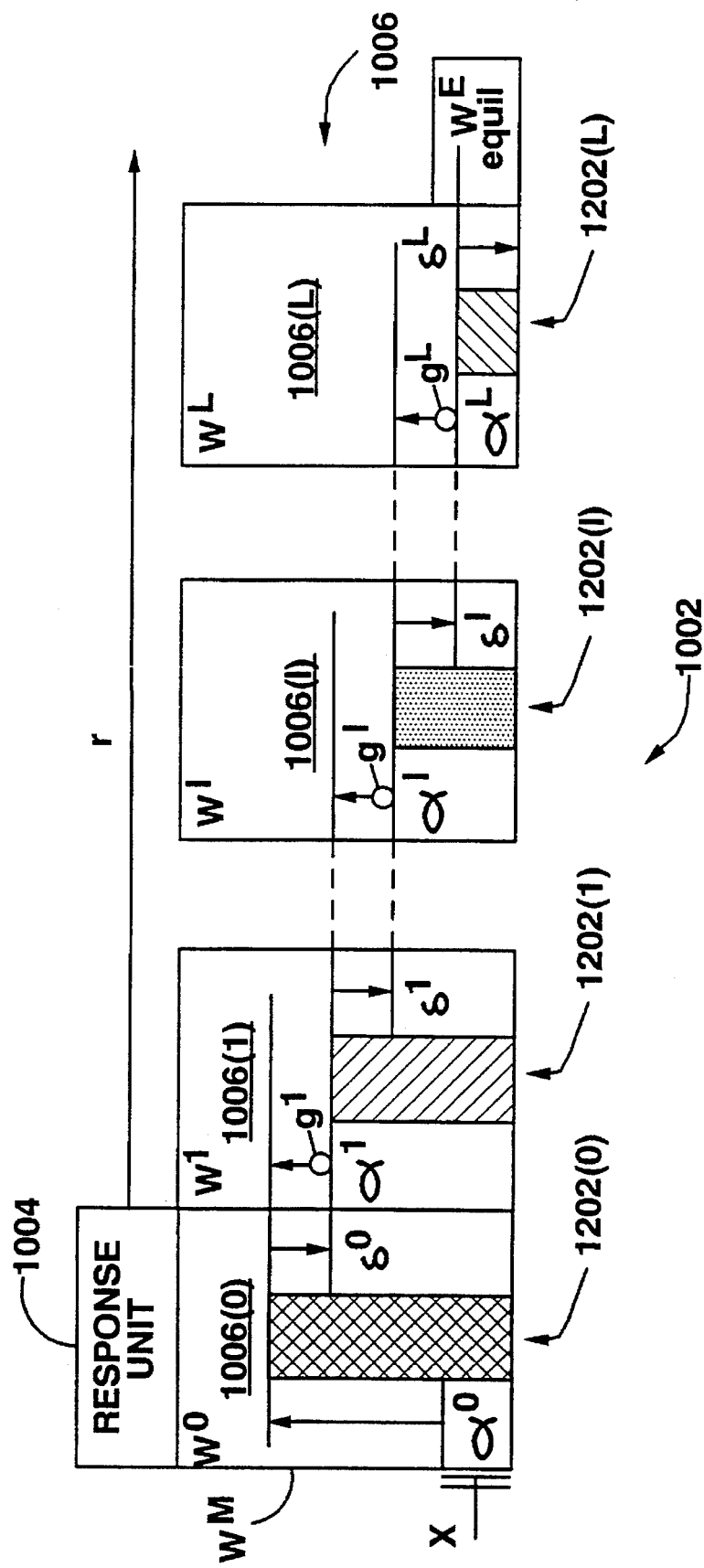
FIG. 12 is a graphical representation of a multi-leveled synaptic processor using a gating function.

With reference to FIG. 12, in the preferred embodiment, each expectation (except l=0) has an associated gating signal, $g^l$. As illustrated, the potentiation achieved by the potentiation signal, $P^l$, affects only the increase term or the "learning" of the expectation. The decrease term or the "forgetting" is not affected.

Therefore, for l>0, EQN. 6 becomes:

$$W^l = W_p^l + P^l \cdot \alpha^1 \cdot [W^{l-1} - W_p^l] - \delta^1 \cdot [W_p^0 - W^{l+1}], \qquad \text{EQN. 8}$$

where $W^{l+1}$ is the next expectation, if l< L, and the equilibrium expectation, $W^E$, if l=L.

In a discrete system, if P=1, the potentiation signal is said to be in a "permit" state because learning is allowed. If P=0, the potentiation signal is said to be in a "inhibit" state since learning is not allowed.

With reference to FIG. 13, the expectation modifying means 1006(0),1006(1),1006(2) for a multi-leveled Adaptrode having three expectations (L=2) is shown in further detail, according to an embodiment of the present invention, The first expectation modifying means 1006(0) includes means 1302(0) for determining the increase term and means 1304(0) for determining the decrease term of the first expectation. The increase term determining means 1302(0) includes a third delay block 1306 which produces a delayed or previous first expectation $W_p^0$. The delayed first expectation ($W_p^0$) is subtracted from the maximum expectation, $W^M$, by a fifth summer 1308. A sixth multiplier 1310 multiplies the output of the fifth summer 1308 by a first rise constant, $\alpha^0$.

The decrease term determining means 1304(0) includes a sixth summer 1312 for subtracting the second expectation, $W^1$, from the delayed first expectation, $W_p^0$. A seventh multiplier 1314 multiplies the output of the sixth summer 1312 by a first decay constant, $\delta^0$.

An eighth multiplier 1316 multiplies the output of the sixth multiplier 1310 by the input signal, X. A seventh summer 1318 adds the output of the eighth multiplier 1316 and subtracts the output of the seventh multiplier 1314 from the delayed first expectation to form the new first expectation, $W^0$.

The second expectation modifying means 1006(1) includes means 1302(1) for determining the increase term and means 1304(1) for determining the decrease term of the second expectation. The increase term determining means 1302(1) includes a fourth delay block 1320 which produces a delayed second expectation $W_p^1$. The potentiation producing means 1010(1) for the second expectation receives the first expectation $W^0$, the delayed second expectation $W_p^1$, and the interaction signals $h^{N1}$ (N refers to the number of signals and 1 refers to the expectation level) and produces the potentiation signal, $P^1$. The potentiation producing means 1010 is explained further below. The potentiation signal, $P^1$, is multiplied by a second rise constant, $\alpha^1$, by a ninth multiplier 1322.

The decrease term determining means 1304(1) for the second expectation includes an eighth summer 1324 for subtracting the third expectation $W_p^2$, from the second expectation, $W^1$. A tenth multiplier 1326 multiplies the output of the eighth summer 1324 by a second decay constant, $\delta^1$.

A ninth summer 1328 adds the output of the ninth multiplier 1322 and subtracts the output of the tenth multiplier 1326 from the delayed second expectation $W_p^1$, to form the new second expectation, $W^1$.

The third expectation modifying means 1006(2) includes means 1302(2) for determining the increase term and means 1304(2) for determining the decrease term of the third expectation. The increase term determining means 1302(2) includes a fifth delay block 1330 which produces a delayed third expectation, $W_p^2$. The potentiation producing means 1010(2) for the third expectation receives the second expectation, $W^1$, the delayed third expectation $W_p^2$, and the interaction signals, $h^{M2}$, (M refers to the number of signals and 2 refers to the expectation level) and produces the potentiation signal, $P^2$. The potentiation signal, $P^2$, is multiplied by a third rise constant, $\alpha^2$, by a eleventh multiplier 1332.

The decrease term determining means 1304(2) for the third expectation includes a tenth summer 1334 for subtracting the equilibrium expectation, $W^E$, from the third expectation, $W_p^2$. A twelfth multiplier 1336 multiplies the output of the tenth summer 1334 by a third decay constant, $\delta^2$.

An eleventh summer 1338 adds the output of the eleventh multiplier 1332 and subtracts the output of the tenth multiplier 1336 from the delayed third expectation, $W_p^2$, to form the new third expectation $W^2$.

With reference to FIG. 14, the potentiation signal producing means 1010 according to an embodiment of the present invention is further described. The potentiation signal producing means 1010 includes a multiplying bar 1402 and a hurdle sign source 1404. As shown in FIG. 15, the hurdle sign source 1404 includes a plurality of multipliers 1502(n). The multiplying bar receives the interaction signals, $h^1 \cdots {}^N$, and a sign (+1 or −1) from a table 1504. It should be realized that in digital representations, multiplication by −1 can be performed using two's complement representation.

Returning to FIG. 14, the outputs of the multiplying bar 1402 are added together by a twelfth Summer 1406. A summer 1408 subtracts the gate signal, $g^l$, from the output of the twelfth Summer 1406. The output of the summer 1408 is connected to a first condition block 1410. A first decision block 1412 receives the preceding expectation $W^{l-1}$. A second decision block 1414 receives the previous value of the current expectation, $W_p^l$. A decision block will pass the input labeled YES if the condition in the condition block is true. Therefore, if the output of the thirteenth multiplier 1408 is greater than 0, the first and second condition blocks 1412,1414 will pass the preceding expectation, $W^{l-1}$, and the previous value of the current expectation, $W_p^l$, respectively. The first and second decision blocks 1412,1414 will pass a zero and a one, respectively, if the output of the summer 1408 is not greater than zero. A thirteenth summer 1416 subtracts the output of the second decision block 1414 from the output of the first decision block 1412.

With reference to FIG. 16A–17F, the expectations, $W^0$, $W^1$, $W^2$ of a three-leveled Adaptrode with nonlinear gains are shown for a variety of input signals. In each example, the first rise constant $\alpha^0$ and $\delta^0$ are set at 0.25 and 0.125, respectively. The second rise constant and the second decay constant, $\alpha^1$ and $\delta^1$ are 0.0625 and 0.0312, respectively. The third rise constant and the third decay constant, $\alpha^2$ and $\delta^2$ are 0.0156 and 0.0078, respectively. The maximum expectation, $W^M$, is set at one and the equilibrium expectation, $W^E$ is set at zero. The first, second, and third expectations, $W^0$, $W^1$, $W^2$, are initialized at zero.

For a three-leveled Adaptrode with a nonlinear gain in a discrete system, the first expectation is determined by:

$$W^0(t) = W^0(t - \Delta t) + X(t) \cdot \alpha^0 \cdot [W^M - \qquad \text{EQN. 9A}$$
$$W^0(t\Delta t)] - \delta^0 \cdot [W^0(t - \Delta t) - W^1(t - \Delta t)].$$

The second expectation is determined by:

$$W^1(t) = W^1(t - \Delta t) + \alpha^1 \cdot [W^0 - \qquad \text{EQN. 9B}$$
$$W^1(t - \Delta t)] - \delta^1 \cdot [W^1(t - \Delta t) - W^2(t - \Delta t)].$$

The third expectation is determined by:

$$W^2(t) = W^2(t - \Delta t) + \alpha^2 \cdot [W^1 - \qquad \text{EQN. 9C}$$
$$W^2(t - \Delta t)] - \delta^2 \cdot [W^2(t - \Delta t) - W^E].$$

In FIG. 16A, an input signal of high intensity and short duration is applied to the three-leveled Adaptrode. The first expectation, $W^0$, increases while the input signal is non zero. And decays when the input signal is zero. Starting at time, t=5, when the input signal becomes non zero, the second expectation, $W^1$, also begins to rise. However, the increase term of the second expectation, $W^1$, is a function of the first expectation $W^0$. Therefore, the second expectation, $W^1$, continues to increase after the input signal becomes zero due to the first expectation, $W^0$. In fact while the first expectation is larger than the second expectation, the increased term of the second expectation will be positive. It is important to note at this point, that the equilibrium expectation of the first expectation, $W^0$, for a multi-leveled Adaptrode is the following expectation that is the second expectation, $W^1$. In effect, the first expectation is bounded at the lower end by the the second expectation.

Similarly, the increase term of the third expectation is a function of the second expectation. Therefore, as shown in FIG. 16A, the third expectation continues to rise while the second expectation is large enough to pull the third expectation up.

In FIGS. 16B and 16C, a high intensity input signal of intermediate duration and long duration is applied to the three-leveled Adaptrode, respectively. Both graphs illustrate that the second expectation, $W^1$, will increase while the first expectation, $W^0$, is large enough to drive the increase term of the second expectation, $W^1$, larger than the decrease term.

The graphs also illustrate the longer term memory capabilities of a multi-leveled Adaptrode. In effect, the second and third expectations are of different time domains. That is each additional level or expectation of a multi-leveled Adaptrode has a slower response time. Although the first expectation changes relatively fast in response to the input signal, it is bounded by the subsequent expectations.

Figure 16D:
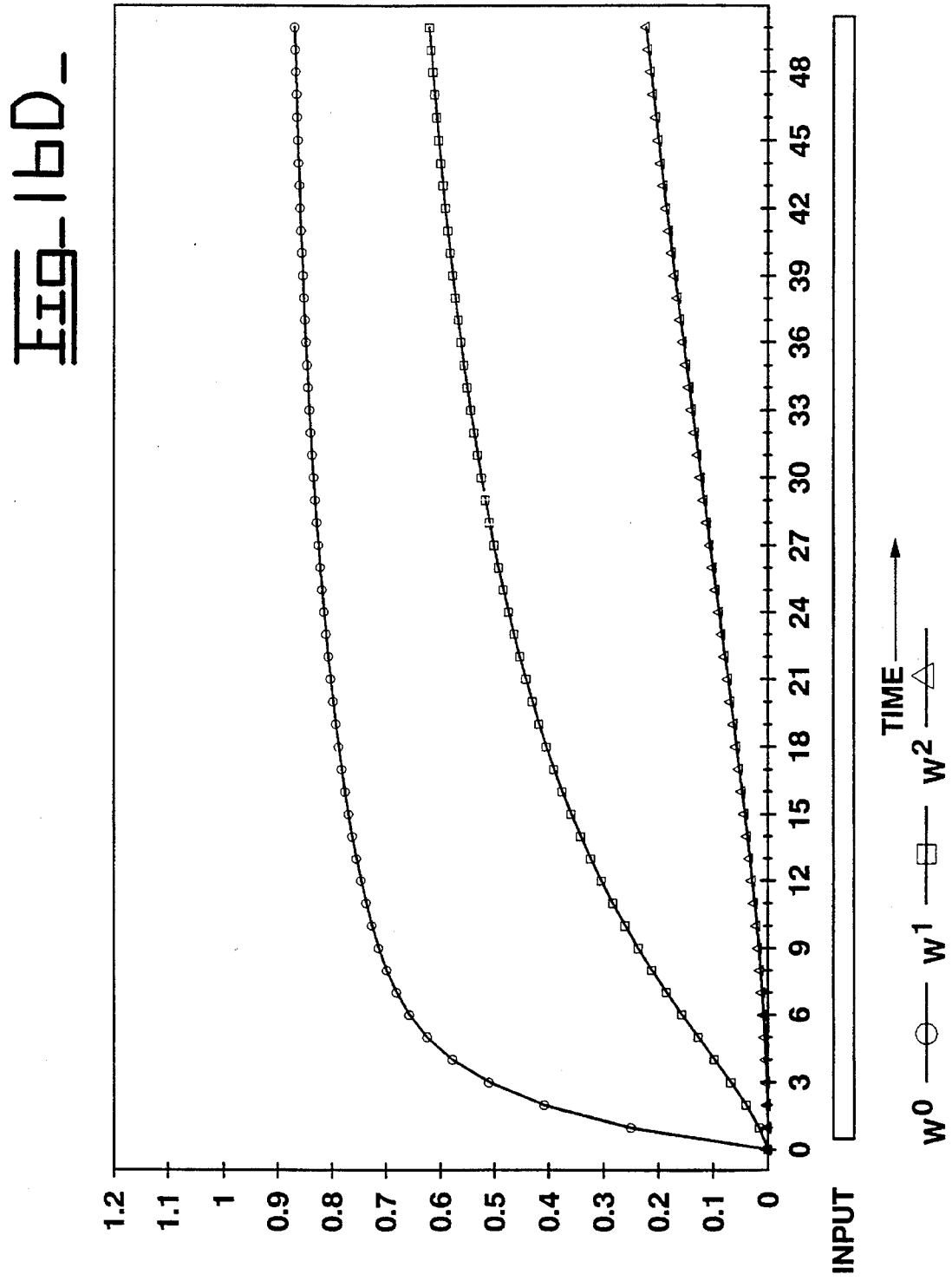
FIG. 16D is a graph illustrating the responses of the expectations of a three-leveled Adaptrode with nonlinear gains to a high intensity, saturating input signal.
Figure 17C:
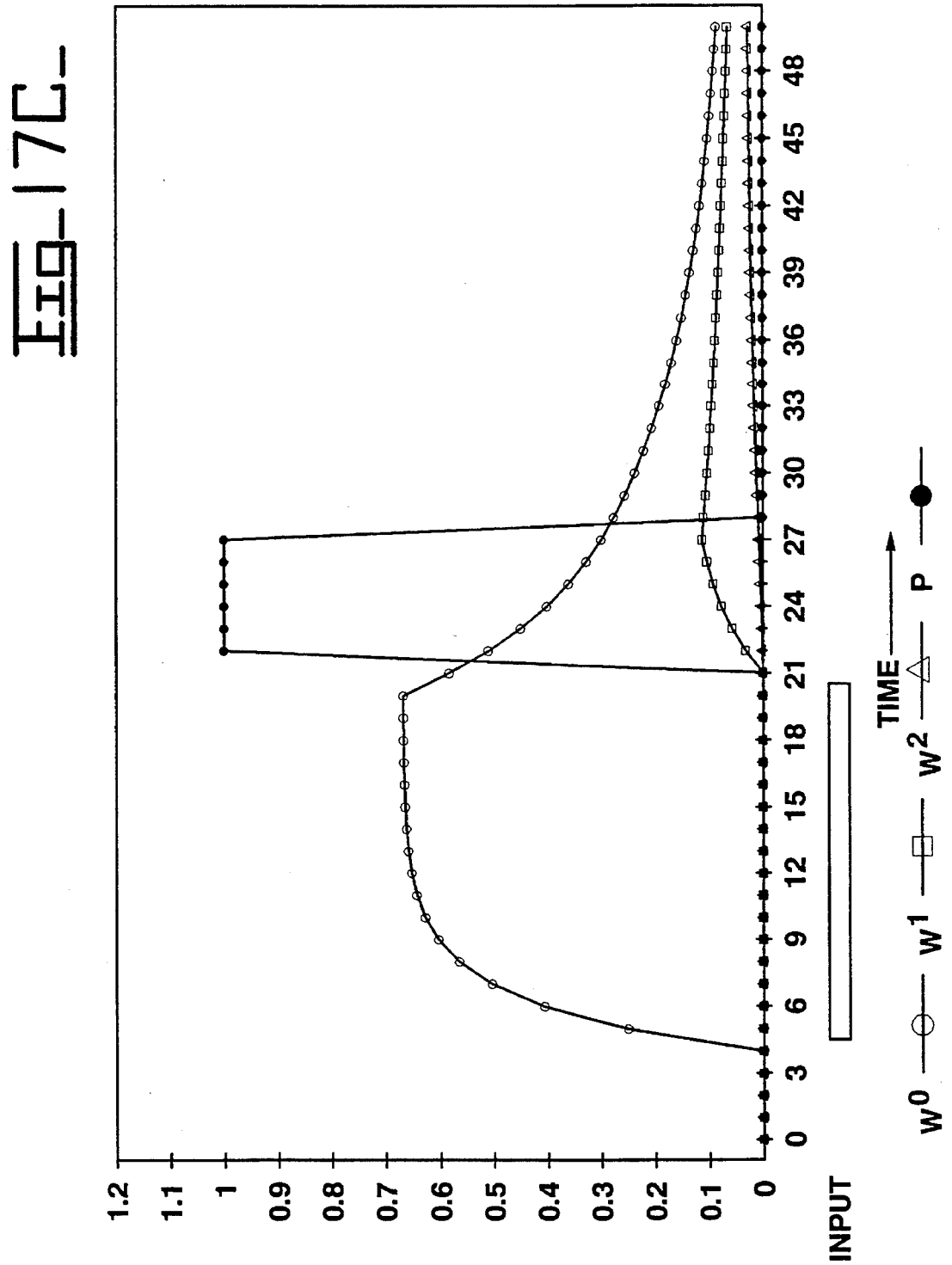
FIG. 17C is a graph illustrating the responses of the expectations of a three-leveled Adaptrode with nonlinear gains to a high intensity, long duration input signal, wherein the second expectation is gated.
Figure 17D:
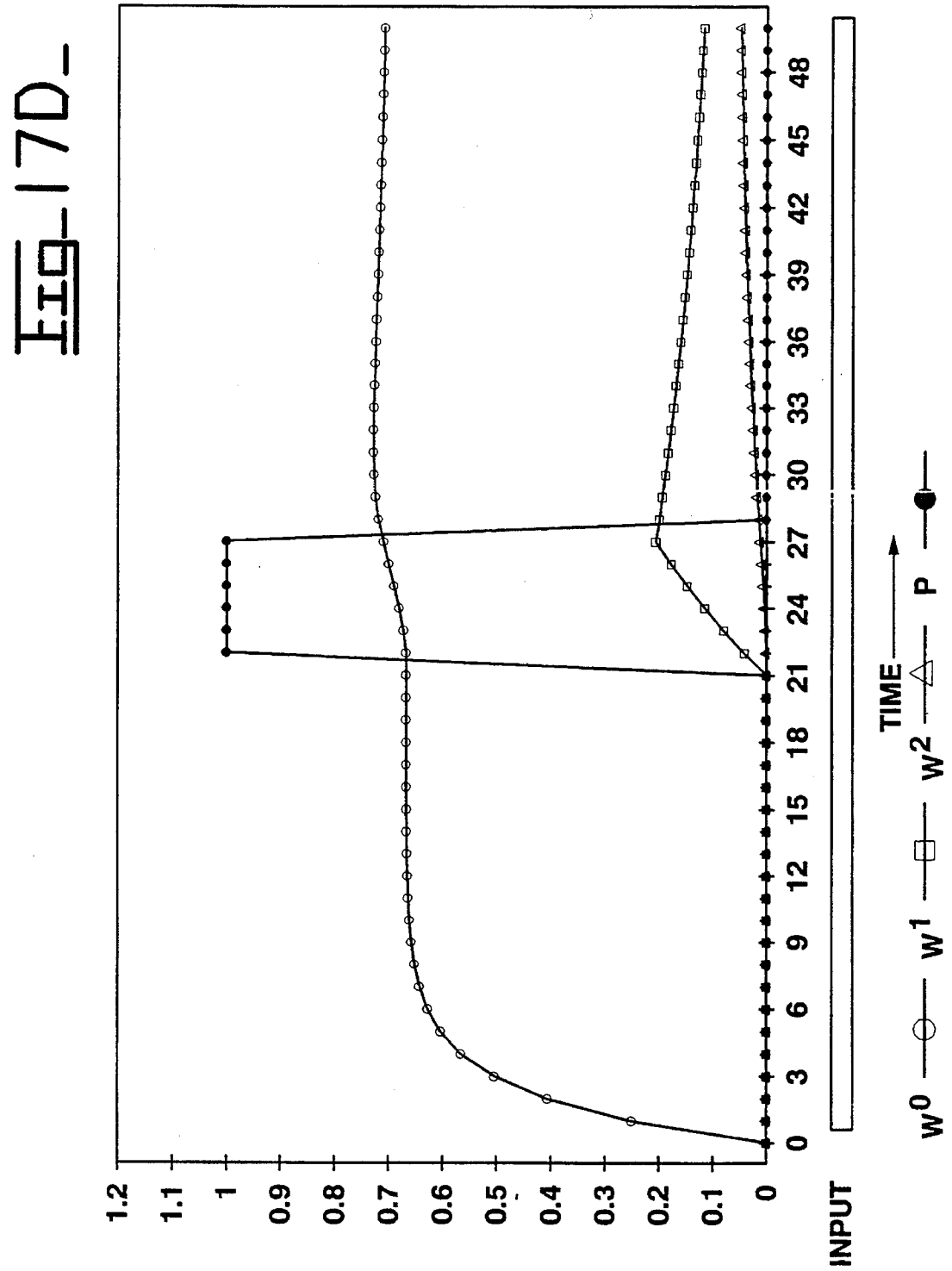
FIG. 17D is a graph illustrating the responses of the expectations of a three-leveled Adaptrode with nonlinear gains to a high intensity, saturating input signal, wherein the second expectation is gated.
Figure 17F:
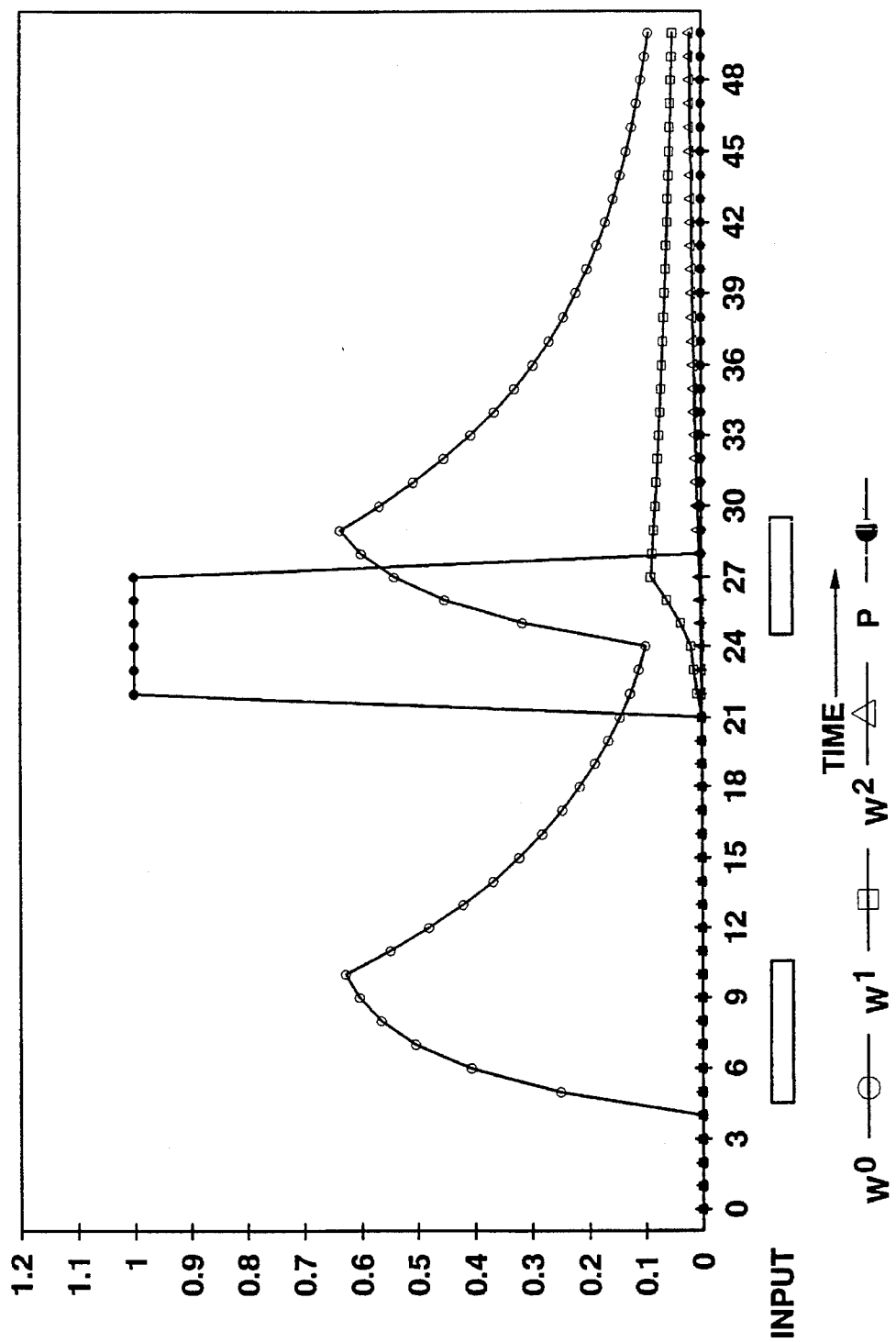
FIG. 17F is a graph illustrating the responses of the expectations of a three-leveled Adaptrode with nonlinear gains to a sequential input signal, wherein the second expectation is gated.
Figure 18A:
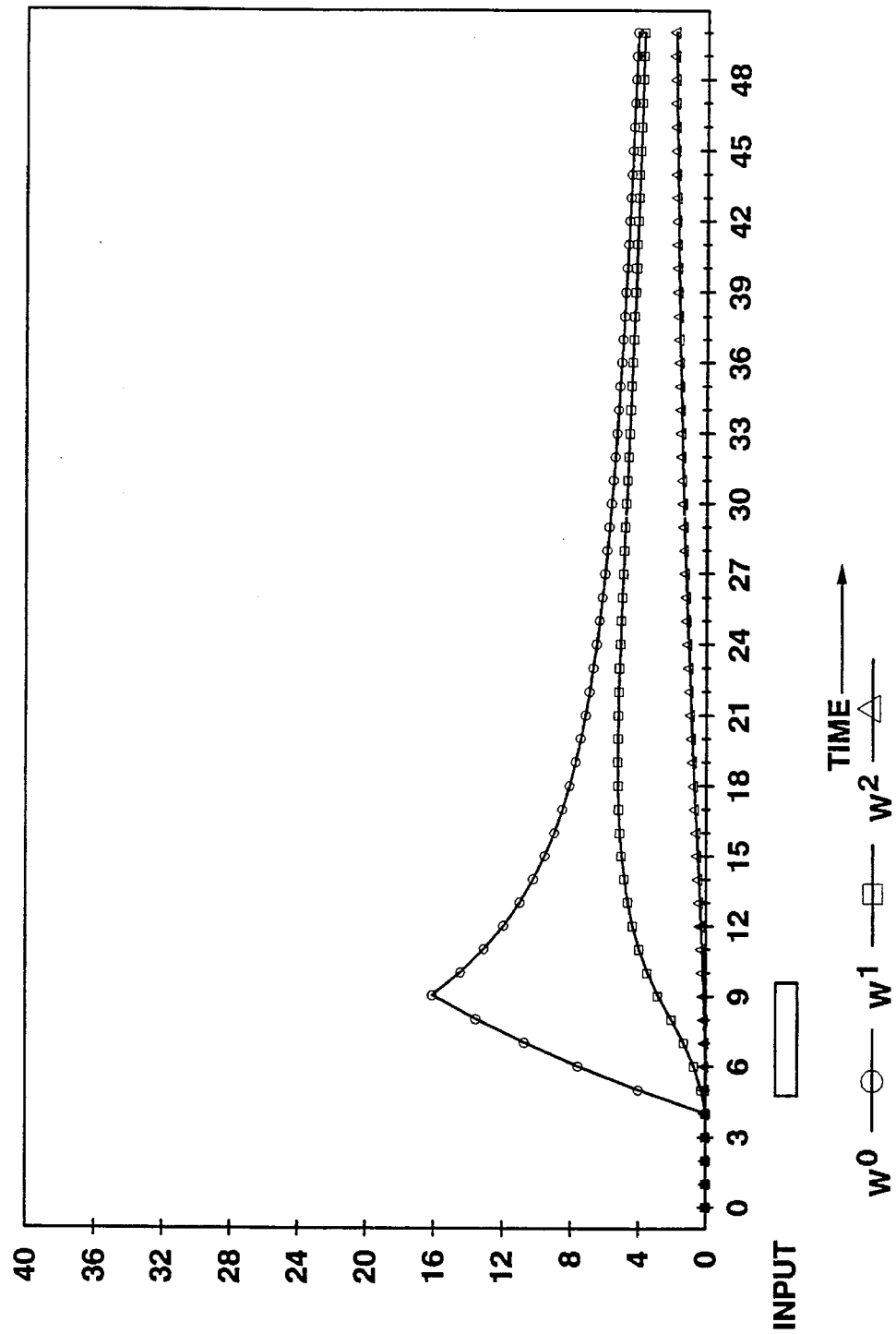
FIG. 18A is a graph illustrating the responses of expectations of a three-leveled Adaptrode to a high intensity, short duration input signal, wherein the first expectation has a linear gain.
Figure 18C:
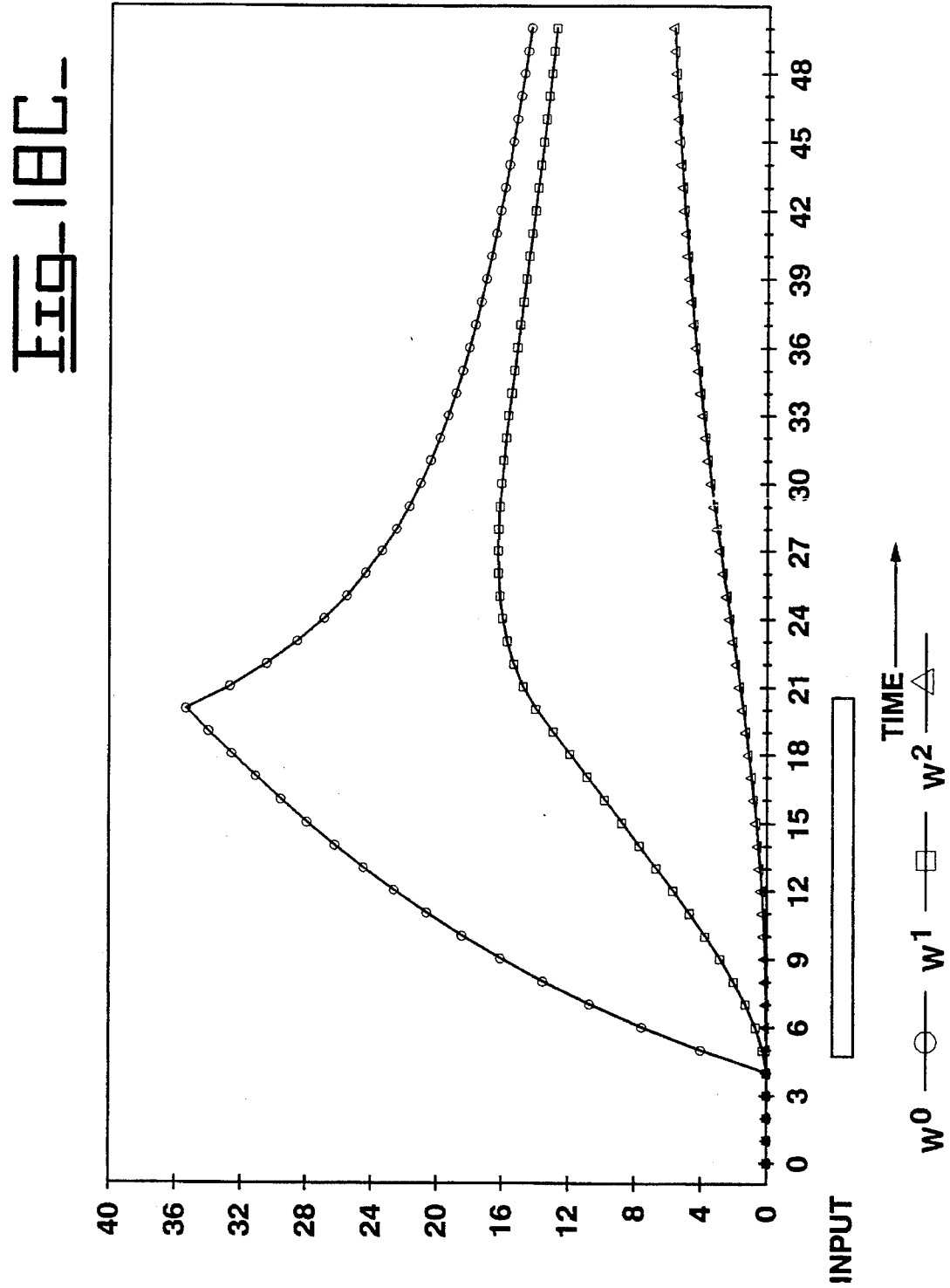
FIG. 18C is a graph illustrating the response of the input expectations of a three-leveled Adaptrode to a high intensity, long duration input signal, wherein the first expectation has a linear gain.
Figure 19E:
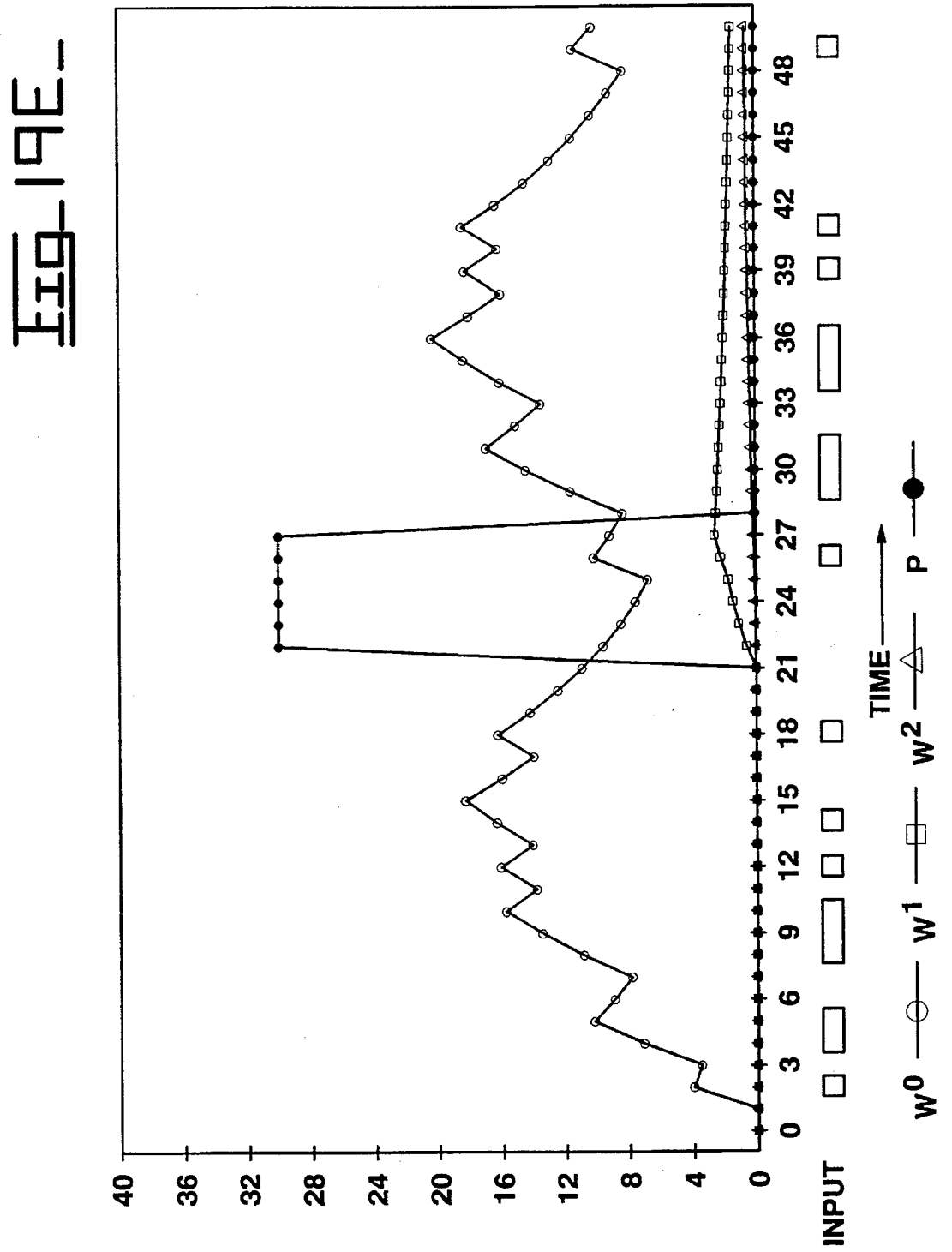
FIG. 19E is a graph illustrating the responses of the expectations of a three-leveled Adaptrode to a stochastic input signal, wherein the first expectation has a linear gain and the second expectation is gated.

In fact, although the first expectation, $W^0$, will saturate in response to a continuous input signal, the subsequent expectation will rise at a much slower rate. As shown in FIG. 16D, the second and third expectations, $W^1$, $W^2$, will continue to increase, although at a much slower rate, while the first input expectation is saturated. When the input signal finally becomes zero again, the first expectation will begin to decay at the rate governed by the decrease term. However, it will be bounded by the second expectation. The second expectation decays at a much slower rate so it will hold up the first expectation depending on how long a duration the input signal was non zero and, therefore, how high the second expectation was driven. Likewise, the third expectation will hold up or prevent the decay of the second expectation.

For a given expectation ($W^l$), the subsequent expectation ($W^{l-1}$) also affects the decay rate, this is illustrated by FIG. 16E, in which a stochastic input signal is applied to a three-leveled Adaptrode. The input signal has the effect of driving up the level of the first expectation, $W^0$. The second expectation, $W^1$, is driven by the first expectation And the third expectation is driven by the second expectation. When the input signal is zero, the decrease term of the first expectation is larger than the increase term and therefore the net modification to the first expectation is negative. However, the decrease term of the first expectation is a function of the difference between the first expectation and the second expectation. Therefore, as shown, the higher the second expectation is, the lower the decay rate for the first expectation.

This is more clearly shown in FIG. 16F in which a sequential input signal is applied to a three-leveled adaptrode. In a first time period the input signal becomes nonzero (1.0). In a second time period the first expectation decays at a rate defined by the first decay constant and the current value of the second expectation. In a third time period, the input signal becomes nonzero again and the first expectation rises. In a fourth time period, the input signal becomes zero again and the first expectation decays. However, the decay rate in the fourth time period is less than the decay rate in the second time period because the second expectation has been driven to a higher level by the first expectation.

In FIGS. 17A–17F, the expectations $W^0$, $W^1$, $W^2$ of a three-leveled Adaptrode with nonlinear gains are shown for a variety of input signals. Further, the second expectation is gated by a potentiation signal, P.

The first expectation is determined by equation 9A. The second expectation is determined by:

$$W^1(t) = W^1(t - \Delta t) + P \cdot \alpha^1 \cdot [W^0 - \quad \text{EQN. 10A}$$
$$W^1(t - \Delta t)] - \delta^1 \cdot [W^1(t - \Delta t) - W^2(t - \Delta t)].$$

The third expectation is determined by:

$$W^2(t) = W^2(t - \Delta t) + \alpha^2 \cdot [W^1 - \quad \text{EQN. 10B}$$
$$W^2(t - \Delta t)] - \delta^2 \cdot [W^2(t - \Delta t) - W^E].$$

In these examples, the potentiation signal, P, is simply a zero or a one. However, the potentiation signal may be any value.

The input signals used for the examples in FIGS. 17A–17F are the same as the input signals for FIGS. 16A–16F, respectively. In each example, the potentiation signal is initially zero and at a predetermined time, the potentiation signal becomes one. It is important to notice in each Figure, that the second and third expectations do not "learn" or rise until the potentiation signal is one. Also it should be noted, that the potentiation signal does not affect the decay rate of the second and third expectations.

With reference to FIGS. 18A–19F, the expectations, $W^0$, $W^1$, $W^2$ of a three-leveled Adaptrode in which the first expectation has a linear gain, is shown for a variety of input signals. In each example the first rise constant, $\alpha^0$, is set at 4 and the decay constant, $\delta^0$, is set at 0.125. The second rise and decay constants, $\alpha^1$, $\delta^1$, are set at 0.0625 and 0.0312, respectively. The third rise and decay constants, $\alpha^2$, $\delta^2$, are set at 0.0156 and 0.0078, respectively.

In FIGS. 18A–19F, the input signals are similar to the input signals of FIGS. 16A–16F. In FIGS. 19A–19F, the second and third expectations are gated by the potentiation signal, P, as in FIGS. 17A–17F. The potentiation signal, however, is either zero or one (for purposes of illustration the potentiation signal is scaled to 30). The results are similar to those illustrated by the nonlinear models.

With reference to FIG. 20 an Adaptrode based neuron or Neuristor 2002 is shown. The Neuristor 2002 includes an array of input Adaptrodes. The input Adaptrode array 2004 includes a plurality of adaptrodes. The number of adaptrodes is generally denoted by J. Each input Adaptrode 2004(j) has an associated input signal $X^j$.

The result signal, $r^j$, of each input Adaptrode, 2004(j) can be viewed as replacing the input signal multiplied by the weight signal of a standard neuron.

The Neuristor 2002 includes means 2006 for initializing and producing a threshold signal, T.

In one embodiment the threshold signal producing means 2006 includes means for initializing the threshold signal to a predetermined value.

In a second embodiment the threshold signal is a constant.

In a third embodiment the threshold signal producing means 2006 includes an output Adaptrode 2008 and a threshold processor 2010. The threshold signal is a function of a threshold modifying signal. The threshold modifying signal may be the first expectation or the result signal of the output Adaptrode. The threshold signal producing means 2006 acts to integrate the output of the Neuristor over time. The output Adaptrode may be gated by the result signal(s) of one or more other Adaptrodes.

The Neuristor 2002 includes means 2012 for receiving the input Adaptrode result signals, $r^j$, and the threshold signal, T, and responsively producing an output signal, O.

With reference to FIG. 21, the output signal producing means 2012 includes means for summing the result signals and producing a sigma signal. The sigma signal is compared to the threshold signal, T. The output signal producing means 2012 includes a second multiplying bar 2102 and a sign table 2104. The output of the sign table 2104 is a +1 or a −1.

Referring to FIG. 22, the sign source 2014 includes a sign table 2202 and a plurality of multipliers 2204(j). The input of an Adaptrode with an associated +1 in the sign table 2204 is said to be EXCITATORY and the input of an Adaptrode with an associated −1 in the sign table 2204 is said to be INHIBITORY.

Returning to FIG. 21, the output signal producing means 2012 includes a summation and output processor. A fourteenth summer 2106 adds the result signals, $r^j$, and subtracts the threshold signal from the result signals. A third condition block 2108 compares the output of the fourteenth summer 2106 with a predetermined value (0). A third decision block 2110 produces the output signal $X_0$. In the preferred embodiment, the third decision block 2110 produces a 1 if the condition in the condition block 2108 is true and a zero if the condition in the condition block 2108 is false.

Returning to FIG. 20, the first expectation (or the result signal) of each input Adaptrode ($A^j$) is used as an interaction signal (h) in the subsequent Adaptrode ($A^{j+1}$), as shown by the arrows. It should be recognized that having each Adaptrode gated by the preceding Adaptrode is for discussion purposes only.

Generally, signals between input adaptrodes which are used for gating are referred to as local interaction signals. Further, the result signal of the output Adaptrode 2008 is available for gating as shown by the arrows.

Figure 23:
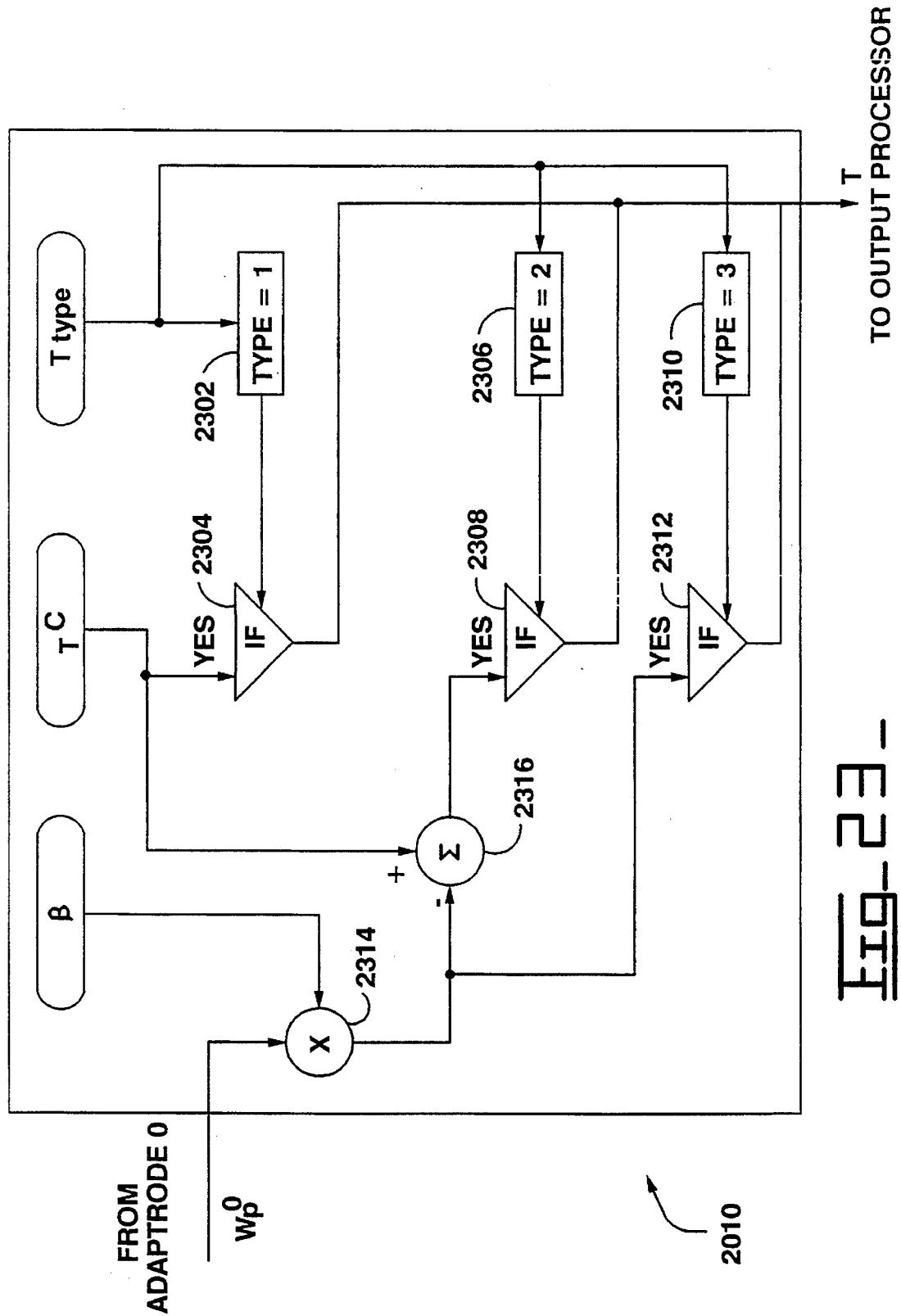
FIG. 23 is a schematic of the threshold processor of FIG. 20.

With reference to FIG. 23, a block diagram of the threshold processor 2010, according to an embodiment of the present invention. The threshold processor 2010 allows for three types of threshold signals. The threshold signal is defined by T_type. If T_type is one, then the threshold signal is a constant having a magnitude of $T^C$. If T_type is two, then the threshold signal, T, is the difference between the input of the threshold processor 2010 multiplied by a constant and the constant, $T^M$. In one embodiment, the input to the threshold processor 2010 is the first expectation of the output Adaptrode 2008 ($W^{00}$). In a second embodiment, the input to the threshold processor 2010 is the result signal of the output Adaptrode 2008. If T_type is three, then the threshold signal is a linear function of $W^{00}$.

The threshold processor 2010 includes fourth, fifth and sixth decision blocks 2302,2306,2310 and fourth, fifth and sixth control blocks 2304,2308,2312. A fourteenth multiplier 2314 multiplies the first expectation of the output Adaptrode 2308 by a constant, β. A fifteenth summer 2316 subtracts the output of the fourteenth multiplier 2314 from the constant, $T^C$.

Referring to FIG. 24, a graphical representation of the first input Adaptrode and the second input Adaptrode, in which the first Adaptrode is used to gate the second expectation of the second Adaptrode is shown. Each expectation is generally denoted by, $W^{ab}$. Where a refers to the expectation level and b refers to the input Adaptrode.

Typically, neural networks may be implemented using a variety of technologies. These include such "standard" technologies as very large scale integration (VLSI), software simulators and development systems, and special purpose hardware systems and "newer" technologies such as optical processors.

Figure 25A:
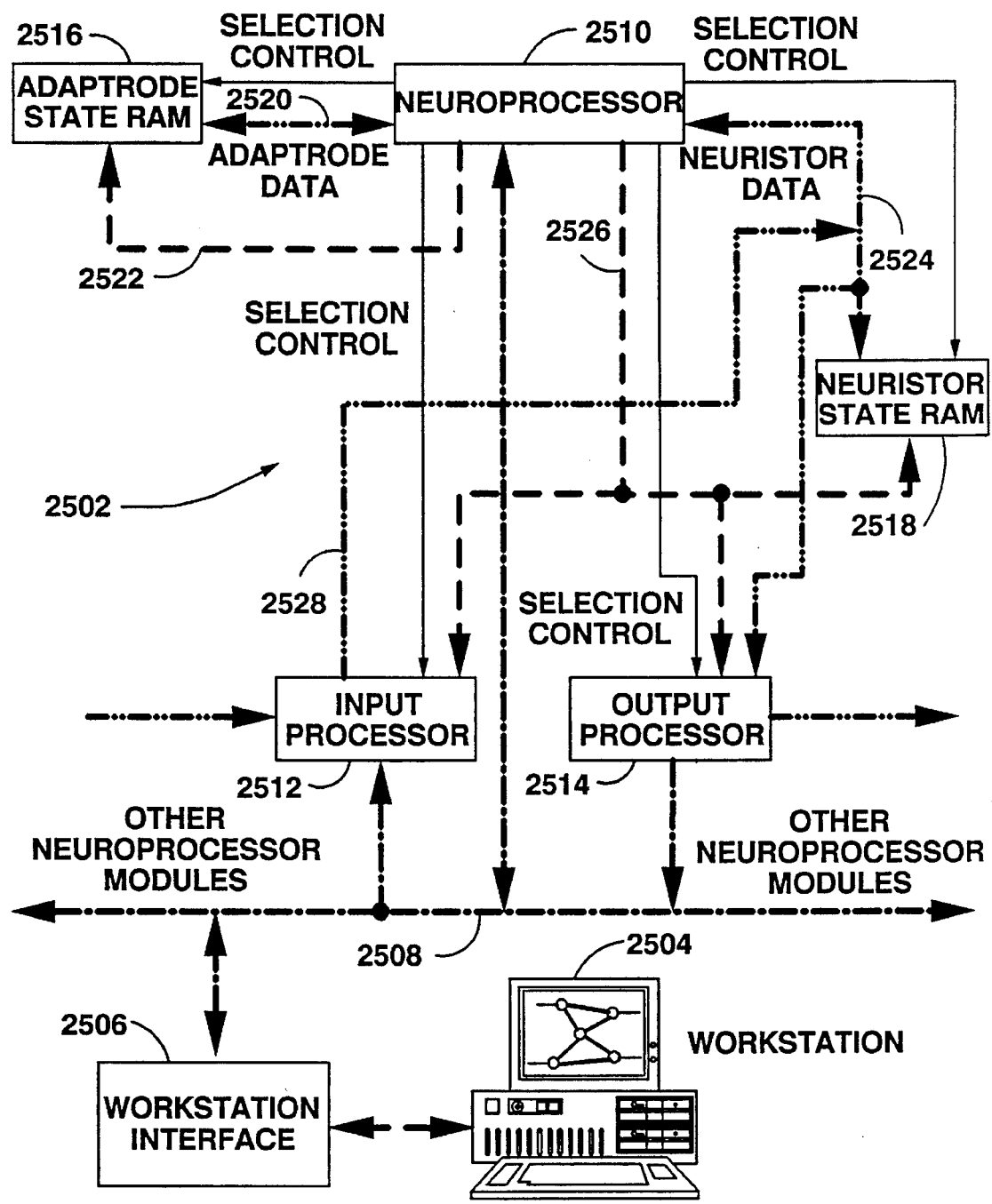
FIG. 25A is a block diagram of a Neurocomputer architecture, including a workstation and a Neuroprocessor.

With reference to FIG. 25, a legend is shown for the FIGS. 25A, 26, and 27.

With reference to FIG. 25A, a block diagram of the hardware architecture of a Neuristor based neural network (Neurocomputer) 2502. The architecture of FIG. 25A is especially suitable for a VLSI implementation, but the present invention is not limited to such.

The Neurocomputer 2502 includes a workstation 2504 for inputting data and for providing an interface to the network. A workstation interface 2506 connects the workstation to a data bus 2508. The data bus or Neurobus 2508 is used to pass data and control signals from the workstation 2506 to the network 2502, from the workstation 2506 to other Neurocomputers connected to the Neurobus (not shown), and between Neurocomputers.

The Neurocomputer architecture is not constructed to any size or network arrangement. That is, one of its important features is the flexibility to implement different network structures.

The Neurocomputer 2502 includes a Neuroprocessor 2510. The Neuroprocessor 2510 updates the state variables of the current Neuristor (for example, the threshold signal) and the state variables of the Adaptrodes of the current Neuristor and controls the flow of data within the network and between the Neurobus 2508.

An input processor 2512 receives signals from the outside world (the input signals) and passes the data to the Neuroprocessor 2510. The input processor 2512, includes a plurality of converters (for example, analog to digital or frequency to digital) for converting the input signals into appropriate digital signals for use by the Neurocomputer 2502.

An output processor 2514 receives data from the Neuroprocessor 2510 and passes the data to the outside world. In the preferred embodiment, the output processor 2514 includes a digital to analog convert (D/A) for converting the data to an appropriate signal.

The Neurocomputer 2502 includes random access memory (RAM) for storing network parameters. In the preferred embodiment, the memory includes Adaptrode state RAM 2516 and Neuristor state RAM 2518. The Adaptrode state RAM 2516 and Neuristor state RAM 2518 store state variables and constants for each Adaptrode and Neuristor within the network, respectively. For example, the Adaptrode state RAM 2516 includes the expectations and the first sign table 1504. Likewise, the Neuristor state RAM 2518 includes the output(s), the threshold signal, and the addresses (within the Adaptrode state RAM 2516) of the Adaptrodes for each Neuristor. In the preferred embodiment, the Adaptrode state RAM 2516 and Neuristor state RAM 2518 are separate to increase speed through parallel processing. However alternatively, they could be separate parts of a single RAM memory.

A first data bus 2520 and a first address bus 2522 connect the Neuroprocessor 2510 and the Adaptrode state RAM 2516. A second data bus 2524 and a second address bus 2526 connect the Neuroprocessor 2510 and the Neuristor state RAM 2518. The second data bus 2524 connects the input processor 2512 and the Neuroprocessor 2510. The Neuroprocessor 2510, the input processor 2512, and the output processor 2514 are connected to the workstation 2504 through the Neurobus 2508.

With reference to FIG. 26, the Neuroprocessor 2510 includes a Neuristor Processing Unit (NPU) 2602 and an Adaptrode type lookup table 2606. A fourth data bus 2606 passes data between the Adaptrode type lookup table 2604, and a bus interface unit 2610. A control unit 2608 controls the timing and operation of the Neurocomputer 2502 through a number of control lines.

The Adaptrode lookup table 2604 defines the types of Adaptrodes found within the network (see below).

A bus interface Unit 2610 controls the flow of data and instructions from the control unit 2608, the Adaptrode data and addresses buses 2520,2522 and the Neuristor data and addresses buses 2524,2526 to the Neurobus 2508. The Neuroprocessor 2510 also includes an Adaptrode array processor 2612.

The Adaptrode array processor 2612 is connected to the Adaptrode data and address buses 2520,2522. The Adaptrode array processor 2612 is also connected to the threshold processor 2010 and the summation and output processor 2012 by a fifth data bus 2614. A sixth data bus 2616 passes data between NPU 2602, the threshold processor 2010 and the summation and output processor 2012. The Adaptrode array processor 2612 is controlled by the NPU. The array processor is designed to manipulate the Adaptrodes in a Neuristor.

With reference to FIG. 27, the Adaptrode array processor 2612 includes an Adaptrode array control 2702 and a number of Adaptrode processors 704.

The Adaptrode array processor 2612 processes a number (in this embodiment 16) of Adaptrodes at a time. The number of Adaptrodes the processor 2612 is able to handle is typically smaller than the total number of Adaptrodes within the Neuristor. The NPU 2602 loads the processor 2612 with Adaptrode data and keeps track of the Adaptrodes within the processor 2612.

The Adaptrode array processor 2612 computes the result signals for each Adaptrode. The result signals are time multiplexed to the summation and output processor 2012. Then the address of the input for each Adaptrode is relayed to the address bus by a pulse source address register. The input is put into a pulse input register 2710 by a pulse input assembler 2712.

The address of the Adaptrode and Neuristor of the source of the hurdle (or gating) signal are put on the address bus by the hurdle source Adaptrode address register 2708 and the hurdle source Neuristor address register 2706, respectively. The hurdle value is returned over the data bus.

In the following discussion, portions of pseudocode illustrating the operation of a Neuristor based network are used. The pseudocode is for a discrete system, such as the Neurocomputer described above. The pseudocode may also be used to implement a computer software program. For the purposes of explanation, comments are included enclose by "(*" and "*)".

In the pseudocode, a numeric technique has been used in some computations. The numeric technique works in the integer domain. Multiplications by fractional constants are replaced by right shifts, that is, divisions of some power of two. This approach introduces some noise (error) into the system, but provides an algorithm that could result in fast hardwired logic. Such numeric techniques are well-known in the art. Therefore, no further discussion is given.

The pseudocode constitutes a complete and workable design of the preferred embodiment of the present invention. A software program may be readily coded from the pseudocode. The process of writing software code from pseudocode is a mere mechanical step for one skilled in the art.

The following data structures are used:

| TYPE | |
|---|---|
| ALPHA | |
|   level | INTEGER |
|   alpha | INTEGER |
|   alpha_dctr | INTEGER |
|   alpha_r | INTEGER |
| end ALPHA | |
| DELTA | |
|   level | INTEGER |
|   delta | INTEGER |
|   delta_dctr | INTEGER |
|   delta_r | INTEGER |
| End DELTA | |
| WEIGHT | |
|   level | INTEGER |
|   weight | INTEGER |
| End WEIGHT | |
| GATE | |
|   level | INTEGER |
|   gate | INTEGER |
| End GATE | |
| HURDLE_SOURCE | |
|   s_index | INTEGER |
|   a_index | INTEGER |
|   h_sign | BIT |
| End HURDLE_SOURCE | |
| HURDLE | |
|   level | INTEGER |
|   value | INTEGER |
|   hurdle_s_l | HURDLE_SOURCE |
| End HURDLE | |
| INSLOT | |
|   index | INTEGER |
|   value | INTEGER |
| End INSLOT | |
| OUTSLOT | |
|   index | INTEGER |
|   source_Nrstr | INTEGER |
|   value | INTEGER |
| End OUTSLOT | |
| ADAPTRODE_TYPE | |
|   index | INTEGER |
|   weight_max | INTEGER |
|   weight_equil | INTEGER |
|   resp_dec | INTEGER |
|   excit_t | INTEGER |
|   kappa | REAL |
|   a_l | ALPHA |
|   d_l | DELTA |
| End ADAPTRODE_TYPE | |
| ADAPTRODE | |
|   index | INTEGER |
|   owner | INTEGER |
|   source | INTEGER |
|   s_type | BIT |
|   a_type | INTEGER |
|   response | INTEGER |
|   w_l | WEIGHT |
|   g_l | GATE |
|   h_l | HURDLE |
| End of ADAPTRODE | |
| NEURISTOR | |
|   index | INTEGER |
|   name | STRING |
|   o_out | BIT |
|   n_out | BIT |
|   sigma | INTEGER |
|   t | INTEGER |
|   t_set | INTEGER |
|   t_type | INTEGER |
|   ad_l | ADAPTRODE |
|   ad_cnt | INTEGER |
| End NEURISTOR | |
| NETWORK | |
|   i_l | INSLOT |
|   ad_t_l | ADAPTRODE_TYPE |
|   n_l | NEURISTOR |
|   o_l | OUTSLOT |
|   CONTROL | |
|     i_cnt | INTEGER |
|     n_cnt | INTEGER |
|     o_cnt | INTEGER |
|     atype_cnt | INTEGER |
|     CLOCK | |
|       tick | INTEGER |
|       frame | BIT |
|       sec | INTEGER |
|       min | INTEGER |
|       hr | INTEGER |
|     End CLOCK | |
|   End CONTROL | |
| End NETWORK | |

The level variables of ALPHA, DELTA, WEIGHT, GATE, and HURDLE refer to the expectation level of the current Adaptrode. The alpha and delta variables for ALPHA and DELTA hold the current values of the rise and decay constants for the expectation level set by the level variables.

The weight and the gate variables of WEIGHT and GATE hold the expectation value and the gate value that must be hurdled for the expectation level set by level, respectively.

The s_index variable of HURDLE_SOURCE is the index of the source Neuristor or input (within inslot, see below). The a_index is the index of the Adaptrode within the Neuristor or is equal to −1 if the hurdle source is Inslot. The h_sign implements the sign table 1504. The index variables of Inslot and Outslot refer to the index of the input and output within the Inslot and Outslot, respectively.

The hurdle_s_l of HURDLE is a list of the hurdle source (interaction) signals as defined by HURDLE_SOURCE.

The _l variables may be constructed of arrays, linked lists or similar data structures.

The value variables of the Inslot and Outslot data structures are used to store the current value of the inputs and outputs, respectively. The source_Nrstr variable holds the index of the source Neuristor of the output value.

In the preferred embodiment, the network is composed of only a few Adaptrode types. For example, a network may consist of 100 Neuristors each having 10 Adaptrodes for a total of 1000 Adaptrodes. However, there might only be 10 types of Adaptrodes. The index variable of ADAPTRODE_TYPE is used to identify the type of Adaptrode. The weight_max and the weight_equil variables are used to define the maximum expectation and the equilibrium expectation ($W^M, W^E$), respectively. The resp_dec is used to define the decay constant of the result signal ($\lambda$ of EQN. 3B). The excit_t variable corresponds to the sign table 2202 and sets the input type as INHIBITORY or EXCITATORY. 'a_l' and d_l are of types ALPHA and DELTA, respectively.

The index and owner variables of ADAPTRODE give the index of the Adaptrode with respect to the Neuristor and the index number of the owner Neuristor, respectively. The source and s_type variables give the index of the input and the type of input (INSLOT or ADAPTRODE). The w_l, g_l, and h_l structures contain the weight, gate, and hurdle variables for each level of the Adaptrode.

The index of NEURISTOR is used to identify the Neuristor within the network. Optionally, the NEURISTOR is associated with a name (of type STRING). The o_out and n_out variables store the current output and the previous output of the Neuristor.

In an alternate embodiment, the o_out and n_out variables may be contained in a single variable of type BITFIELD. The current output would be stored in bit 0, the previous output would be stored in bit 1, and so on. In addition, the Adaptrode data type would include a numeric field indexing the bit to be read. This provides a time lag capability for large networks.

The sigma variable is used for reference only (see below). The t_set and the t_type are variables used to determine the threshold of the Neuristor (described below). 'ad_l' is a list of the Adaptrodes within the Neuristor. Lastly, the ad_cnt variable stores the number of Adaptrode within the Neuristor, including the output Adaptrode.

The i_l and o_l of NETWORK are a list of input and output variables for the network. 'ad_type_l' and n_l contain the Adaptrode types and the Neuristors of the Network. As above, i_l, o_l, ad_t_l, and N_l may be arrays, linked lists or similar data structures.

The CONTROL data structure within NETWORK is used to set up certain control parameters of the network. 'i_cnt', n_cnt, o_cnt, and atype_cnt are constants for a certain network. They contain the number of inputs, Neuristors, outputs, and Adaptrode types of the network, respectively.

The CLOCK is used for timing (see below).

The system, whether in hardware or software, has the ability to run multiple networks. For the purpose of discussion, only one network, N1, is shown. The main loop of the network is described by the following pseudocode:

```
CONSTANTS
    MAX_INSLOTS;
    MAX_OUTSLOTS;
    MAX_NEURISTORS;
    MAX_ADAPTRODES;
    MAX_LEVELS;
    MAX_HURDLES;
    INSLOT_SOURCE;
```

-continued

```
VARIABLES
    N1: NETWORK;
BEGIN
    INITIALIZE NETWORK;
        (* Initialize global variables and data
        structures.*)
    INITIALIZE CLOCK;
        (* Set CLOCK to zero. *)
    READ NETWORK_CONFIGURATION_FILE;
        (* Read the network configuration file and
        initializes all state and control
        variables. *)
    DO
        IF COMMAND_TRIGGER ACTIVATED
        THEN GET COMMAND;
            (* Check COMMAND_TRIGGER for presence
            of new COMMAND. Commands include
            those relevant at the Neuristor,
            Adaptrode and hurdle level views. *)
        IF COMMAND = QUIT THEN EXIT;
        IF INSLOT_TRIGGER ACTIVATED
        THEN PROCESS_INSLOT;
            (* Check INSLOT_TRIGGER for presence of
            new input. *)
        UPDATE_NETWORK;
            (* Run PROCEDURE UPDATE_NETWORK. *)
        DISPLAY OUTSLOT RESULTS;
            (* DISPLAY RESULTS. *)
        PROCESS_HURDLES;
    FOREVER
END
```

```
PROCEDURE UPDATE_NETWORK
BEGIN
    FOR count = 1 TO 10 DO
        FOR a = 1 TO N1.Control.atype_cnt DO
        DECREMENT_ALPHA_DOWNCOUNTS;
        DECREMENT_DELTA_DOWNCOUNTS;
            (* Decrement alpha_dctr and delta_dctr
            for each level of each type of
            Adaptrode. *)
        END
        FOR i = 1 TO N1.Control.n_cnt DO
            (* For each neuristor do the
            following: *)
            N1.n_1[i].o_out = N1.n_1[i].n_out;
                (* Store the new output in the old
                output. *)
            N1.n_[i].sigma = 0;
            N1.n_[i].n_out = FALSE;
                (* Reset sigma and the new output. *)
            COMPUTE_THRESH(N1.n_[i].t_type, i);
                (* Run PROCEDURE COMPUTE
                THRESH. *)
        END
        FOR i = 1 TO N1.Control.n_cnt DO
            (* For each neuristor do the
            following: *)
            N1.n_1[i].sigma = PROCESS_ADAPTRODES(i);
            IF N1.n_1[i].sigma > N1.n_1[i].t
            THEN N1.n_1[i].n_out = TRUE;
                (* If sigma is greater than the
                new output is TRUE. *)
            COMPUTE_RESPONSE(i,0);
            COMPUTE_NEW_WEIGHTS(i,0);
                (* Run the procedures COMPUTE_RES-
                PONSE and COMPUTE_NEW_WEIGHTS
                for the Output Adaptrode. *)
        END
END
```

The procedure UPDATE_NETWORK cycles through the network a total of 10 times per sample frame. In this embodiment, there are 10 ticks per frame and 30 frames per second.

```
Procedure COMPUTE_THRESH (t_t: INTEGER,
i: INTEGER)
BEGIN
    DO CASE OF t_t
    CASE 1: (* Threshold is a constant. *)
        N1.n_1[i].t = N1.n_1[i].t_set;
        CASE 2:   (* Threshold decreases with active
                     input. *)
            N1.n_1[i].t = N1.n_1[i].t_set
                - N1.n_1[i].ad_1[0].response;
        CASE 3:   (* Threshold increases with active
                     input. *)
            N1.n_1[i].t = N1.n_1[i].t_set
                + N1.n_1[i].ad_1[0].response;
    END
END
```

```
FUNCTION PROCESS_ADAPTRODES(i; INTEGER)
j,sigma: INTEGER
BEGIN
    sigma := 0
    FOR j:=1 TO N1.n_1[i].ad_cnt-1 DO
        (* For all input Adaptrodes of the Neuristor
           set by i, do the following: *)
        COMPUTE_RESPONSE(i,j);
        sigma := sigma
            + N1.n_1[i].ad_1[j].response;
        COMPUTE_NEW_WEIGHTS(i,j);
    END
    PROCESS_ADAPTRODES = sigma
END
```

The FUNCTION PROCESS_ADAPTRODES sums the current responses of all input Adaptrodes and processes new Adaptrode states for all the Adaptrodes in the Neuristor, i.

```
PROCEDURE COMPUTE_RESPONSE (i,j: INTEGER)
input: INTEGER
WITH N1.n_1[i].ad_1[j] DO
BEGIN
    IF s_type = INSLOT_SOURCE THEN
        input = PULSE_CODE(N1.i_1[source]);
        (* The Procedure PULSE_CODE returns a 1
           with a probability proportional to the
           gray scale value stored in
           inslot,'source'. Otherwise, it returns
           a zero. *)
    ELSE
        input =
            NOISE(N1.n_1[source].o_out);
        (* The Procedure NOISE returns the
           inverted value of N1.n_1[source].o_out
           with a probability proportional to the
           noise factor provided by the user, for
           example, 10%. Otherwise, it returns
           the given value. *)
    END
    (* Get input from a Neuristor or from
       the inslot pointed to by source. *)
    If input > 0 THEN
        response = w_1[0].weight *
            N1.ad_t_1[a_type].excit_t *
            N1.ad_t_1[a type].kappa;
        w_1[0].weight = w_1[0].weight
            + RIGHT_SHIFT (
                N1.ad_t_1[a_type].weight_max
                - w_1[0].weight],
                N1.ad_t_1[a_type].a_1[0].alpha);
    ELSE
        response = response - RIGHT_SHIFT(
            response, N1.ad_t_1[a_type].resp_dec);
    END
    (* Update the response of the
       Adaptrode and the first weight
       (expectation). *)
END
```

The PROCEDURE COMPUTE_RESPONSE computes the current response of the Adaptrode, j, of Neuristor, i, and update w_1[0].weight.

```
PROCEDURE COMPUTE_NEW_WEIGHTS (i,j: INTEGER)
k: INTEGER
WITH N1.n_1[i].ad_1[j] DO
BEGIN
    FOR k := 1 TO MAX_LEVELS DO
        IF (N1.ad_t_1[a_type]
            .a_1[k].alpha_dctr = 0)
            AND
            (N1.n_1[i].ad_1[j].h_1[k].value >
                g_1[k].gate)
            THEN POTENTIATE(i,j,k);
    END
    FOR k := 0 TO MAX_LEVELS levels do
        IF N1.ad_t_1[a_type].d_1[k].delta_dctr = 0 THEN
            DECAY (i,j,k)
    END
END
```

```
PROCEDURE PROCESS_HURDLES (i,j,k: INTEGER)
c,h: INTEGER
h = 0;
WITH N1.n_1[i].ad_1[j].h_1[k] DO
BEGIN
    FOR c = 1 TO MAX_HURDLES DO
        WITH hurdle_s_1[c] DO
        IF a_index < 0 THEN
            IF h_sign > 0 then
                h = h + N1.i_1[s_index].value
            ELSE
                h = h - N1.i_1[s_index].value
            END
        ELSE
            IF h_Sign > 0 then
                h = h +
                    N1.n_1[s_index)
                    .ad_1[a_index].response
            ELSE
                h = h -
                    N1.n_1[s_index)
                    .ad_1[a_index].response
            END
        END
    END
    value = h
END
```

```
PROCEDURE POTENTIATE (i,j,k: INTEGER)
a: INTEGER
WITH N1.n_1[i].ad_1[j] DO
    BEGIN
        a := ad_t_1[a_type].a_1[k].alpha;
        w_1[k].weight = w_1[k].weight
            + SHIFT_RIGHT(
                (w_1[k_1].weight - w_1[k].weight), a);
                (* Shifts the difference term to the
                   right by "a" bits. *)
    END
END
```

```
PROCEDURE DECAY (i,j,k: INTEGER)
d,w : INTEGER
WITH N1.n_1[i].ad_1[j] DO
```

```
BEGIN
    d = ad_t_1[a_type].d_1[k].delta
    IF k = MAX_LEVEL THEN
        w = a_type_1[d_type].weight_equil
    ELSE
        w := w_1[k+1].weight
    END
    w_1[k].weight = w_1[k].weight
        - SHIFT_RIGHT((w_1[k].weight_w), d);
END
```

The PROCEDURE COMPUTE_NEW_WEIGHTS uses POTENTIATE and DECAY to compute the new weights for each level.

The PROCEDURE PROCESS_HURDLES determines the hurdle value given by the sum of responses from the set of sources in the hurdle array for level k.

THE PROCEDURE POTENTIATE determines the new level (k), weight value given the k−1 weight and the alpha value in a_type.

The PROCEDURE DECAY determines the new level k weight value given the k+1 weight and the delta value in a_type.

INDUSTRIAL APPLICABILITY

With reference to the drawings, and in operation, the present invention provides for a more fundamental learning capability in neural networks. The learning capabilities of the Adaptrode are not based on associativity per se, but rather, are based on the encoding of information inherent in the time-varying signal along a single input channel. The encoding process is time-explicit, and, in fact, operates in multiple time scales such that information is recorded for each of these time domains. Such an approach to information encoding provides an alternate to recurrent loops in implementing short and long-term memory. The Adaptrode does not inherently depend on a correlation with another channel to form a memory.

Associativity can arise, however, from the introduction of the gate function which prevents the encoding unless a second signal is present. Associations between two or more input signals or a combination of input and output signals can be achieved.

With reference to FIGS. 28A–28G, Adaptrodes have been used to construct an associative network 2802. The network 2802 includes first and second Neuristors 2804, 2806 each having three input Adaptrodes and an output Adaptrode ($A^{10}, A^{11}, A^{12}, A^{13}, A^{20}, A^{21}, A^{22}, A^{23}$). For reference, a legend for FIGS. 28A–28G is shown in FIG. 28.

The potentiation gating will be controlled via a local interaction between the input Adaptrodes $A^{11}$ and $A^{12}$ and between $A^{23}$ and $A^{22}$. The latter Adaptrode, $A^{12}$ and $A^{22}$, in either case is the learning Adaptrode within the respective Neuristor (as indicated by the double plate termini). That is, the rise constants for the second and third expectations of Adaptrodes, $A^{12}$ and $A^{22}$, are nonzero and the second and third expectations of Adaptrodes, $A^{11}, A^{13}, A^{21}$, and $A^{23}$ are zero.

Thresholds have been fixed and set at a value sufficient to delay output. The neuristors 2804, 2806 mutually inhibit one another so that once one Neuristor gains an advantage, it will tend to become the only responding unit. This is done through $A^{11}$ and $A^{21}$ which have inhibitory responses as indicated by the circular input.

The inputs $UCS^1$ and $UCS^2$ are taken to be two contrary (though not necessarily mutually exclusive) stimuli from the external environment. $UCR^1$ and $UCR^2$ are mutually exclusive responses. The input labeled CS is available to both Neuristors as shown. Prior to any exposure, neither $A^{12}$ nor $A^{22}$ has encoded any memory trace.

For explanation purposes, it is helpful to view the network 2802 as a simple robot controller. Here the output behavior is either to seek ($UCR^2$) or avoid ($UCR^1$) a stimulus if either a reward, $UCS^2$, for example the availability of power to recharge the batteries, or a punishment, $UCR^1$, for example, the presence of high temperatures, is associated with the respective stimulus.

In this case, suppose the stimulus (CS) is the presence of a light source. The objective is to train the robot to associate light with the availability of power so that it will seek the light source on its own accord. Note that it would have been equally possible to decide to train the network to associate light and heat.

After several trials (the number required is dependent on the magnitude of the signals, their duration and their phase relations) of joint exposure to CS and $UCS^2$, this is, in fact accomplished in FIG. 28B. Note that the exposures do not have to be made at exactly the same instance (that is, be exactly in phase). If CS exposure occurs slightly ahead of $UCS^2$—the time window being established by the αs and δs in the Adaptrodes—the occurrence of $UCS^2$ will still produce potentiation in $A^{22}$.

Signals presented to the network 2802 are stochastic and noisy (about 10% non-Gaussian noise). After as few as three trials with joint presentation at $UCS^2$ and CS in the mid-range, the network begins to appear as in FIG. 28B. As can be seen, some potentiation has occurred in $A^{22}$ as the result of local interaction between $A^{21}$ and $A^{22}$.

The network 2802 includes an inhibitory link from one unit to the other to implement mutual inhibition. This is necessary to enforce the mutual exclusion of response rule. Note, however, that the rule is a fuzzy rule in that some "leakage" of signal from CS and $UCS^1$ is possible if $UCS^1$ is slightly active, which can occur. In general, the output of $UCS^2$ will dampen the output of $UCS^1$ and vice versa, but it is not in absolute terms.

The shaded areas in each Adaptrode represent the levels for each expectation as shown in the legend. Note that each succeeding expectation overlaps the preceding expectations. Also, the relationships $W^0 \geq W^1 \geq W^2$ are always true.

Dark arrows illustrate that that line is "active". Therefore, the dark arrow in the second Neuristor 2806 is indicative of strong local interaction effect of $A^{23}$ on the learning behavior of $A^{22}$. The arrow in the first Neuristor 2804, from $A^{11}$ to $A^{12}$ represents a weak interaction and, thus, $A^{11}$ cannot contribute sufficient graded response so as to permit potentiation to occur in $A^{12}$.

FIG. 28C, illustrates the state of the network 2802 after the network 2802 has aged for some period of time without any inputs. As can be seen, the Adaptrode $A^{22}$ shows some residual memory of the association to which it has been exposed. As a consequence of this residual, the network has established a relationship between the associated signals which can be recalled, as shown in FIG. 28D. In FIG. 28D, a signal is injected at CS only. This corresponds to the robot seeing light alone. As a result of the potentiation of $A^{22}$, the input signal at $A^{22}$ will more quickly drive the first expectation, $W^0$, to a higher value than is achieved in the first expectation of $A^{12}$. In turn, this is enough to drive an output signal at $UCR^2$ resulting in an inhibitory signal damping the first Neuristor 2804.

In this way, the network 2802 has learned to exploit CS, a non-meaningful signal on its own, as a predictor of some meaningful signal (in this case power availability). The degree to which these two signals have occurred together in the past will give some degree of reliability of the predictive capability of the association. The robot can learn to seek lights (when it is low on power) and enjoy a certain degree of confidence that the association will hold.

Thus far, the network 2802 performs as might be expected from any associative learning rule. Except for the somewhat unique manner in which time is explicit and the learning process, through reinforcement, is dynamic, the network 2802 achieves essentially what any other associatively-based neural network would achieve.

But now we address a more difficult consideration. Suppose that for some short interval of time a contrary relationship exists between $UCS^1$ and CS as, for example, might happen if a fire were to break out in the robot's environment.

First, we would be concerned with the appropriate response; that is, the robot should avoid the fire.

Second, we need some means of determining the significance of this contrary condition. Is it just noise or does it represent a more permanent change in the nature of the environment?

Third, in the event that this new relationship is temporary, we certainly don't want the robot to forget the prior association since there is some possibility that the old relationship will again be the norm in the future.

In FIGS. 28E–28G, the progress of encoding contrary associations which, because they represent different time domains, can be stored readily in the network without interference, is shown. The network 2802 will be seen to respond correctly and correctly determine the level of significance to attach to the new conditions.

In FIG. 28E, the network 2802 is exposed to a strong and somewhat sustained stimulus $UCS^1$, which is contrary to its prior learning. The system will initially start to fire the second Neuristor 2806 as if responding to the availability of power. It takes some small amount of time for the first expectation value, $W^0$, of $A^{11}$ to build to a level sufficient to override, through the inhibitory link at $A^{21}$, the output of the second Neuristor 2806. However, due to the more rigorous firing of the first Neuristor 2804, it does win the competition leading to the appropriate response (avoidance) at $UCR_1$. Note that $A^{22}$ is potentiated to $W^2$ while $A^{12}$ shows potentiation only to $W^1$.

If the network is now presented with the CS input only, it will, for a short while, respond, if only weakly, with output at $UCR^1$ as in FIG. 28F. The reason is that second expectation, $W^1$ of $A^{12}$ has risen to a level just slightly greater than that of the second expectation, $W^1$, of $A^{22}$. This will persist until $W^1$ of $A^{12}$ has decayed to the same level as $W^1$ of $A^{22}$ at which time the response will be ambiguous. The ambiguity will not last for long. Since the exposure to the contrary condition was short and $W^2$ of $A^{12}$ did not rise, $W^1$ of $A^{12}$ will continue to decay, falling below the level of $W^1$ of $A^{22}$. At that time the network 2802 will respond with the original $UCR^2$ response as the older association re-emerges as dominant, as in FIG. 28G.

Other aspects, objects, and advantages of the present invention can be obtained from a study of the drawings, the disclosure, and the appended claims.

1. Purpose of the Simulator

Designing Adaptrodes for use in artificial neural elements (Neuristors) can be aided by an interactive simulation tool. This tool allows the designer to see the results of changing various control parameters in the Adaptrodes and in the Neuristor, graphically on the screen.

This demonstration simulator is not meant to provide a complete simulation environment for experimenting with neural architectures. This simulator is limited to one Neuristor and three input Adaptrodes and one output Adaptrode. Rather, it is designed to allow the user to become more familiar with the workings of the Adaptrode and the Neuristor as an aid in conceptualizing and designing such elements for a larger, network-level simulation.

Within that framework a wide variety of Adaptrode types, e.g., excitatory, inhibitory, short-term to long-term memory, etc can be constructed. The user can set the input signals and see how the behavior of these Adaptrodes changes over time. The user can also see how they interact within the context of the Neuristor to produce an output signal.

The following provides a description of the simulation environment, a tutorial on how to construct a Neuristor, and a summary of the commend key sequences needed to operate the simulation.

2. General Description

The following sections provide a general description of the program NEURISTR.EXE, its operating requirements and characteristics.

2.1. Computing Requirements

Neuristr.exe runs on the IBM PC or compatible computer under DOS 3.0 or later. The program uses text mode graphics so there is no special requirement for graphics. Nor do you need extended memory or a hard disk.

2.2. Running Neuristr.Exe 2.2.1. Invoking the program

Place the distribution disk into the disk drive and make that drive the default. For example, place the disk in drive A: and type: A: <ENTER>. When the DOS prompt returns, A:>, type: NEURISTR <ENTER> to start the program.

2.2.2. About files and file management

The distribution disk comes with three files. 1) NEURISTR.EXE, 2) NEURISTR.INI and 3) NEWNAME.BAT. The first file is the runtime program. The file with the .INI extension is a data file containing the initialization values for the Neuristor. If this file is absent, NEURISTR will initialize the constants and variables internally. The user will then have to "edit" these values as explained in the sections below. The last file is a batch processor to assist you in creating custom Neuristors.

At the close of the run of NEURISTR, the program saves all of the configuration values that it is currently using to a data file: NEURISTR.HIB (stands for "hibernate"). This file has the exact same format as the .INI file. Therefore, by changing the extension of the .HIB file to .INI, you can have the program initialize with the new version of Neuristor.

2.3 The Neuristor View Screen

The first screen the user will see at startup is called the NEURISTOR VIEW. This is a representation of a Neuristor. It contains three input Adaptrodes and one output Adaptrode. Additionally, the user will see the Sigma (summation) Processor, $\Sigma P$, the Decision (or Output) Processor, DP, a box containing the result signal from the output Adaptrode, R0, and a number of communications lines (arrows and double thick lines). A double lined box in the lower right-hand corner of the Neuristor contains some information about the Neuristor. Three input lines, labeled "Inslot 1" through "Inslot 3" are seen on the left-hand side of the screen. Inslots (shorthand for Input slot) are memory words containing a greyscale value from 0 to 300, representing a time-averaged firing frequency for the incoming "axon". These slots may be updated as described below.

Similarly, on the right-hand side of the screen you will see the output—an output slot. The time-averaged frequency of the Neuristor's firing is shown there.

Just off the left-hand side of the Neuristor block is a legend of synapse types available in the demonstration. These include non-learning excitatory (--1), learning excitatory (--H), non-learning inhibitory (-o) and learning inhibitory (--0).

At the bottom of the screen are two rows of information. On the left-hand side is the simulation clock. This reads off the cycles (300 per second), the seconds, minutes and hours since the start of a simulation. On the right-hand side are two general control indicators, one for the speed of the simulation, and the other to show the state of the display (screen update) toggle.

2.4 The Adaptrode View Screen

This screen shows a "typical" five-leveled Adaptrode. Just below the banner and to the left is the Adaptrode number being displayed. The double-lined rectangles represent the various levels in the unit, numbered from zero on the left to 4 on the right. Each of the large rectangles, labeled L0 through L4, contains the weight variable of that level, W0 through W4. The small double-lined rectangle above the level zero is the contribution processor (CP). It computes the actual result value ($R_j$) which is represented by the arrow going off to the right).

Above the arrow the user should see four variables labeled G1 through G4, each followed by a $-1$ value. These are the gates that have been set for each level from 1 to 4. A $-1$ value in a gate is a flag indicating that a gate function is not used.

To the left of the contribution processor is a single input line. This will correspond to which ever input slot has been designated for the Adaptrode. Just below that are the constants associated with controlling the dynamics of the Adaptrode. These are collectively called the Atype (Adaptrode Type) Data. Included in the group are the values of KAPPA, contribution decay ($\delta^c$) and a table of alpha and delta constants as used in the numerical implementation. These will be explained in the sections below. Another constant in this group is the weight equilibrium value.

As with the Neuristor screen, the clock, speed and display status are shown at the bottom of the screen. In addition, directly below each level rectangle are the variables labeled H1 through H4. These are the hurdle values computed if the level is gated. Since the G1 through G4 constants are $-1$ above, then all of the hurdle variables should be zero.

2.5 Conventions

Typography: Any key stroke or key sequence will be shown in angle brackets, e.g., <I>. In all cases a lower case letter is equivalent to an upper case letter, so only upper case are shown. If a key sequence includes a variable number, the latter is shown by the lower case "n". Legal values for "n" will be described in the appropriate sections.

The following keys have the given interpretation:

<UP> Up Arrow

<DN> Down Arrow

<HOME> Home key

<END> End key

<TAB> Forward tab

<S-TAB> Shift-Tab (reverse direction) key combination

<SPACE> Space bar

<PgUP> Page Up key

<PgDn> Page Down key

<C-PgUp> Control-Page Up key combination

<C-PgDn> Control-Page Down key combination

<BkSpc> Backspace

<ENTER> Enter or return

3. Tutorial

This section contains a short tutorial for the operation of the demonstration.

3.1. Running a "Simple" Neuristor

The distribution disk contains a file, NEURISTR.INI. This is the initialization file for a simple Neuristor. Start the program and this is the Neuristor that will be shown on the screen. The simulation demonstration is limited to a single Neuristor and three input signals. (See Section 1. Purpose)

Note that the simulation starts running immediately. That is, the clock starts ticking. Note the rate at which the Cycle and Sec's counters are rolling. Now press <DN> several times. The user should see the light bar next to the Speed decrease in size. Also, note the rate of number turnover is decreasing. The speed of the simulation can be controlled this way. Press the <DN> arrow a few more times to see how slow the simulation runs. (NOTE: on older PCs, XTs and ATs this may be very slow.) The light bar should completely disappear. Now press <HOME>. It may take a few cycles, but the light bar should reappear and the simulation should be cranking along at full throttle. Pressing <END> causes the clock to run on the slowest speed, while <HOME> revs it up to its highest speed.

3.1.1. Changing the value of an Input slot.

The key strokes <In> will interrupt the simulation and set up the editor at the input slot designated by the value of "n". Type <I1>. You will see a reverse video value appear next to the line labeled Inslot 1:. This is prompting you to alter the value in reverse video. To do so, press <UP> once. You will see the value of Inslot 1 increment by 5 (from 0 to 5). Pressing <UP> once more will increase the value to 10. Every <UP> press (or holding the <UP> key down) will increment the value by 5. Now hold the key down and see what happens.

Input slot 1 should reach a value of 300 and stay there. For this demonstration version, 300 is the maximum signal value allowed. Now press <PgDn>. you should see Inslot 1 decrease to 250. The <PgDn> and <PgUp> keys will cause bigger jumps in the value of the input slot. This is true of all of the cases where you might be changing values. However, the amount of the increase/decrease will vary according to which constant you are working with. For inslots the jump for <UP> or <DN> is 5, for <PgUp> or <PgDn> is 50. Now try <C-PgDn>. The value of the inslot should be 0, the minimum allowed value for this variable. <C-PgUp> and C-PgDn> will cause the variable or constant being edited to jump to its extremes (up or down) respectively.

3.1.2. Exciting the Neuristor

Use the <UP> key to get Inslot 1=40. Now press <ENTER> to accept the value and continue the simulation. Watch what is happening in Adaptrode 1 (A1). Slow the simulation down if you need to see the action. You should see a number which alternately gets bigger and then smaller, but tends to get bigger (like an upward spiral). You should also see a mini-lightbar that grows and contracts. These are digital and analog gauges of the $W^0$ value in the Adaptrode.

You will no doubt notice that some similar activity is going on in the Sigma Processor. The numbers being flashed there should be smaller, in general, than those in A1, and they should tend to decay toward zero at a greater rate. This number is actually the result ($R_j$) value coming from A1. Since it is the only input Adaptrode which is active, the number in $\Sigma P$, the sum of all $R_j$, is just the response of A1.

After a little while you should see some activity starting in A0 and possibly a non-zero value appear in the output slot. Wait a little while longer and the activity will grow until there are larger values in the output slot and larger numbers appearing in A0 and R0 boxes. This means that the Neuristor is receiving sufficient input excitation to "fire", that is, generate an output. You should be able to note that whenever the value in ΣP exceeds 100 (the constant threshold) the Outslot value increases or holds steady. This indicates that the Neuristor is firing at an increasing or steady frequency during the sample frame.

3.1.3. Synaptic Interactions-Effects on Neural Output

Now for some fun. Press <I3>. Note that A3 is designated as a non-learning inhibitory synapse. Using the <UP> key, increase Inslot 3: to 30 and press <ENTER>. What should happen? If Adaptrode 3 has enough umph, it should start to reduce the summation in SP and dampen the output signal. And this is, in fact what happens. After a while, you may see occasional bursts of output from the Neuristor, but overall, the output will be kept near or at 0. The inhibitory signal has cancelled the excitatory signal.

3.1.4. Viewing an Adaptrode

To see what is going on inside one of the Adaptrodes press <A> <1>. This should bring up the Adaptrode screen with A1. You are now looking at the internal dynamics of the Adaptrode. As explained in Section 2.4., the columns contain a digital and analog representation of the weights in the levels of the unit. Adaptrode 1 is configured, in this Neuristor, as a "non-learning" synapse. Actually this description is a little misleading. We have adopted the convention that any Adaptrode that has no more than two levels (i.e., 0 and 1) actively encoding is not doing any really long-term learning. Its weights will rise quickly on input and then decay away quickly when the input signal diminishes. (In reality it is doing ultra-short-term learning only!)

The vertical lightbars show an approximate level of the weight value in the level. At the top of each column is the digital readout of the weight value so that you can see what the actual number is. The up and down motions of the lightbar just give a general impression of the dynamics of the Adaptrode. Note that these motions are not very smooth, but occur in jerks. This is due to the numerical technique which is used to implement the Adaptrode in this simulation. The jerkiness may at first seem distracting and it is certainly "not natural". However, considerable research on the effectiveness of this numeric technique has shown that these incremental jumps up and down do not stray markedly from the continuous model. Overall the behavior of the system is consistent with what the continuous model predicts.

Press <I> followed by the <PgDn> key to reduce the input to 0. In this screen the <I> key still means "Inslot" but now the number of the inslot is assumed to be the one containing the input signal to this particular Adaptrode. Therefore you don't need to specify the number of the inslot.

Press <ENTER> to continue the simulation. You should see the lightbars diminishing, and the weight values declining as the Adaptrode weights decay toward equilibrium. Within a very few cycles the weights will have decayed to zero (the current equilibrium). As you watch the weights decay note that the w0 value will never be less than the w1 value. it is this fact that gives rise to all of the interesting properties of the Adaptrode. You will be seeing more of this later.

If the weights decayed too quickly for you, press <I> and run the input value up to any desired level and leave it there for a few frames (each frame=10 cycles). Watch how the weights increase—w0 fastest and highest, followed more slowly by w1.

4. Command Summary

4.1. General Commands

The following commands are used in either Neuristor View or Adaptrode View screens.

4.1.1. Changing Values of Selected Parameters <UP/DN, PgUP/Dn, etc.>

Once a parameter has been selected and is shown in reverse video, pressing the <UP>, <DN>, or other "direction" keys will increase or decrease the value by an amount dependent on the context of the parameter. For example, pressing <UP> to increase the value of an input slot will increment that value by five, whereas, the same key pressed to increase the value of the $\alpha^0$ constant (Adaptrode View) will increment the value by one.

With all value changes, pressing <ENTER> terminates the editing session, with acceptance of the modified value, and resumes the simulation.

4.1.2. Display Toggle <SPACEBAR>

The display update may be toggled off and on by pressing the <SPACEBAR> in either the Neuristor or Adaptrode View screens.

4.1.3. Exit <ESC>

Pressing the <ESC> key while in the Adaptrode View will cause the program to exit back to the Neuristor View. The change of view will not interrupt or alter the course of the simulation. Pressing the <ESC> key while in the Neuristor View will terminate the program.

4.1.4. Speed Control <UP/DN, HOME/END>

From either view screen, while no other option is selected, pressing the <DN> key will decrease the simulation running speed as indicated by the lightbar at the bottom of the screen. If the speed is less than its maximum rate, then pressing the <UP> key will increase the speed. Pressing <HOME> will immediately put the speed at maximum, while pressing <END> will put the speed at its minimum.

The speed adjustment range is based on reasonable screen update rates for a 386-based machine running at 18 megaHz. Speed adjustment allows you to slow down a simulation to track (visually) the numerical values for various parameters (e.g., weight and response values).

4.1.5 Help <F1>

A context-sensitive help screen containing a summary of the commands listed in this section is available at any point in the simulation by pressing <F1>.

4.2 Neuristor View Screen

The following are commands that are relevant only in the Neuristor View screen.

4.2.1. Input Slot Selection and Value Modification <In>

Pressing <I> followed by <n> where n={1 . . . 7} will allow the change in the value of the corresponding Input slot. Slots 1 through 3 are the regular slots used to input signals to the input Adaptrodes (1 . . . 3). Slots 4 through 7 are reserved for input of externally generated hurdle signals. Assignment of these slots to the hurdle sets for the levels of specific Adaptrodes is done in the Adaptrode View screen.

If a slot in the range 4 through 7 is chosen, a popup window showing the slot number and current value (in reverse video) is displayed. You can then modify the value of the slot with the direction control keys as usual. See section 4.3.8 for more information on the hurdle set construction.

4.2.2. Adaptrode View Selection <An>

Selection of a specific Adaptrode and transfer of the Adaptrode View to that unit is accomplished by pressing <A> followed by the Adaptrode number <n>—{0, 1, 2, or 3}. To return to the Neuristor View press <ESC>.

4.2.3. Threshold Type Modification <T>

To modify the threshold type and/or setpoint press <T>. A popup window will be displayed showing the current type number and the current setpoint value. The type will be in reverse video. Use the <UP> or <DN> keys to change type (0=fixed threshold, 1=decreasing threshold with output, 2=increasing threshold with output).

Press <TAB> to switch to the setpoint field. You can then use the <UP> or <DN> keys to change the value of this field. Note: no consistency checking is done to assure that the setpoint value is "sensible" with respect to the chosen type. However, the threshold is prevented from falling below 0 (type 1) to prevent the Neuristor from running away (producing a pulse every cycle).

4.3 Adaptrode View Screen

The following commands pertain to the Adaptrode View screen.

4.3.1. Input Slot Value Modification <I>

The input slot assigned to the chosen Adaptrode can be modified by pressing <I> followed by the use of the direction keys. Acceptance and resumption of the simulation is signaled by pressing the <ENTER> key. Note that this command is ignored if Adaptrode 0 is being viewed since the input to A0 is the output of the Neuristor which is not under the user's direct control.

4.3.2. Kappa Modification <K> [NOTE: KAPPA is not implemented in this demonstration version]

To change the value of KAPPA (the response amplification gain constant), press <K> followed by the appropriate direction keys. Range of KAPPA is limited.

4.3.3. Response (Contribution) Decay <D>

Pressing <D> will allow you to change the value of the response (of contribution) decay constant ($\delta^c$). Increasing this constant will cause the rate of decay of the response of the Adaptrode to be reduced. Setting the value to −1 will cause the response to always be equal to $W^0$, A decay set to 0 will cause the response to equal $W^0$ when an input pulse is received and to equal 0 at all other times.

4.3.4. Weight Equilibrium Modification <E>

To set the weight equilibrium constant (also called the pre-weighting constant) press <E>, Then use the direction keys to modify the value. Range is from 0 to weight max.

4.3.5. Synapse Type (Excitatory/Inhibitory) Toggle <S>

The synapse type (excitatory or inhibitory) can be changed by pressing <S> to toggle. The type can be seen as the input terminal entering the Adaptrode. The synapse type toggle is valid when viewing Adaptrode 0, even though this is not, technically, a synapse. The reason is that the response of A0 might be used to down-modulate a hurdle (same concept as up-modulating the gate).

4.3.6. Adaptrode Control Constants <A>

To modify any of the Adaptrode control constants, $\alpha$, $\alpha t$, $\delta$ or $\delta t$, press <A>. The table of constants shows these values with each row corresponding to a level in the Adaptrode. The first row contains the constants for level 0, etc. When the <A> key is pressed, the first constant $\alpha^0$ is highlighted. To select the constant you wish to modify, press <TAB> to jump to the next field. Once the correct field is highlighted, use the direction keys to increase/decrease the value. After setting the desired value you may either continue to <TAB> to the next field or press <ENTER> to end the edit session. Note: the range of values and amount of increment/decrement used with each direction key varies considerably for the different constants and at different levels.

4.3.7. Gate Modification <Gn>

Press <G> followed by the number of the level gate you wish to modify, {1, 2, 3 or 4}. Then use the direction keys to set the value. Setting a gate to −1 signals the processor that no gate is used (i.e., free potentiation) at that level. This prevents the attempt to assemble a hurdle set for that particular level to save processing time.

4.3.8. Hurdle Source Specification <Hn>

A hurdle set can be constructed for any level {1, 2, 3 or 4} by pressing <H> followed by <n>, the number of the level. A popup window showing up to three hurdle source options will be displayed. The headings for the two columns of data, Neur and Adapt, refer to the sources from which the hurdle signal is to be assembled (summed). Neur can refer to either a Neuristor source (in this demonstration that can only be the current or 0th Neuristor) or, if the corresponding Adapt field is set to a −1, then it refers to an input slot (allowed range is 4 to 7). The program checks for consistency.

Up to three hurdle sources can be defined in this screen. Four possible source types are permitted in this demonstration. These are, the A0 Adaptrode (Hebbian feedback), either of the other two Adaptrodes (local interaction), itself (self potentiation) or an input slot representing a neuromodulator source. The program forms a linear combination from these sources which is used to hurdle the level gate.

Setting the Neur column item to −1 flags the processor that there is no defined hurdle source.

If a slot has been selected as a source, the user must remember that modification of the slot value can only be done from the Neuristor View screen in this version. This is a little awkward when trying to watch the effects of the hurdle on a level of an Adaptrode. However, since these effects will only show up after the passage of a few or many cycle ticks, there should be adequate time to switch back to the Adaptrode View screen after setting the slot value.

4.3.9. Weight Reset <R>

The weights in an Adaptrode may be reset to weight equilibrium by pressing <R>. This allows a "restart" of a simulation without stopping the clock.

The C code for the Adaptrode Neuristor Simulator is listed below.

Copyright George E. Mobus, 1991. All rights reserved.

```
/* DRAW.C */ void drawline(int r0, int c0, int r9, int c9, int ch)
       {
5      int r, c, a1, a2;

if(ch == 1) {
          a1 = 196;
          a2 = 179;
10     }
       else {
          a1 = 205;
          a2 = 186;
       }
15     if(r0 == r9) {
          for(c = c0; c < c9; c++){
           gotoxy(c,r0);
           putch(a1);
           }
20     }
       else{
          for(r = r0; r < r9; r++){
             gotoxy(c0,r);
             putch(a2);
25        }
       } } void drawbox(int r0,int c0,int r9,int c9,int ch) {
       int r,c,v1,v2,h1,h2,ur1,ur2,ul1,ul2,lr1,lr2,ll1,ll2;
30     v1 = 179;
       h1 = 196;
       ur1 = 191;
       ul1 = 218;
       lr1 = 217;
35     ll1 = 192;
```

```
       v2 = 186;
       h2 = 205;
       ur2 = 187;
       ul2 = 201;
 5     lr2 = 188;
       ll2 = 200;

gotoxy(c0, r0);
       if(ch == 1) putch(ul1);
10     else putch(ul2);
       for(c = c0 + 1; c < c9; c++){
          gotoxy(c,r0);
          if(ch == 1) putch(h1);
          else putch(h2);
15     }
       gotoxy(c,r0);
       if(ch == 1) putch(ur1);
       else putch(ur2);
       for(r = r0 + 1; r < r9; r++) {
20        gotoxy(c0,r);
          if(ch == 1) putch(v1);
          else putch(v2);
          gotoxy(c9,r);
          if(ch == 1) putch(v1);
25        else putch(v2);
       }
       gotoxy(c0,r9);
       if(ch == 1) putch(ll1);
       else putch(ll2);
30     for(c = c0 + 1; c < c9; c++) {
          gotoxy(c,r9);
          if(ch == 1) putch(h1);
          else putch(h2);
       }
35     gotoxy(c,r9);
```

```
        if(ch == 1) putch(lr1);
        else putch(lr2); }
```

```
/*   GETKEY.C
   Function: getkey() gets a key stroke from the
keyboard and if it is an extended key, converts it to
its control equivalent */ int getkey()
  {
  int ky, ky1, ky2;
  ky = getch();
  if(ky == 0) {
    ky2 = getch();
    switch(ky2) {
      case 0x3B: /* F1 */
      ky1 = 7;
      break;
      case 0xF: /* SHIFT TAB */
      ky1 = 8;
      break;
      case 71: /* HOME */
      ky1 = 12;
      break;
      case 72: /* UP ARROW */
      ky1 = 5;
      break;
      case 73: /* PgUp */
      ky1 = 18;
      break;
      case 75: /* Left Arrow */
        ky1 = 19;
        break;
      case 77: /* Right Arrow */
        ky1 = 4;
        break;
      case 79: /* End */
      ky1 = 22;
```

```
            break;
             case 80: /* Down Arrow */
            ky1 = 24;
            break;
             case 81: /*PgDn */
            ky1 = 3;
            break;
             case 115: /* Ctrl-Left Arrow */
            ky1 = 1;
            break;
             case 116: /* Ctrl-Right Arrow */
            ky1 = 6;
            break;
             case 117: /* Ctrl-End */
            ky1 = 2;
            break;
             case 118: /* Ctrl-PgDn */
            ky1 = 14;
            break;
             case 119: /* Ctrl-Home */
            ky1 = 26;
            break;
             case 132: /* Ctrl-PgUp */
            ky1 = 25;
            break;
             default: ky1 = 0;
           }
       }
       else {
           ky1 = ky;
       }
       return ky1; }
```

```
/*=+=+=+=+=+=+=+=+=+=+=+=+=+=+=+=+=+=+=+=+=+=+=+=+=+=-
  +=+=+=+=+=+=+=+=+=+=+=*
                                  FILENET.C

A set of routines for loading and saving the data
     files associated with
        the neuristor demonstration.

*=+=+=+=+=+=+=+=+=+=+=+=+=+=+=+=+=+=+=+=+=+=+=+=+=+-
  =+=+=+=+=+=+=+=+=+=+=*/ void load_net (void) {
     NEURON *n;
     ADAPTRODE *a;
     FILE *fp;
     char buf[129];
     int i, j, k, l;

if((fp = fopen("neuristr.ini","rt")) == NULL) {
         locate(21,8);
         cprintf("NEURISTR.INI file is not in
  directory!");
         init_net();
     }
     else {
  /*****************************************************-
  *********************
                         Load Control Items
  *****************************************************-
  *********************/
         fgets (buf, 128, fp);
         Neuristors = atoi (strtok (buf, ","));
         inslots = atoi (strtok (NULL, ","));
         outslots = atoi (strtok (NULL, ","));
```

```
         atypes = atoi (strtok (NULL, ",\n"));
/*********************************************************
***********************
                  Load Adaptrode Type Items
**********************************************************
*********************/
        .for (i = 0; i < atypes; i++) {
           fgets(buf, 128, fp);
           strtok (buf, ",");  /* throw away index number
    */
           atype[i].KAPPA = atoi (strtok (NULL, ","));
           atype[i].excite = atoi (strtok (NULL, ","));
           atype[i].decay = atoi (strtok (NULL, ","));
           atype[i].wt_max = atoi (strtok (NULL, ","));
           atype[i].wt_equil = atoi (strtok (NULL, ",\n"));
           for (j = 0; j < MAX_LEVELS; j++) {
              fgets (buf, 128, fp);
              strtok (buf, ",");  /* throw away index */
              atype[i].alpha[j] = atoi (strtok (NULL, ","));
              atype[i].a_reset[j] = atoi (strtok (NULL,
    ","));
              atype[i].a_dwncnt[j] = atoi (strtok (NULL,
    ","));
              atype[i].delta[j] = atoi (strtok (NULL, ","));
              atype[i].d_reset[j] = atoi (strtok (NULL,
    ","));
              atype[i].d_dwncnt[j] = atoi (strtok (NULL,
    ",\n"));
           }
        }
/*********************************************************
***********************
                 Load Neuron and Adaptrode Data
**********************************************************
*********************/
```

```
          for (i = 0; i < neurons; i++) {
            n = (NEURON *) malloc (sizeof (NEURON));
            net[i] = n;
            if (! n) break;

/*************************************************-
   *********************
                         Load Neuron Definition Line
   *************************************************-
   *********************/
            fgets (buf, 128, fp);
            strtok (buf, ",");  /* throw away index number
      */
            strcpy (n->name, strtok (NULL, ","));
            n->old_x0 = atoi (strtok (NULL, ","));
            n->new_x0 = atoi (strtok (NULL, ","));
            n->threshold = atoi (strtok (NULL, ","));
            n->thresh_setpoint = atoi (strtok (NULL, ","));
            n->ttype = atoi (strtok (NULL, ","));
            n->sigma = atoi (strtok (NULL, ","));
            n->adapt_cnt = atoi (strtok (NULL, ","));
            n->ave_out = atoi (strtok (NULL, ",\n"));
            for (j = 0; j < n->adapt_cnt; j++) {
   /*************************************************-
   *********************
                         Load Adaptrode Definition Line
   *************************************************-
   *********************/
              fgets (buf, 128, fp);
              strtok (buf, ",");  /* throw away index */
              a = (ADAPTRODE *) malloc (sizeof (ADAPTRODE));
              a->owner = atoi (strtok (NULL, ","));
              a->src = atoi (strtok (NULL, ","));
              a->src_type = atoi (strtok (NULL, ","));
              a->atype = atoi (strtok (NULL, ","));
```

```
                   a->response = atoi (strtok (NULL, ",\n"));
                   n->adapt[j] = a;
                   for (k = 0; k < MAX_LEVELS; k++) {
         /**********************************************-
5        ********************
                        Load Adaptrode Level Definition Line
         **********************************************-
         ********************/
                   fgets (buf, 128, fp);
10                 strtok (buf, ",");  /* throw away index  */
                   a->wt[k] = atoi (strtok (NULL, ","));
                   a->gate[k] = atoi (strtok (NULL, ","));
                   a->hrdl[k] = atoi (strtok (NULL, ","));
                   for (l = 0; l < MAX_HURDLES; l++) {
15                    a->h[k][l].src_neur = atoi (strtok (NULL,
     ","));
                      a->h[k][l].src_adapt = atoi (strtok (NULL,
     ",\n"));
                   }
20             } /* End Adaptrode Level Definition */
            } /* End Adaptrode Definition */
         } /* End Neuron Definition */

}
25
      fclose(fp); } void save_net (void)
      /**********************************************-
30    ********************
         Saves the current network state variables to file.
      **********************************************-
      ********************/ {
         NEURON *n;
35       FILE *fp;
```

```
      int i, j, k, l;
      char num[17], buf[255];

fp = fopen ("NEURISTR.HIB", "wt");
 5
    /***********************************************-
    *********************
                         Save Control Items
    ***********************************************-
10  *********************/
      buf[0] = 0;
      itoa (neurons, num, 10);
      strcpy (buf, num);
      strcat (buf, ",");
15    itoa (inslots, num, 10);
      strcat (buf, num);
      strcat (buf, ",");
      itoa (outslots, num, 10);
      strcat (buf, num);
20    strcat (buf, ",");
      itoa (atypes, num, 10);
      strcat (buf, num);
      strcat (buf, "\n");
      fputs (buf, fp);
25  /***********************************************-
    *********************
                         Save Adaptrode Type Items
    ***********************************************-
    *********************/
30    for (i = 0; i < atypes; i++) {
        buf[0] = 0;
        strcpy (buf, itoa (i, num, 10));
        strcat (buf, ",\0");
        strcat (buf, itoa (atype[i].KAPPA, num, 10));
35      strcat (buf, ",\0");
```

```
        strcat (buf, itoa (atype[i].excite, num, 10));
        strcat (buf, ",\0");
        strcat (buf, itoa (atype[i].decay, num, 10));
        strcat (buf, ",\0");
 5      strcat (buf, itoa (atype[i].wt_max, num, 10));
        strcat (buf, ",\0");
        strcat (buf, itoa (atype[i].wt_equil, num, 10));
        strcat (buf, "\n\0");
        fputs (buf, fp);
10      for (j = 0; j < MAX_LEVELS; j++) {
           itoa (j, num, 10);
           strcpy (buf, num);
           strcat (buf, ",");
           itoa (atype[i].alpha[j], num, 10);
15         strcat (buf, num);
           strcat (buf, ",");
           itoa (atype[i].a_reset[j], num, 10);
           strcat (buf, num);
           strcat (buf, ",");
20         itoa (atype[i].a_dwncnt[j], num, 10);
           strcat (buf, num);
           strcat (buf, ",");
           itoa (atype[i].delta[j], num, 10);
           strcat (buf, num);
25         strcat (buf, ",");
           itoa (atype[i].d_reset[j], num, 10);
           strcat (buf, num);
           strcat (buf, ",");
           itoa (atype[i].d_dwncnt[j], num, 10);
30         strcat (buf, num);
           strcat (buf, "\n");
           fputs (buf, fp);
        }
     }
35
```

```
/*********************************************************
                  Save Neuron and Adaptrode Data
**********************************************************/
     for (i = 0; i < neurons; i++) {
        n = net[i];
        if (! n) break;

/*********************************************************
                  Write Neuron Definition Line
**********************************************************/
        itoa (i, num, 10);
        strcpy (buf, num);
        strcat (buf, ",");
        strcat (buf, n->name);
        strcat (buf, ",");
        strcat (buf, itoa (n->old_x0, num, 10));
        strcat (buf, ",");
        strcat (buf, itoa (n->new_x0, num, 10));
        strcat (buf, ",");
        strcat (buf, itoa (n->threshold, num, 10));
        strcat (buf, ",");
        strcat (buf, itoa (n->thresh_setpoint, num, 10));
        strcat (buf, ",");
        strcat (buf, itoa (n->ttype, num, 10));
        strcat (buf, ",");
        strcat (buf, itoa (n->sigma, num, 10));
        strcat (buf, ",");
        strcat (buf, itoa (n->adapt_cnt, num, 10));
        strcat (buf, ",");
        strcat (buf, itoa (n->ave_out, num, 10));
        strcat (buf, "\n");
```

```
        fputs (buf, fp);
        for (j = 0; j < n->adapt_cnt; j++) {
/***********************************************************************
                     Write Adaptrode Definition Line
***********************************************************************/
            strcpy (buf, itoa (j, num, 10));
            strcat (buf, ",");
            strcat (buf, itoa (n->adapt[j]->owner, num,
        10));
            strcat (buf, ",");
            strcat (buf, itoa (n->adapt[j]->src, num, 10));
            strcat (buf, ",");
            strcat (buf, itoa (n->adapt[j]->src_type, num,
        10));
            strcat (buf, ",");
            strcat (buf, itoa (n->adapt[j]->atype, num,
        10));
            strcat (buf, ",");
            strcat (buf, itoa (n->adapt[j]->response, num,
        10));
            strcat (buf, "\n");
            fputs (buf, fp);
            for (k = 0; k < MAX_LEVELS; k++) {
/***********************************************************************
                     Write Adaptrode Level Definition
        Line
***********************************************************************/
                strcpy (buf, itoa (k, num, 10));
                strcat (buf, ",");
                strcat (buf, itoa (n->adapt[j]->wt[k], num,
        10));
```

```
            strcat (buf, ",");
            strcat (buf, itoa (n->adapt[j]->gate[k], num,
     10));
            strcat (buf, ",");
  5         strcat (buf, itoa (n->adapt[j]->hrdl[k], num,
     10));
            strcat (buf, ",");
            for (l = 0; l < MAX_HURDLES; l++) {
              strcat (buf, itoa
 10  (n->adapt[j]->h[k][l].src_neur, num, 10));
              strcat (buf, ",");
              strcat (buf, itoa
     (n->adapt[j]->h[k][l].src_adapt, num, 10));
              strcat (buf, ",");
 15         }
            strcat (buf, "\n");
            fputs (buf, fp);
          } /* End Adaptrode Level Definition */
        } /* End Adaptrode Definition */
 20     } /* End Neuron Definition */
      fclose (fp); } void init_net(void)
      /***********************************************-
 25   ********************
        Initialize network with default values for
      coefficients and state variables
      ***********************************************-
      *********************/  {
 30     NEURON *n;
        int i, j, k;

/***********************************************-
      ********************
 35
```

```
                                Initialize Adaptrode Types
         ***********************************************-
         **********************/
            for (i = 0; i < MAX_ATYPES; i++) {
5              atype[i].KAPPA = 1;
               atype[i].excite = 1;
               atype[i].decay = 3;
               atype[i].wt_max = 300;
               atype[i].wt_equil = 0;
10             atype[i].a_reset[0] =     0;
               atype[i].d_reset[0] =     4;
               atype[i].a_reset[1] =    14;
               atype[i].d_reset[1] =    45;
               atype[i].a_reset[2] =    60;
15             atype[i].d_reset[2] =   200;
               atype[i].a_reset[3] =   300;
               atype[i].d_reset[3] =   600;
               atype[i].a_reset[4] =  1000;
               atype[i].d_reset[4] =  6000;
20             for (j = 0; j < MAX_LEVELS; j++) {
                  atype[i].alpha[j] = 4;
                  atype[i].delta[j] = 3;
                  atype[i].a_dwncnt[j] = atype[i].a_reset[j];
                  atype[i].d_dwncnt[j] = atype[i].d_reset[j];
25             }
            }
            atype[3].excite = -1;

/*********************************************-
30       **********************
                                Initialize Neuron(s)
         ***********************************************-
         **********************/
            for (i = 0; i < MAX_NEURONS; i++) {
35             n = (NEURON *) malloc (sizeof (NEURON));
```

```
        net[i] = n;
        strcpy (n->name, "Demonstration Neuron");
        n->old_x0 = n->new_x0 = n->threshold = n->sigma =
    n->ave_out = 0;
5       n->adapt_cnt = MAX_ADAPTRODES;
        n->thresh_setpoint = 100;
        n->ttype = 0;

/*********************************************-
10  **********************
                      Initialize Adaptrodes
    *********************************************-
    **********************/
        for (k = 0; k < MAX_ADAPTRODES; k++) {
15          n->adapt[k] = (ADAPTRODE *) malloc (sizeof
    (ADAPTRODE));
        }
        n->adapt[0]->owner = i;
        n->adapt[0]->src = i;
20      n->adapt[0]->src_type = 1;
        n->adapt[0]->atype = 0;
        n->adapt[1]->owner = i;
        n->adapt[1]->src = 0;
        n->adapt[1]->src_type = -1;
25      n->adapt[1]->atype = 1;
        n->adapt[2]->owner = i;
        n->adapt[2]->src = 1;
        n->adapt[2]->src_type = -1;
        n->adapt[2]->atype = 2;
30      n->adapt[3]->owner = i;
        n->adapt[3]->src = 2;
        n->adapt[3]->src_type = -1;
        n->adapt[3]->atype = 3;

35
```

```
/*********************************************************
            Initialize Adaptrode Hurdles
**********************************************************/
    for (i = 0; i < MAX_ADAPTRODES; i++) {
      n->adapt[i]->response = 0;
      for (j = 0; j < MAX_LEVELS; j++) {
        n->adapt[i]->wt[j] = 0;
        n->adapt[i]->gate[j] = -1; /* CHANGE BACK */
        n->adapt[i]->hrdl[j] = 0;
        for (k = 0; k < MAX_HURDLES; k++) {
          n->adapt[i]->h[j][k].src_neur = -1;
          n->adapt[i]->h[j][k].src_adapt = 0;
        }
       }
     }
   } }
```

```
/*    DRAWADAP.C      */ void draw_adaptrode(void) {
  clrscr();
  drawbox(4,16,22,30,2);
  drawbox(4,16,6,30,2);
  drawbox(6,30,22,42,2);
  drawbox(6,42,22,54,2);
  drawbox(6,54,22,67,2);
  drawbox(6,67,22,79,2);
  locate(6,30);
  putch(206);
  locate (22,30);
  putch (202);
  locate (6,42);
  putch(203);
  locate (22,42);
  putch(202);
  locate (6,54);
  putch(203);
  locate (22,54);
  putch(202);
  locate (6,67);
  putch(203);
  locate (22,67);
  putch(202);
  locate(1,30);
  cprintf("ADAPTRODE DEMONSTRATION");
  locate(2,1);
  cprintf("     Copyright (c) George Mobus, 1991. All
              Rights Reserved.");
  locate(3,1);
  cprintf("Adaptrode # 1");
  locate(4,18);
  cprintf(" CP ");
```

```
         locate(4,33);
         cprintf("G1 ");
         locate(4,45);
         cprintf("G2 ");
5        locate(4,57);
         cprintf("G3 ");
         locate(4,70);
         cprintf("G4 ");
         locate(5,3);
10       cprintf("Input:");
         locate(5,31);

cprintf(">---------------------------------------
    ->");
15       locate(5,45);
         cprintf("Rj");
         locate(6,1);
         cprintf(">--------------");
         locate(6,16);
20       putch(204);
         locate(6,18);
         cprintf(" L 0 ");
         locate(6,32);
         cprintf(" L 1 ");
25       locate(6,44);
         cprintf(" L 2 ");
         locate(6,56);
         cprintf(" L 3 ");
         locate (6,69);
30       cprintf(" L 4 ");
         locate(7,20);
         cprintf("W0 ");
         locate(7,32);
         cprintf("W1 ");
35       locate(7,44);
```

```
        cprintf("W2 ");
        locate(7,56);
        cprintf("W3 ");
        locate(7,69);
  5     cprintf("W4 ");
        gotoxy (1,7);
        cprintf(" Atype Data");
        gotoxy (1,9);
        cprintf("Kappa -> ");
 10     locate(10,1);
        cprintf("Contribution");
        locate(11,1);
        cprintf("Decay -> ");
        locate(14,1);
 15     putch(224);
        cprintf("    ");
        putch(224);
        cprintf("t  ");
        putch(235);
 20     cprintf("    ");
        putch(235);
        cprintf("t");
        locate(15,1);
        cprintf("---------------" );
 25     locate(21,1);
        cprintf("W equil -> ");

locate(23,34);
        cprintf("H1 ");
 30     locate(23,46);
        cprintf("H2 ");
        locate(23,58);
        cprintf("H3 ");
        locate(23,70);
 35     cprintf("H4 ");
```

```
        locate(23,1);
        cprintf("Cycle -> ");
        locate(23,18);
        cprintf("Sec's -> ");
 5      locate(24,1);
        cprintf("Min's -> ");
        locate(24,18);
        cprintf("Hr's  -> ");
        locate(24,40);
10      cprintf("Speed-> " );
        locate(24,60);
        cprintf("Display: ");

} /* #include "draw.c"
15
    locate(int y, int x) {
      gotoxy(x,y); } main() {
20    draw_adaptrode();
      getch(); } */
```

```
/*   DRAWNEUR.C     / void draw_neuron (void) {
  int r,c,x,k, num_lvls, at;

clrscr();
5 drawbox(4,18,21,62,2);
  gotoxy (24,4);
  cprintf(" Neuristor II ");
  drawbox(5,36,7,42,1);
  /* draw adaptrodes */
10 drawbox(6,19,9,27,1);
  drawbox(11,19,14,27,1);
  drawbox(16,19,19,27,1);

drawbox(5,46,8,54,1);
15 drawbox(10,36,14,44,1);
  drawbox(11,48,13,51,1);
  drawbox(15,33,20,60,2);
  gotoxy (35,15);
  cprintf (" Neuristor Data ");
20 gotoxy (34, 17);
  cprintf ("ID Number: ");
  gotoxy (34, 18);
  cprintf ("Threshold Set: ");
  gotoxy (34, 19);
25 cprintf ("Threshold Type: ");
  drawline(6,43,6,46,1);
  drawline(7,28,7,32,1);
  drawline(8,32,12,32,1);
  drawline(12,28,12,35,1);
30 drawline(17,28,17,32,1);
  drawline(13,32,17,32,1);
  drawline(12,45,12,48,2);
  drawline(9,50,11,50,2);
  drawline(12,52,12,61,1);
35 drawline(8,57,12,57,1);
```

```
        locate (12,57);
        putch(193);
        locate (7,55);
        putch(27);
 5      putch(196);
        putch(191);
        locate(5,38);
        cprintf("R0");

10      locate(6,42);
        putch(195);
        locate(12,63);
        cprintf("]-------------->");
        locate(13,68);
15      cprintf("Output");
        for(r = 7; r < 20; r+= 5){
           locate(r,18);
           putch(199);
           putch(180);
20      } x = 1;
        for(r = 7; r < 20; r+= 5)
        { locate(r-1,2);
25        cprintf("Inslot %d:",x);
          at = net[cur_neuron]->adapt[x]->atype;
          num_lvls = 0;
          while ((num_lvls <
      MAX_LEVELS)&&(atype[at].alpha[num_lvls] != -1))
30           num_lvls++;
          locate(r,1);
          cprintf(">--------------");
          if (atype[at].excite == 1)
          { if (num_lvls < 3)
35          cprintf("-|");
```

```
            else
             cprintf("-H");
            }
            else
5           { if (num_lvls < 3)
             cprintf("-o");
               else
             cprintf("-0");
            }
10         x++;
         }
         locate(11,65);
         cprintf("Outslot:");

15       locate(6,42); putch(195); locate(6,46); putch(180);
         locate(7,32); putch(191); locate(12,35); putch(26);
         locate(17,32); putch(217); locate(12,32); putch(197);
         locate(12,44); putch(198); locate(12,48); putch(181);
         locate(8,50); putch(210); locate(11,50); putch(208);
20       locate(12,51); putch(195); locate(12,61); putch(180);
         locate(1,20); cprintf(" NEURO-PROCESSING
         DEMONSTRATION"); locate(2,1); cprintf("   Copyright
         (c) George Mobus, 1991.  All Rights Reserved.");
         locate(6,20); cprintf("A1"); locate(11,20);
25       cprintf("A2"); locate(16,20); cprintf("A3");
         locate(9,43); cprintf("Thresh"); locate(10,37);
         putch(228); cprintf("P"); locate(5,49); cprintf("A0");
         locate(13,49); cprintf("DP"); locate(18,1);
         cprintf("Excite      -|"); locate(19,1);
30       cprintf("Excite mod. -H\n"); locate(20,1);
         cprintf("Inhibit     -o\n"); locate(21,1);
         cprintf("Inhib. mod. -0"); locate(23,1);
         cprintf("Cycle  -> "); locate(23,18); cprintf("Sec's
         -> "); locate(24,1); cprintf("Min's  ->");
35       locate(24,18); cprintf("Hr's   ->"); locate(24,40);
```

```
    cprintf("Speed -> "); locate(24,60); cprintf("Display:
    "); } /* #include "draw.c"

locate (int y, int x) {
5     gotoxy(x,y); } main() {
      draw_neuron();
      getch(); } */
10
```

```
/*   MK_BAR.C   */
void mk_bar(int i) {
  int j;

bar[0] = 0;
  if(i > 290){
     for(j = 0; j < 6; j++) bar[j] = 219;
  }
  else if(i > 275) {
     for(j = 0; j < 5; j++) bar[j] = 219;
      bar[5] = 220;
  }
  else if(i > 250) {
     for(j = 0; j < 5; j++) bar[j] = 219;
     bar[5] = 221;
  }
  else if(i > 225) {
     for(j = 0; j < 5; j++) bar[j] = 219;
     bar[5] = 32;
  }
  else if(i > 200) {
     for(j = 0; j < 4; j++) bar[j] = 219;
     bar[4] = 221;
     bar[5] = 32;
  }
  else if(i > 175) {
     for(j = 0; j < 4; j++) bar[j] = 219;
     bar[4] = 32;
     bar[5] = 32;
  }
  else if(i > 150) {
     for(j = 0; j < 3; j++) bar[j] = 219;
     bar[3] = 221;
     for(j = 4; j < 6; j++) bar[j] = 32;
  }
```

```
        else if(i > 125) {
            for(j = 0; j < 3; j++) bar[j] = 219;
            for(j = 3; j < 6; j++) bar[j] = 32;
        }
        else if(i > 100) {
            bar[0] = 219;
            bar[1] = 219;
            bar[2] = 221;
            for(j = 3; j < 6; j++) bar[j] = 32;
        }
        else if(i > 75) {
            bar[0] = 219;
            bar[1] = 219;
            for(j = 2; j < 6; j++) bar[j] = 32;
        }
        else if(i > 50) {
            bar[0] = 219;
            bar[1] = 221;
            for(j = 2; j < 6; j++) bar[j] = 32;
        }
        else if(i > 25) {
            bar[0] = 219;
            for(j = 1; j < 6; j++) bar[j] = 32;
        }
        else if(i > 10) {
            bar[0] = 221;
            for(j = 1; j < 6; j++) bar[j] = 32;
        }
        else if (i > 5 ) {
            bar[0] = 254;
            for(j = 1; j < 6; j++) bar[j] = 32;
        }
        else for (j = 0; j < 6; j++) bar[j] = 32;
        bar[6] = 0; }
```

```
/********************************************-
************************
                                        CMD.C

Function library for command processors for neuron
  and Adaptrode views

*/ /*
   Function: n_cmd() gets and executes commands
relevant to the neuron
   view */ int n_cmd (int k) {
   int x9,ky1,ky2;

switch(k) {
      case 7:   /* F1 for help   */
        print_neuron_help();
        break;

case 73:  /* "I" or "i" pressed to change level of
input */
        case 105:
          ky1 = which();
          if ((ky1 < 56)&&(ky1 > 51))
        modify_hrdl_inslots(ky1 - 49);
          else if((ky1 < 52) && (ky1 > 48)) {
        ky2 = 0;
        textbackground(LIGHTGRAY);
        textcolor(BLACK);
        gotoxy (12, 6+((ky1-49)*5));
        cprintf ("%3i", inslot[ky1-49]);
        do {
             ky2 = which();
             if(ky2 != 13) {
```

```
            inslot[ky1-49] = direct(ky2, inslot[ky1-49],
    5, 10, 300, 0);
              gotoxy (12, 6+((ky1-49)*5));
              cprintf ("%3i", inslot[ky1-49]);
            }
          } while(ky2 != 13);
          textbackground(BLACK);
          textcolor(WHITE);
          gotoxy (12, 6+((ky1-49)*5));
          cprintf ("%3i", inslot[ky1-49]);
          }
          break;
        case 'T':
        case 't':  /* "R" or "r" to edit threshold " */
          edit_threshold();
          break;
        case 65:       /* "A" or "a" for synapse selection
    */
        case 97:
          ky1 = which();
          if((ky1 < 52) && (ky1 >= 48)) {
            cur_adaptrode = ky1 - 48;
            clrscr();
            draw_adaptrode();
          dsp_adaptrode();
          dsp_a_var(-1);
            dsp_atype();
            dsp_hurdles();
            dsp_bottom();
            n_view = 0;
          }
          break;
        case 5:    /* Up, Dwn, PgUp or PgDn keys to set
    speed */
        case 24:
```

```
          case 12:
          case 22:
            set_speed(k);
            break;
5         case ' ':   /* Display ON/OFF toggle switch   */
            dsp_switch();
            break;
        }  /* end switch */
        return (k); }
10
    /*
       Function: a_cmd() gets and executes commands
       relevant to the Adaptrode
       view. */ int a_cmd (int k) {
15     int x8, x9, ky1 = 0, ky2 = 0, *temp, at, i, j, m,
       num_lvls;

switch(k) {
           case 27:    /* ESC to return to current neuron view
20     */
               n_view = 1;
               draw_neuron ();
               dsp_neuron ();
               dsp_bottom();
25             break;
           case 7:  /* F1 for help  */
              print_adaptrode_help();
              break;
           case 'I':
30         case 'i':   /* "I" or "i" for inslot change   */
              if (cur_adaptrode > 0)
              {   textbackground(LIGHTGRAY);
              textcolor(BLACK);
              gotoxy (10,5);
35            cprintf("%3i",inslot[cur_adaptrode-1]);
```

```
         do {
           ky1 = which();
           if(ky1 != 13) {
              inslot[cur_adaptrode-1] = direct(ky1,
5    inslot[cur_adaptrode-1],
              5, 10, 300, 0);
           gotoxy (10,5);
           cprintf("%3i",inslot[cur_adaptrode-1]);
           }
10       } while(ky1 != 13);
         textbackground(BLACK);
         textcolor(WHITE);
         gotoxy (10,5);
         cprintf("%3i",inslot[cur_adaptrode-1]);
15       }
         break;
       case 'K':
       case 'k': /* "K" or "k" for contribution
     pre-weighting constant, KAPPA*/
20       at =
     net[cur_neuron]->adapt[cur_adaptrode]->atype;
         textbackground(LIGHTGRAY);
         textcolor(BLACK);
         gotoxy (10,9);
25       cprintf ("%2i",atype[at].KAPPA);
         do {
            ky1 = which();
         if(ky1 != 13) {
         atype[at].KAPPA = direct(ky1, atype[at].KAPPA, 1,
30   10, 99, 0);
         gotoxy (10,9);
         cprintf ("%2i",atype[at].KAPPA);
         }
          } while(ky1 != 13);
35       textbackground(BLACK);
```

```
                    textcolor(WHITE);
                    gotoxy (10,9);
                    cprintf ("%2i",atype[at].KAPPA);
                    break;
 5             case 71:  /*  "G" or "g" for gate modification  */
               case 103:
                    ky1 = which();
                    if((ky1 < 53) && (ky1 > 48)) {
                    ky1 -= 48;
10                  ky2 = 0;
                    temp =
            &(net[cur_neuron]->adapt[cur_adaptrode]->gate[ky1]);
                    textbackground(LIGHTGRAY);
                    textcolor(BLACK);
15                  gotoxy (36+((ky1-1)*12),4);
                    cprintf("%3i", *temp);
                    do {
                      ky2 = which();
                      if(ky2 != 13)
20                    { *temp = direct(ky2, *temp, 1, 10, 300, -1);
                        gotoxy (36+((ky1-1)*12),4);
                        cprintf("%3i", *temp);
                      }
                    } while(ky2 != 13);
25                  textbackground(BLACK);
                    textcolor(WHITE);
                    gotoxy (36+((ky1-1)*12),4);
                    cprintf("%3i", *temp);
                      }
30                  break;
               case 'D':  /* change decay factor */
               case 'd':
                    at =
            net[cur_neuron]->adapt[cur_adaptrode]->atype;
35                  textbackground(LIGHTGRAY);
```

```
            textcolor(BLACK);
            gotoxy (10,11);
            cprintf ("%2i",atype[at].decay);
            do {
 5             ky1 = which();
            if(ky1 != 13) {
            atype[at].decay = direct(ky1, atype[at].decay, 1,
       2, 10, -1);
            gotoxy (10,11);
10          cprintf ("%2i",atype[at].decay);
            }
            } while(ky1 != 13);
            textbackground(BLACK);
            textcolor(WHITE);
15          gotoxy (10,11);
            cprintf ("%2i",atype[at].decay);
            break;
          case 'E':   /* change W equil */
          case 'e':
20          at =
       net[cur_neuron]->adapt[cur_adaptrode]->atype;
            textbackground(LIGHTGRAY);
            textcolor(BLACK);
            gotoxy (11,21);
25          cprintf ("%3i", atype[at].wt_equil);
            do {
               ky1 = which();
            if(ky1 != 13) {
            atype[at].wt_equil = direct(ky1,
30     atype[at].wt_equil, 1, 10, 300, 0);
            gotoxy (11,21);
            cprintf ("%3i", atype[at].wt_equil);
            }
            } while(ky1 != 13);
35          textbackground(BLACK);
```

```
                textcolor(WHITE);
                gotoxy (11,21);
                cprintf ("%3i", atype[at].wt_equil);
                for (i=0; i<MAX_NEURONS; i++)
5                 for (j=0; j<MAX_ADAPTRODES; j++)
                    if (net[i]->adapt[j]->atype == at)
                      for (m=0; m<MAX_LEVELS; m++)
                        net[i]->adapt[j]->wt[m] =
        atype[at].wt_equil;
10              dsp_a_var(-1);
                break;
              case 72:
              case 104:  /* "H" or "h" for Hurdle inspection or
        setting */
15              ky1 = which();
                if((ky1 < 52) && (ky1 > 48))
              modify_hurdles(ky1-48);
                break;
              case 'A':
20            case 'a':  /* modify adaptrode type settings */
                 modify_adapt_types();
                break;
              case 'R':
              case 'r':  /* reset adaptrode's level weights to
25      wt_equil */
                at =
        net[cur_neuron]->adapt[cur_adaptrode]->atype;
                num_lvls = 0;
                while ((num_lvls <
30      MAX_LEVELS)&&(atype[at].alpha[num_lvls] != -1))
                  num_lvls++;
                for (i=0; i<num_lvls; i++)
                  net[cur_neuron]->adapt[cur_adaptrode]->wt[i] =
        atype[at].wt_equil;
35              dsp_a_var(-1);
```

```
           break;
        case 'S':
        case 's':  /* Toggle between inhibitory/excitatory
     synapse */
           at =
     net[cur_neuron]->adapt[cur_adaptrode]->atype;
           num_lvls = 0;
           while ((num_lvls <
     MAX_LEVELS)&&(atype[at].alpha[num_lvls] != -1))
              num_lvls++;
           atype[at].excite = -atype[at].excite;
           gotoxy (15,6);
           if (atype[at].excite > 0 && num_lvls > 2)
     cprintf ("H");
           else if (atype[at].excite > 0) cprintf ("|");
           else if (num_lvls > 2) cprintf ("O");
           else cprintf ("o");
           break;
        case ' ':  /* Space Bar Displays Toggle Switch  */
           dsp_switch();
           break;
        case 5:    /* Up, Dwn, PgUp or PgDn for speed
     setting */
        case 24:
        case 12:
        case 22:
           set_speed(k);
           break;
        }
        return (k); } void dsp_switch (void) {
        if(dsp) {
           dsp = 0;
           gotoxy (69,24);
```

```
      puts ("OFF");
    }
    else {
      dsp = 1;
      gotoxy (69,24);
      puts ("ON ");
      if (n_view) dsp_n_var ();
      else dsp_a_var (-1);
    } } void set_speed (int ky9) {
  if(ky9 == 5) {
    speed = speed + 10;
    if(speed > 100) speed = 100;
  }
  else if(ky9 == 24) {
    speed = speed - 10;
    if(speed < 0) speed = 0;
  }
  else if(ky9 == 12) speed = 100;
  else if(ky9 == 22) speed = 0;
  gotoxy (49,24);
  mk_bar(speed*3);
  cprintf("%s ",bar); } int direct (int ky9, int val, int x, int pg_inc, int
ub, int lb) {
  int i;

switch (ky9) {
    case 5:
      i = val + x;
      break;
    case 18:
      i = val + pg_inc*x;
```

```
              break;
            case 24:
              i = val - x;
              break;
 5          case 3:
              i = val - pg_inc*x;
              break;
            case 25:
              i = ub;
10            break;
            case 14:
              i = lb;
              break;
            default:
15            i = val;
          }
          if (i > ub) i = ub;
          else if (i < lb) i = lb;
          return i; }
20
       int which (void) { while(!bioskey(1));
          return (getkey()); }
25     /*****************************************-
       **************/ void print_neuron_help()

30     { clrscr();
          printf("                    Neuro-Processing
       Demonstration\n");
          printf("                         HELP
       SCREEN\n");
35        printf("Key              Action\n");
```

```
        printf("---
----------------------------------------------------
--------\n");
        printf("F1 . . . . . . Help screen.\n");
 5      printf("I  . . . . . . Edit inslot.  Press the 'I'
     (or 'i') key followed by the\n");
        printf("              number of the inslot you wish
     to edit.  Inslot value may be\n");
        printf("              altered using the up and down
10   arrow keys; page-up and page-down\n");
        printf("              for larger incremental
     adjustment; and ctrl-page-up and\n");
        printf("              ctrl-page-down to set to the
     maximum and minimum values respec-\n");
15      printf("              tively.  Press enter to
     confirm your changes.\n");
        printf("T  . . . . . . Edit threshold.  TAB and
     SHIFT-TAB may be used to switch between\n");
        printf("              the set-point and type
20   fields.  Values are changed using the same");
        printf("              keys as discussed above for
     the inslot edit procedure.\n");
        printf("A  . . . . . . Zoom in on adaptrode.  Press
     the 'A' (or 'a') key followed by\n");
25      printf("              the number of the adaptrode
     you want to zoom in on.\n");
        printf("UP/DOWN ARROW. Increase/decrease speed.\n");
        printf("PAGE UP/DOWN . Set speed to maximum/minimum
     value.\n");
30      printf("SPACEBAR . . . Toggle display on/off.\n");
        printf("ESC  . . . . . Exit program.\n\n");
        gotoxy(1,25);
        printf("                        Press Escape to
     return to demo.");
35      while (getch() != 27);
```

```
    draw_neuron ();
    dsp_neuron ();
    dsp_bottom(); }

/*******************************************-
************/ void modify_adapt_types()

{ int at, flag = 0, lvl = 0, key, ub, pg_incr,
num_lvls=0;

at = net[cur_neuron]->adapt[cur_adaptrode]->atype;
    textbackground(LIGHTGRAY);
    textcolor(BLACK);
    gotoxy (1, 16);
    cprintf ("%1i",atype[at].alpha[0]);
    do
    { key = which();
       if (((key == 9)&&((flag != 3)||(lvl !=
MAX_LEVELS-1)))||
          ((key == 8)&&((flag != 0)||(lvl != 0))))
       { textbackground(BLACK);
         textcolor(WHITE);
         gotoxy ((1 + (flag/2)*7 + (flag%2)*2), 16+lvl);
         if (flag%2 == 0)
         cprintf("%1i", ((flag == 0) ?
atype[at].alpha[lvl] :
              atype[at].delta[lvl]));
         else
         cprintf("%4i", ((flag == 1) ?
atype[at].a_reset[lvl] :
              atype[at].d_reset[lvl]));
         if (key == 9)
         { flag++;
```

```
           if ((lvl == 0)&&(flag == 1))
             flag++;
           else if (flag == 4)
           { flag = 0;
5            lvl++;
           }
          }
           else
           { flag--;
10         if ((lvl == 0)&&(flag == 1))
             flag --;
           else if (flag < 0)
           { flag = 3;
             lvl--;
15         }
          }
           textbackground(LIGHTGRAY);
           textcolor(BLACK);
           gotoxy ((1 + (flag/2)*7 + (flag%2)*2), 16+lvl);
20         if (flag%2 == 0)
           cprintf("%1i", ((flag == 0) ?
       atype[at].alpha[lvl] :
              atype[at].delta[lvl]));
           else
25         cprintf("%4i", ((flag == 1) ?
       atype[at].a_reset[lvl] :
              atype[at].d_reset[lvl]));
         }
           else if (key != 13)
30         { switch (flag)
            { case 0 : if (atype[at].alpha[lvl] < 0)
               { gotoxy ((2 + (flag/2)*7 + (flag%2)*2),
       16+lvl);
                 cprintf("%c", 219);
35             }
```

```
                    atype[at].alpha[lvl] = direct(key,
        atype[at].alpha[lvl], 1,
                        11, 10, ((lvl == 0) ? 0 : -1));
                    break;
5           case 1 : if (lvl == 0)
                    { ub = 99;
                      pg_incr = 10;
                    }
                    else if (lvl == 1)
10                  { ub = 999;
                      pg_incr = 100;
                    }
                    else
                    { ub = 9999;
15                    pg_incr = 1000;
                    }
                    atype[at].a_reset[lvl] = direct(key,
        atype[at].a_reset[lvl],
                        1, pg_incr, ub, 0);
20                  if (atype[at].a_dwncnt[lvl] >
        atype[at].a_reset[lvl])
                        atype[at].a_dwncnt[lvl] =
        atype[at].a_reset[lvl];
                    break;
25          case 2 : atype[at].delta[lvl] = direct(key,
        atype[at].delta[lvl], 1,
                        11, 10, 0);
                    break;
            case 3 : if (lvl == 0)
30                  { ub = 99;
                      pg_incr = 10;
                    }
                    else if (lvl == 1)
                    { ub = 999;
35                    pg_incr = 100;
```

```
                    }
                else
                { ub = 9999;
                  pg_incr = 1000;
5               }
                atype[at].d_reset[lvl] = direct(key,
    atype[at].d_reset[lvl],
                    1, pg_incr, ub, 0);
                if (atype[at].d_dwncnt[lvl] >
10  atype[at].d_reset[lvl])
                    atype[at].d_dwncnt[lvl] =
    atype[at].d_reset[lvl];
                break;
            }
15      gotoxy ((1 + (flag/2)*7 + (flag%2)*2), 16+lvl);
        if (flag%2 == 0)
        cprintf("%1i", ((flag == 0) ?
    atype[at].alpha[lvl] :
            atype[at].delta[lvl]));
20      else
        cprintf("%4i", ((flag == 1) ?
    atype[at].a_reset[lvl] :
            atype[at].d_reset[lvl]));
        }
25  } while(key != 13);
    textbackground(BLACK);
    textcolor(WHITE);
    gotoxy ((1 + (flag/2)*7 + (flag%2)*2), 16+lvl);
    if (flag%2 == 0)
30      cprintf("%1i", ((flag == 0) ? atype[at].alpha[lvl]
    :
            atype[at].delta[lvl]));
    else
        cprintf("%4i", ((flag == 1) ?
35  atype[at].a_reset[lvl] :
```

```
              atype[at].d_reset[lvl]));
       dsp_a_var(-1);
       while ((num_lvls <
     MAX_LEVELS)&&(atype[at].alpha[num_lvls] != -1))
 5        num_lvls++;
       gotoxy (15,6);
       if (atype[at].excite > 0 && num_lvls > 2) cprintf
     ("H");
       else if (atype[at].excite > 0) cprintf ("|");
10     else if (num_lvls > 2) cprintf ("O");
       else cprintf ("o"); }

/*****************************************************
     *************/
15
     void modify_hurdles(int lvl)

{ int i, field=0, hurdle_num=0, key, s, mod_flag;
       char buffer[210];
20     ADAPTRODE *a;

a = net[cur_neuron]->adapt[cur_adaptrode];
       gettext(64,1,80,6,buffer);
       for (i=1; i<7; i++)
25     { gotoxy (64, i);
          cprintf("                   ");
       }
       drawbox(1,64,6,80,2);
       gotoxy(67,1);
30     cprintf(" HURDLE %d ", lvl);
       gotoxy(66,2);
       cprintf("Neuron Adaptd");
       for (i=0; i<MAX_HURDLES; i++)
       { gotoxy(67,i+3);
35        s = a->h[lvl][i].src_neur;
```

```
             if ((a->h[lvl][i].src_adapt == -1)&&(s != -1))
                s++;
             cprintf("%3i    %3i", s,
                 a->h[lvl][i].src_adapt);
 5        }
          textbackground(LIGHTGRAY);
          textcolor(BLACK);
          gotoxy(67,3);
          s = a->h[lvl][0].src_neur;
10        if ((a->h[lvl][0].src_adapt == -1)&&(s != -1))
             s++;
          cprintf("%3i", s);
          do
          { key = which();
15           if (((key == 9)&&((field != 1)||(hurdle_num !=
          MAX_HURDLES-1)))||
                ((key == 8)&&((field != 0)||(hurdle_num != 0))))
                { textbackground(BLACK);
                  textcolor(WHITE);
20                gotoxy(67+(field%2)*8, 3+hurdle_num);
                  if (field == 0)
                  { s = a->h[lvl][hurdle_num].src_neur;
                    if ((a->h[lvl][hurdle_num].src_adapt == -1)&&(s
          != -1))
25                     s++;
                  cprintf("%3i", s);
                  }
                  else
                  cprintf("%3i", a->h[lvl][hurdle_num].src_adapt);
30                textbackground(LIGHTGRAY);
                  textcolor(BLACK);
                  if (key == 9)
                  { field++;
                  if (field > 1)
35                { field = 0;
```

```
            hurdle_num++;
        }
      }
      else
      { field--;
        if (field < 0)
        { field = 1;
          hurdle_num--;
        }
      }
      gotoxy(67+(field%2)*8, 3+hurdle_num);
      if (field == 0)
      { s = a->h[lvl][hurdle_num].src_neur;
        if ((a->h[lvl][hurdle_num].src_adapt == -1)&&(s != -1))
        { s++;
          if (s < 4)
          { s = 4;
            a->h[lvl][hurdle_num].src_neur = 3;
          }
        }
        cprintf("%3i", s);
      }
      else
        cprintf("%3i", a->h[lvl][hurdle_num].src_adapt);
    }
    else if (key != 13)
    { if (field == 0)
      { if (a->h[lvl][hurdle_num].src_adapt != -1)
          a->h[lvl][hurdle_num].src_neur = direct(key,
              a->h[lvl][hurdle_num].src_neur, 1,
   neurons+1, neurons-1, -1);
      else
      { s = a->h[lvl][hurdle_num].src_neur;
        if (s != -1)
```

```
                        s++;
                        s = direct(key, s, 1, inslots, inslots, -1);
                        if (s == 0)
                            s = 4;
 5                      else if (s == 3)
                            s = -1;
                        a->h[lvl][hurdle_num].src_neur = s - ((s == -1)
                ? 0 : 1);
                    }
10              }
                else
                { mod_flag = 0;
                    a->h[lvl][hurdle_num].src_adapt = direct(key,
                a->h[lvl][hurdle_num].src_adapt,
15                      1, MAX_ADAPTRODES+1, MAX_ADAPTRODES-1, -1);
                    if ((a->h[lvl][hurdle_num].src_adapt > -1)&&
                        (a->h[lvl][hurdle_num].src_neur > neurons))
                    { a->h[lvl][hurdle_num].src_neur = neurons - 1;
                        mod_flag = 1;
20                  }
                    else if ((a->h[lvl][hurdle_num].src_adapt ==
                -1)&&
                            (a->h[lvl][hurdle_num].src_neur > -1)&&
                            (a->h[lvl][hurdle_num].src_neur < 3))
25                  { a->h[lvl][hurdle_num].src_neur = 3;
                        mod_flag = 1;
                    }
                    if (mod_flag)
                    { textbackground(BLACK);
30                      textcolor(WHITE);
                        gotoxy(67, 3+hurdle_num);
                        s = a->h[lvl][hurdle_num].src_neur;
                        if ((a->h[lvl][hurdle_num].src_adapt == -1)&&(s
                != -1))
35                          s++;
```

```
              cprintf("%3i", s);
              textbackground(LIGHTGRAY);
              textcolor(BLACK);
          }
5       }
          gotoxy(67+(field%2)*8, 3+hurdle_num);
          if (field == 0)
          { s = a->h[lvl][hurdle_num].src_neur;
            if ((a->h[lvl][hurdle_num].src_adapt == -1)&&(s
10  != -1))
                s++;
            cprintf("%3i", s);
          }
          else
15          cprintf("%3i", a->h[lvl][hurdle_num].src_adapt);
        }
    } while (key != 13);
    textbackground(BLACK);
    textcolor(WHITE);
20  puttext(64,1,80,6,buffer); } void print_adaptrode_help()

{ int screen = 1, key=18;
25
      while (key != 27)
      { if ((key == 18)&&(screen == 1))
        { screen = 0;
          clrscr();
30        printf("                    Adaptrode
    Demonstration\n");
          printf("                         HELP
    SCREEN 1\n");
          printf("Key           Action\n");
35
```

```
            printf("---------------------------------------------------------------\n");
            printf("F1 . . . . . . Help screen.\n");
 5          printf("I  . . . . . . Edit inslot (adaptrodes
        greater than 0 only).\n");
            printf("K  . . . . . . Edit contribution
        pre-weighting constant, KAPPA.\n");
            printf("D  . . . . . . Edit contribution decay
10      constant.\n");
            printf("G  . . . . . . Edit gate value.  Press
        'G' (or 'g') followed by the level of\n");
            printf("                  the gate you want to
        edit.\n");
15          printf("E  . . . . . . Edit equilibrium
        weight.\n");
            printf("A  . . . . . . Edit adaptrode
        parameters.  You may move from field to field by\n");
            printf("                  using TAB and SHIFT-TAB
20      to move forward and backward.\n");
            printf("H  . . . . . . Edit hurdle sources.  You
        may move from field to field using\n");
            printf("                  TAB and SHIFT-TAB as
        discussed above.\n");
25          printf("S  . . . . . . Excitatory/inhibitory
        synapse toggle.\n");
            printf("R  . . . . . . Reset weights to
        equilibrium weight.\n");
            printf("UP/DOWN ARROW. Increase/decrease
30      speed.\n");
            printf("PAGE UP/DOWN . Set speed to
        maximum/minimum value.\n");
            printf("SPACEBAR . . . Toggle display
        on/off.\n");
35
```

```
        printf("ESC . . . . . Return to neuron
view.\n");
        gotoxy(1,25);
        printf("        Page Down for help on editing a
field, Escape to return to demo");
        }
        else if ((key == 3)&&(screen == 0))
        { screen = 1;
          clrscr();
          printf("                    Adaptrode
Demonstration\n");
          printf("                         HELP
SCREEN 2\n");
          printf("\nEditing a field:\n");
          printf("    When editing a field (e.g.,
changing the inslot value), the field becomes\n");
          printf("highlighted.  The value may be changed
using the up and down arrow keys;\n");
          printf("page-up and page-down for larger
incremental adjustment; and ctrl-page-up and\n");
          printf("ctrl-page-down to set to the maximum and
minimum values respectively.  Press\n");
          printf("enter to confirm your changes.\n\n");
          gotoxy(1,25);
          printf("            Page Up for keyboard
help, Escape to return to demo");

}
        key = which();
    }
    clrscr();
    draw_adaptrode();
    dsp_adaptrode();
    dsp_a_var(-1);
    dsp_atype();
```

```
        dsp_hurdles();
        dsp_bottom(); } void edit_threshold()
5
    { int i, key, field = 0;

drawbox(1,64,4,80,2);
        gotoxy(67,1);
10      cprintf(" THRESHOLD ");
        gotoxy(66,2);
        cprintf("Set_pt ->");
        gotoxy(66,3);
        cprintf("Type ->");
15      gotoxy(78,3);
        cprintf("%1i", net[cur_neuron]->ttype);
        textbackground(LIGHTGRAY);
        textcolor(BLACK);
        gotoxy(76,2);
20      cprintf("%3i", net[cur_neuron]->thresh_setpoint);
        do
        { key = which();
          if ((key == 9)||(key == 8))
          { textbackground(BLACK);
25          textcolor(WHITE);
            if (field == 0)
            { gotoxy(76,2);
          cprintf("%3i", net[cur_neuron]->thresh_setpoint);
          field = 1;
30          }
            else
            { gotoxy(78,3);
          cprintf("%1i", net[cur_neuron]->ttype);
          field = 0;
35          }
```

```
            textbackground(LIGHTGRAY);
            textcolor(BLACK);
            if (field == 0)
            { gotoxy(76,2);
 5          cprintf("%3i", net[cur_neuron]->thresh_setpoint);
            }
            else
            { gotoxy(78,3);
            cprintf("%1i", net[cur_neuron]->ttype);
10          }
        }
        else if (key != 13)
        { if (field == 0)
            { net[cur_neuron]->thresh_setpoint = direct(key,
15                net[cur_neuron]->thresh_setpoint, 5, 20,
        300, 0);
            gotoxy(76,2);
            cprintf("%3i", net[cur_neuron]->thresh_setpoint);
            }
20          else
            { net[cur_neuron]->ttype = direct(key,
        net[cur_neuron]->ttype, 1, 2,
                2, 0);
            gotoxy(78,3);
25          cprintf("%1i", net[cur_neuron]->ttype);
            }
        }
    } while (key != 13);
    textbackground(BLACK);
30  textcolor(WHITE);
    for (i=1; i<5; i++)
    { gotoxy (64, i);
      cprintf("                ");
    } }
35
```

```
    void modify_hrdl_inslots(inslot_num)

{ int key = 0, i;

5     drawbox(20,65,22,78,2);
      gotoxy(67,20);
      cprintf(" INSLOT %d ", inslot_num+1);
      gotoxy(71,21);
      textbackground(LIGHTGRAY);
10    textcolor(WHITE);
      cprintf("%3i", inslot[inslot_num]);
      do
      { key = which();
        if(key != 13)
15      { inslot[inslot_num] = direct(key,
    inslot[inslot_num], 5, 10, 300, 0);
          gotoxy (71,21);
          cprintf ("%3i", inslot[inslot_num]);
        }
20    } while(key != 13);
      textbackground(BLACK);
      textcolor(WHITE);
      for (i=0; i<3; i++)
      { gotoxy(65, 20+i);
25      cprintf("                ");
      } }
```

```
/*   CURSR.C   */
void cursor_off (void) {
  union REGS regs;

regs.h.ah = 1;         /* set cursor size */
  regs.h.ch = 0x20;      /* set bit 5 in register CH
*/
  regs.h.cl = 0;
  regs.h.bh = 0;
  int86(VIDEO, ®s, ®s); } void cursor_on () {
  union REGS regs;

regs.h.ah = 1;
  regs.h.ch = 12;
  regs.h.cl = 13;
  regs.h.bh = 0;
  int86(VIDEO, ®s, ®s); }
```

```
/*   MISC.C    */
void init_slots (void) {
  int i;

for (i = 0; i < MAX_INSLOTS; i++) inslot[i] = 0;
  for (i = 0; i < MAX_OUTSLOTS; i++) {
    outslot[i][0] = 0;
    outslot[i][1] = 0;
  } }

/*
  Function: level(r,c,x) prints a vertical bar the height of which
  is proportional to the value in x */ void level(int
r, int c, int x) {
  int r0,l;

l = x;
  for(r0 = r; r0 > r-13; r0--){
      locate(r0,c+1);
      if(l >= 10) {
        putch(219);
        putch(219);
      }
      else if(l >= 5) {
       putch(220);
        putch(220);
      }
      else cprintf("  ");
      l = l - 10;
  } }

/*
```

```
   Function: potent(r,c,x) prints a "____" bar
representing the feedback
   potentiation level from the next lower eff level. */
void potent(int r, int c, int x) {
5    int r0,l,q;

l = x;
     q = 10;
     for(r0 = r; r0 > r-13; r0--) {
10       gotoxy (c+1,r0);
         if(l >= 10) cprintf("    ");
         else if(l < 10 & l > -10) {
           cprintf("____");
           q = 20;
15       }
         else cprintf("    ");
         l = l - q;
     } }

20
    void dsp_bottom (void) { gotoxy (49,24);
       mk_bar(speed*3);
25     cputs (bar);
       gotoxy (69,24);
       if(!dsp) puts ("OFF");
       else puts ("ON "); }

30  void dsp_n_var (void) {
       int x, r;

gotoxy (38,6);
       cprintf ("%3i",
35  net[cur_neuron]->adapt[0]->response);
```

```
      x = 0;
      for(r = 7; r < 20; r+= 5) {
        if (adapt_set[x] > 0) {
          gotoxy (20,r);
5
  cprintf("%3i",net[cur_neuron]->adapt[adapt_set[x]]->w-
  t[0]);

mk_bar(net[cur_neuron]->adapt[adapt_set[x]]->wt[0]);
10        gotoxy (20,r+1);
          cprintf("%s",bar);
          x++;
        }
      }
15    gotoxy (47, 6);
      cprintf("%3i",net[cur_neuron]->adapt[0]->wt[0]);
      mk_bar(net[cur_neuron]->adapt[0]->wt[0]);
      gotoxy (47,7);
      cprintf("%s",bar);
20    gotoxy (37,11);
      cprintf ("%5i",net[cur_neuron]->sigma);
      mk_bar (abs(net[cur_neuron]->sigma));
      gotoxy (37,13);
      cprintf ("%s",bar);
25    gotoxy (51,9);
      cprintf ("%5i",net[cur_neuron]->threshold); } void dsp_neuron (void) {
30      int x, r;

x = 0;
        for(r = 7; r < 20; r+= 5) {
          gotoxy (12,r-1);
35        cprintf("%3i",inslot[x++]);
```

```
        }
        gotoxy (34,16);
        cprintf ("%-26s", net[cur_neuron]->name);
        gotoxy (44, 17);
5       cprintf ("%3i",cur_neuron+1);
        gotoxy (49,18);
        cprintf ("%4i", net[cur_neuron]->thresh_setpoint);
        gotoxy (50,19);
        cprintf ("%2i", net[cur_neuron]->ttype);
10      dsp_n_var ();
        gotoxy (27,24);
        cprintf("%2i ",hr);
        gotoxy (10,24);
        cprintf("%2i ",min);
15      gotoxy (27,23);
        cprintf("%2i ",sec);
        gotoxy (10,23);
        cprintf("%3i   ",cycle); }

20    void dsp_a_var (int upd_flag)

{ int i, a, num_lvls=0;

a = net[cur_neuron]->adapt[cur_adaptrode]->atype;
25      while ((num_lvls <
      MAX_LEVELS)&&(atype[a].alpha[num_lvls] != -1))
          num_lvls++;
        gotoxy (19,5);
        cprintf("%3i
30    ",net[cur_neuron]->adapt[cur_adaptrode]->response);
        gotoxy (24,7);
        cprintf("%3i
      ",net[cur_neuron]->adapt[cur_adaptrode]->wt[0]);
        level(21,21,
35    net[cur_neuron]->adapt[cur_adaptrode]->wt[0]);
```

```
         if (num_lvls > 1)

potent(21,25,net[cur_neuron]->adapt[cur_adaptrode]->w-
       t[1]);
 5       else
           potent(21,25,atype[a].wt_equil);
         if (upd_flag != 0)
           for(i = 1; i < 5; i++) {
             if ((upd_flag == i)||(upd_flag < 0)) {
10           if (i < num_lvls)
             { gotoxy (36+((i-1)*12),7);
               cprintf("%3i
       ",net[cur_neuron]->adapt[cur_adaptrode]->wt[i]);

15     level(21,21+(i*12),net[cur_neuron]->adapt[cur_adaptro-
       de]->wt[i]);
             if(i < num_lvls-1) potent(21,25+(i * 12), net[cur_neuron]->adapt[cur_adaptrode]->wt[i+1]);
20           else potent(21,25+(i * 12),atype[a].wt_equil);
             }
             else
             { gotoxy (36+((i-1)*12),7);
               cprintf("     ");
25             level(21,21+(i*12),0);
               potent(21,25+(i*12),500);
             }
            }
           } }
30
       void dsp_adaptrode (void) {
         int a, i, num_lvls=0;

a = net[cur_neuron]->adapt[cur_adaptrode]->atype;
35       gotoxy (13,3);
```

```
      cprintf("%1i",cur_adaptrode);
      for(i = 1; i < 5; i++)
      { gotoxy (36+((i-1)*12),4);
        cprintf("%3i
5     ",net[cur_neuron]->adapt[cur_adaptrode]->gate[i]);
      }
      gotoxy (10,5);
      if (cur_adaptrode > 0)
        cprintf("%3i",inslot[cur_adaptrode-1]);
10    else
        cprintf("%3i",net[cur_neuron]->ave_out);
      gotoxy (15,6);
      while ((num_lvls <
    MAX_LEVELS)&&(atype[a].alpha[num_lvls] != -1))
15       num_lvls++;
      if (atype[a].excite > 0 && num_lvls > 2) cprintf
    ("H");
      else if (atype[a].excite > 0) cprintf ("|");
      else if (num_lvls > 2) cprintf ("O");
20    else cprintf ("O");
      gotoxy (27,24);
      cprintf("%2i ",hr);
      gotoxy (10,24);
      cprintf("%2i ",min);
25    gotoxy (27,23);
      cprintf("%2i ",sec);
      gotoxy (10,23);
      cprintf("%3i ",cycle); }

30  void dsp_atype (void) { int i, at;

at = net[cur_neuron]->adapt[cur_adaptrode]->atype;
35    gotoxy (10,9);
```

```
      cprintf ("%2i",atype[at].KAPPA);
      gotoxy (10,11);
      cprintf("%2i",atype[at].decay);
      gotoxy (11,21);
5     cprintf ("%3i", atype[at].wt_equil);
      for(i = 0; i < 5; i++) {
        gotoxy (1,16+i);
        if (atype[at].alpha[i] < 0)
          cprintf ("%2i%4i %1i %4i", atype[at].alpha[i],
10  atype[at].a_reset[i],
            atype[at].delta[i], atype[at].d_reset[i]);
        else
          cprintf ("%1i %4i %1i %4i", atype[at].alpha[i],
    atype[at].a_reset[i],
15          atype[at].delta[i], atype[at].d_reset[i]);
      } } void dsp_hurdles (void) {
      int i;
20    ADAPTRODE *a;

a = net[cur_neuron]->adapt[cur_adaptrode];
      for (i = 1; i < MAX_LEVELS; i++) {
        gotoxy (25 + i*12,23);
25      cprintf ("%3i", a->hrdl[i]);
      } }
```

```
/*&&&&&&&&&&&&&&&&&&&&&&&&&&&&&&&&&&&&&&&&&&&&&&&&-
&&&&&&&&&&&&&&&&&&&&
                                NEURISTR.C

This is a program to demonstrate the Mobus Neuristor
    II implementation

&&&&&&&&&&&&&&&&&&&&&&&&&&&&&&&&&&&&&&&&&&&&&&&&-
    &&&&&&&&&&&&&&&&&&&&*/ include <stdio.h>  #include <time.h>  #include
<ctype.h>  #include <string.h>  #include <bios.h>
#include <stdlib.h>  #include <dos.h>  #include <math.h>
include <conio.h> define MAX_ATYPES 5  #define MAX_NEURONS 1  #define
MAX_ADAPTRODES 4  #define MAX_INSLOTS 7  #define
MAX_OUTSLOTS 1  #define MAX_LEVELS 5  #define
MAX_HURDLES 3  #define MAX_VAL 200  #define MAX_SIGMA
1000  #define MIN_SIGMA -1000  #define VIDEO 0x10
define SCALING_FACTOR 300  #define OUTSLT_ALPHA 0.25 typedef struct hurdle {
    int  src_neur,
         src_adapt; } HURDLE;

typedef struct adaptrode {
    int owner,
        src,
        src_type,
        atype,
        response,
        wt[MAX_LEVELS],
        gate[MAX_LEVELS],
```

```
             hrdl[MAX_LEVELS];
        HURDLE h[MAX_LEVELS][MAX_HURDLES]; } ADAPTRODE;

typedef struct neuron {
5       char name[31];
        int  old_x0,
             new_x0,
             threshold,
             thresh_setpoint,
10           ttype,
             sigma,
             adapt_cnt,
             ave_out;
        ADAPTRODE *adapt[MAX_ADAPTRODES]; } NEURON;
15
     struct adapt_types {
        int   KAPPA,
              excite,
              decay,
20            wt_max,
              wt_equil,
              alpha[MAX_LEVELS],
              a_dwncnt[MAX_LEVELS],
              a_reset[MAX_LEVELS],
25            delta[MAX_LEVELS],
              d_dwncnt[MAX_LEVELS],
              d_reset[MAX_LEVELS]; } atype[MAX_ATYPES];

NEURON *net[MAX_NEURONS];
30
     int inslot[MAX_INSLOTS],
         outslot[MAX_OUTSLOTS][2];    /* outslot[][0] = src
     index,              */
                                      /* outslot[][1] =
35   value             */ int adapt_set[3] = {1, 2, 3};
```

```
       int dsp, n_view, cycle, frame, sec, min, hr, speed,
       demo; int cur_neuron = 0, cur_adaptrode = 0; int
       neurons = 1, inslots = MAX_INSLOTS, outslots = 1,
       atypes = 4; char bar[7];
 5
       /***********************************************-
       **********************
                         Function Prototypes
       ************************************************-
10     **********************/ void init_net (void); void
       load_net (void); void save_net (void); void dsp_switch
       (void); void set_speed (int ky9); void dsp_neuron ();
       void dsp_bottom (void); void dsp_n_var (void); void
       dsp_a_var (int upd_flag); void dsp_adaptrode (); void
15     dsp_atype (void); void dsp_hurdles (void); int
       pulse_code(int grey_scale); void drawline(int r0,int
       c0,int r9,int c9,int ch); void drawbox(int r0,int
       c0,int r9,int c9,int ch); void mk_bar(int i); void
       level(int r, int c, int x); void potent(int r, int c,
20     int x); void locate(int r, int c); void compute_hurdle
       (ADAPTRODE *a); void print_neuron_help(); void
       print_adaptrode_help(); void edit_threshold(); void
       modify_adapt_types(); void modify_hurdles(int
       hurdle_num); void modify_hrdl_inslots(int inslot_num);
25
       #include "draw.c" #include "getkey.c" #include
       "filenet.c" #include "drawadap.c" #include
       "drawneur.c" #include "mk_bar.c" #include "cmd.c"
       #include "cursr.c" #include "misc.c"
30
       /*
       ================================================-
       ====================
                          Pulse code generator
35     ================================================-
```

```
==================== */ int pulse_code(int
grey_scale) { double    temp;
    int       n, r;

temp = (float)(grey_scale)/SCALING_FACTOR;
/*SCALING_FACTOR*/
    n = 100 * exp( -temp );
    if ( (random (100)) >= n) return(1);
    else return(0); } void proc_outslots (void) { int i;

for (i=0; i<outslots; i++)
   { outslot[i][1] = OUTSLT_ALPHA*outslot[i][1] +
             (1 -
OUTSLT_ALPHA)*(net[outslot[i][0]]->ave_out * 30);
      net[outslot[i][0]]->ave_out = 0;
   } } int noise (int pulse) {
  return (pulse); } void compute_response (int n, int a) {
  int at, input;
  ADAPTRODE *ad;

ad = net[n]->adapt[a];   /* with net[n]->adapt[a] do
*/
  if (!ad) return;
  if (ad->src_type < 0) input = pulse_code
(inslot[ad->src]);
```

```
      else input = noise (net[ad->src]->old_x0);
      at = ad->atype;
      if ((atype[at].decay == -1)||(input > 0))
      { ad->response = atype[at].KAPPA * atype[at].excite
 5    * ad->wt[0];
         if (input > 0)
         { ad->wt[0] = ad->wt[0] +
           ((atype[at].wt_max - ad->wt[0]) >>
      atype[at].alpha[0]);
10           if (ad->wt[0] < atype[at].wt_max)
           (ad->wt[0])++;
         }
      }
      else
15    { ad->response = ad->response - (ad->response >>
      atype[at].decay);
         if (ad->response > 0)
           (ad->response)--;
      } }
20
      void compute_hurdle (ADAPTRODE *a) { int j, k;

for (j=0; j<MAX_LEVELS; j++)
           a->hrdl[j] = 0;
25       for (j=0; j<MAX_LEVELS; j++)
         { k = 0;
           while ((k < MAX_HURDLES)&&(a->h[j][k].src_neur !=
      -1))
           { if (a->h[j][k].src_adapt >= 0)
30         a->hrdl[j] +=
      net[a->h[j][k].src_neur]->adapt[a->h[j][k].src_adapt]-
      ->response;
             else
             a->hrdl[j] += inslot[a->h[j][k].src_neur];
35         k++;
```

```
    }
  } } void potentiate (ADAPTRODE *a, int lvl) { int
5   shift_factor;

shift_factor = atype[a->atype].alpha[lvl];
    a->wt[lvl] += ((a->wt[lvl-1] - a->wt[lvl]) >>
    shift_factor);
10  if (a->wt[lvl] < a->wt[lvl-1])
       (a->wt[lvl])++; } void decay (ADAPTRODE *a, int lvl, int num_lvls) { int
    shift_factor, w;
15
    shift_factor = atype[a->atype].delta[lvl];
    if (lvl == num_lvls - 1)
      w = atype[a->atype].wt_equil;
    else
20    w = a->wt[lvl+1];
    a->wt[lvl] -= ((a->wt[lvl] - w) >> shift_factor);
    if (((lvl == num_lvls - 1)&&(a->wt[lvl] >
    atype[a->atype].wt_equil))||
       ((lvl < num_lvls - 1)&&(a->wt[lvl] >
25  a->wt[lvl+1])))
       (a->wt[lvl])--; } void compute_new_weights (int n, int a)  /* for neuron
    n and adaptrode a */ {
30    int at, k, altered[MAX_LEVELS] = {0,0,0,0,0},
    num_lvls=0;
    ADAPTRODE *ad;

ad = net[n]->adapt[a];   /* with net[n]->adapt[a] do
35  */
```

```
      at = ad->atype;
      while ((num_lvls <
   MAX_LEVELS)&&(atype[at].alpha[num_lvls] != -1))
         num_lvls++;
 5    for (k = 1; k < num_lvls; k++)    /* compute
   increases */
      { if ((atype[at].a_dwncnt[k] == 0) && (ad->hrdl[k] >
   ad->gate[k])) {
           potentiate (ad, k);
10         altered[k] = 1;
        }
      }
      for (k = 0; k < num_lvls; k++)
      { if (atype[at].d_dwncnt[k] == 0) {
15         decay (ad, k, num_lvls);
           altered[k] = 1;
        }
      }
      if ((!n_view)&&(dsp))
20       for (k=0; k<num_lvls; k++)
           if (altered[k])
          dsp_a_var(k); } int proc_adaptrodes (int n) {
25    int j, sigma;

sigma = 0;
      for (j = 1; j < net[n]->adapt_cnt; j++) {
        compute_response (n, j);
30      sigma = sigma + net[n]->adapt[j]->response;
        if (sigma > MAX_SIGMA) sigma = MAX_SIGMA;
        else if (sigma < MIN_SIGMA) sigma = MIN_SIGMA;
        compute_new_weights (n, j);
      }
35    return (sigma); }
```

```
      void main(void) {
        int t, i, j, k, q, ky;

clrscr();
 5      highvideo();
        drawbox(2,2,23,76,2);
        gotoxy (22,4);
        cprintf("          NEURISTOR II ");
        gotoxy(22,5);
10      cprintf("    SIMULATION DEMONSTRATION");
        gotoxy(10,10);
        cprintf("Loading Simulation Data - Please Wait");
        load_net ();
        init_slots();
15      dsp = 1; n_view = 1; cycle = 0; frame = 1; sec = 0;
        min = 0; hr = 0;
        speed = 100; cur_adaptrode = 0; cur_neuron = 0; demo
        = 1;
        clrscr();
20      cursor_off();
        draw_neuron();
        dsp_neuron();
        dsp_bottom();
        while(demo){
25        if (dsp && n_view) {
            dsp_n_var();
          }
          else if (dsp) {
            dsp_a_var(0);
30        } /*
        Start cycle with look for command from user */
          if(bioskey(1) != 0 && frame) {
            ky = getkey();
            if((ky == 27) && n_view) {
35            demo = 0;
```

```
              continue;
            }
            else {
              if(n_view) n_cmd(ky);
              else a_cmd(ky);
            }
          }
          if (frame)
          { proc_outslots ();
            if (dsp)
            {   i = 0;
          while ((i<outslots)&&(outslot[i][0] !=
      cur_neuron)) i++;
              if (i < outslots)
              { if (n_view)
                { gotoxy (74,11);
                  cprintf("%3i", outslot[i][1]);
                }
                else if (cur_adaptrode == 0)
                { gotoxy (10,5);
                  cprintf("%3i", outslot[i][1]);
                }
              }
            }
            for (i=0; i < neurons; i++)
            for (j=0; j < net[i]->adapt_cnt; j++)
              compute_hurdle(net[i]->adapt[j]);
            if (dsp && !n_view)
            dsp_hurdles();
          }

/*****************************************************-
  **********************
          Clear new output and save old output.  Reset
  threshold
```

```
                ****************************************************-
              ********************/ for (i = 0; i < neurons; i++) {
 5              cur_neuron = i;
                net[i]->old_x0 = net[i]->new_x0;
                net[i]->new_x0 = 0;
                net[i]->sigma = 0;
                switch (net[i]->ttype) {
10                case 0:
                  net[i]->threshold = net[i]->thresh_setpoint;
                    break;
                  case 1:
                    net[i]->threshold = net[i]->thresh_setpoint
15          -
                    net[i]->adapt[0]->response;
                if (net[i]->threshold < 0)
                  net[i]->threshold = 0;
                    break;
20                case 2:
                    net[i]->threshold = net[i]->thresh_setpoint
        +
                    net[i]->adapt[0]->response;
                    break;
25              }
              }

/*****************************************************-
        *********************
30              Decrement all downcounters for Adaptrode
        types
        *****************************************************-
        ********************/

35      for (i = 0; i < atypes; i++) {
```

```
        for (j = 0; j < MAX_LEVELS; j++) {
       if (atype[i].alpha[j] < 0) break;
       if (j == 0) {
          if (atype[i].d_dwncnt[j] > 0)
 (atype[i].d_dwncnt[j])--;
       }
       else {
          if (atype[i].a_dwncnt[j] > 0)
 (atype[i].a_dwncnt[j])--;
          if (atype[i].d_dwncnt[j] > 0)
 (atype[i].d_dwncnt[j])--;
          }
        }
      }

/*******************************************-
*********************
                        Update Network State Variables
*******************************************-
*********************/ for (i = 0; i < neurons; i++) {
         net[i]->sigma = proc_adaptrodes (i);
         if (net[i]->sigma > net[i]->threshold)
         { net[i]->new_x0 = 1;
         (net[i]->ave_out)++;
         }
         else net[i]->new_x0 = 0;
         compute_response (i, 0);
         compute_new_weights (i, 0);
      }

/*****************************************-
*********************
```

```
                                        Reset all zero'd downcounters
           ***********************************************-
           **********************/

5          for (i = 0; i < atypes; i++) {
             for (j = 0; j < MAX_LEVELS; j++) {
               if (atype[i].alpha[j] < 0) break;
                 if (atype[i].a_dwncnt[j] == 0)
                   atype[i].a_dwncnt[j] =
10   atype[i].a_reset[j];
                 if (atype[i].d_dwncnt[j] == 0)
                   atype[i].d_dwncnt[j] =
     atype[i].d_reset[j];
             }
15         }

/***********************************************-
           **********************
                                        Process and display clock
20         ***********************************************-
           **********************/
               cycle++;
               if (cycle%10 == 0) frame = 1;
               else frame = 0;
25             if(cycle > 259) {
               cycle = 0;
               sec++;
               if(sec > 59) {
                 sec = 0;
30               min++;
                 if(min > 59) {
                   min = 0;
                   hr++;
                   gotoxy (27,24);
35                 cprintf("%2i ",hr);
```

```
            }
          gotoxy (10,24);
          cprintf("%2i ",min);
        }
5       gotoxy (27,23);
        cprintf("%2i ",sec);
         }
        gotoxy (10,23);
        cprintf("%3i ",cycle);
10      delay (100 - speed);
      }
    cursor_on ();
    lowvideo();
    save_net ();
15  clrscr(); }

/*
20  Function: locate() convenient conversion of BASIC
    locate command to
      the C gotoxy() function */ void locate(int r, int c)
      {
        gotoxy(c,r);
25    }
```

```
/*   NEURISTR.INI   */
1,7,1,4 0,1,1,3,300,0 0,4,0,0,3,4,2 1,4,14,14,3,45,25
2,4,60,10,3,200,110 3,4,300,10,3,600,310
4,4,1000,510,3,6000,4510 1,1,1,2,300,0 0,3,0,0,2,4,2
1,3,14,14,2,30,25 2,-1,0,0,0,0,0 3,-1,0,0,0,0,0
4,-1,0,0,0,0,0 2,1,1,3,300,0 0,4,0,0,3,4,2
1,4,14,14,3,45,25 2,4,60,10,3,200,110
3,4,300,10,3,600,310 4,4,1000,510,3,6000,4510
3,1,-1,3,300,0 0,4,0,0,3,4,2 1,4,14,14,3,45,25
2,4,60,10,3,200,110 3,4,300,10,3,600,310
4,4,1000,510,3,6000,4510 0,Demonstration
Neuron,0,0,100,100,0,0,4,0 0,0,0,1,0,0
0,0,-1,0,-1,0,-1,0,-1,0, 1,0,-1,0,-1,0,-1,0,-1,0,
2,0,-1,0,-1,0,-1,0,-1,0, 3,0,-1,0,-1,0,-1,0,-1,0,
4,0,-1,0,-1,0,-1,0,-1,0, 1,0,0,-1,1,0
0,0,-1,0,-1,0,-1,0,-1,0, 1,0,-1,0,-1,0,-1,0,-1,0,
2,0,-1,0,-1,0,-1,0,-1,0, 3,0,-1,0,-1,0,-1,0,-1,0,
4,0,-1,0,-1,0,-1,0,-1,0, 2,0,1,-1,2,0
0,0,-1,0,-1,0,-1,0,-1,0, 1,0,-1,0,-1,0,-1,0,-1,0,
2,0,-1,0,-1,0,-1,0,-1,0, 3,0,-1,0,-1,0,-1,0,-1,0,
4,0,-1,0,-1,0,-1,0,-1,0, 3,0,2,-1,3,0
0,0,-1,0,-1,0,-1,0,-1,0, 1,0,-1,0,-1,0,-1,0,-1,0,
2,0,-1,0,-1,0,-1,0,-1,0, 3,0,-1,0,-1,0,-1,0,-1,0,
4,0,-1,0,-1,0,-1,0,-1,0,
```

I claim:

1. A synaptic processor for use in constructing artificial neurons, comprising:
   a memory device for storing values of first and second expectations, initial values of said first and second expectations, values of a maximum expectation, and an equilibrium expectation, said values of said first and second expectations being bounded by said values of said maximum and equilibrium expectations;
   a Neuroprocessor connected to said memory device and being programmed to read said initial values of said first and second expectations from said memory device, to initialize said first and second expectations to said initial values, to receive an input signal, to modify said first expectation as a function of said input signal and said second expectation, to modify said second expectation in response to said first expectation, and to store the values of said first and second expectations in said memory device; and to generate a result signal as a function of said first expectation.

2. A synaptic processor, as set forth in claim 1, wherein said expectations have the relationships:

$$W^M > W^0 > W^1 > W^E,$$

where,
   $W^M$=the maximum expectation,
   $W^0$=the first expectation,
   $W^1$=the second expectation, and
   $W^E$=the equilibrium expectation.

3. A synaptic processor, as set forth in claim 1, wherein said result signal is a linear function of said first expectation.

4. A synaptic processor, as set forth in claim 1, wherein said result signal is a nonlinear function of said first expectation.

5. A synaptic processor, as set forth in claim 1, wherein said result signal is determined by:

$$r = k \cdot W^0 \cdot e^{-\lambda \tau},$$

where,
   r=the result signal,
   k=a first constant,
   $W^0$=the first expectation,
   λ=a second constant, and
   τ=a predetermined time differential.

6. A synaptic processor, as set forth in claim 1, wherein said result signal is updated at discrete time intervals of Δt and is determined by:

$$r(t) = k \cdot W^0, \text{ if } X > 0,$$

or $$r(t) = r(t-\Delta t) - \lambda \cdot r(t-\Delta t),$$

otherwise
where,
   r=the result signal,
   t=the current time,
   k=a first constant,
   $W^0$=the first expectation, and
   λ=a second constant.

7. A synaptic processor, as set forth in claim 1, wherein said first expectation is a function of the magnitude of said input signal.

8. A synaptic processor, as set forth in claim 1, wherein said Neuroprocessor is programmed to decrease said first expectation in response to said second expectation.

9. A synaptic processor, as set forth in claim 1, wherein said Neuroprocessor is programmed to determine the difference between said first and second expectations and to decrease said first expectation in response to said difference and a first decay constant.

10. A synaptic processor, as set forth in claim 1, wherein said Neuroprocessor is programmed to increase said first expectation in response to the magnitude of said input signal and said maximum expectation.

11. A synaptic processor, as set forth in claim 10, wherein said Neuroprocessor is programmed to determine the difference between said first and maximum expectations and to increase said first expectation in response to said input signal, said difference, and a first rise constant.

12. A synaptic processor, as set forth in claim 1, wherein said Neuroprocessor is programmed to increase said second expectation in response to said first expectation.

13. A synaptic processor, as set forth in claim 1, wherein said Neuroprocessor is programmed to decrease said second expectation in response to said equilibrium expectation.

14. A synaptic processor, as set forth in claim 1, wherein said Neuroprocessor is programmed to determine a net modification and to add said net modification to said first expectation, wherein said net modification includes a first increase term and a first decrease term, said first increase term being a function of said first expectation and a first rise constant and said first decrease term being a function of said first expectation and a first decay constant.

15. A synaptic processor, as set forth in claim 1, wherein said Neuroprocessor is programmed to determine a net modification and to add said net modification to said second expectation, wherein said net modification includes a second increase term and a second decrease term, said second increase term being a function of said second expectation and a second rise constant, and said second decrease term being a function of said second expectation and a second decay constant.

16. A synaptic processor, as set forth in claim 1, wherein said Neuroprocessor is programmed to modify said equilibrium expectation, wherein the net modification to said equilibrium expectation includes an increase term and a decrease term, said increase term being a function of said second expectation and a rise constant and said decrease term being a function of a second decay constant.

17. A synaptic processor, as set forth in claim 1, wherein said first expectation is determined by:

$$W^0 = W_p^{\,0} + X \cdot \alpha^0 \cdot [W^M - W_p^{\,0}] - \delta^0 \cdot [W_p^{\,0} - W^1],$$

where,
   $W^0$=the first expectation,
   $W^1$=the second expectation,
   X=the input signal,
   $\alpha^0$=a first rise constant,
   $\delta^0$=a first decay constant,
   $W^M$=the maximum expectation, and
   $W_p^{\,0}$=the previous first expectation.

18. A synaptic processor, as set forth in claim 1, wherein said first expectation ms determined by:

$$W^0 = W_p^{\,0} + X \cdot \alpha^0 - \delta^0 \cdot [W_p^{\,0} - W^1],$$

where,
   $W^0$=the first expectation,
   $W^1$=the second expectation,

X=the input signal,
$\alpha^0$=a first rise constant,
$\delta^0$=a first decay constant,
$W^M$=the maximum expectation, and
$W^0_p$=the previous first expectation.

19. A synaptic processor, as set forth in claim 1, wherein said second expectation is determined by:

$$W^1 = W_p^1 + \alpha^1 \cdot [W_p^0 - W_p^1] - \delta^1 \cdot [W_p^1 - W^E],$$

where,
$W^1$=the second expectation,
$\alpha^1$=a second rise constant,
$\delta^1$=a second decay constant,
$W^E$=the equilibrium expectation, and
$W_p^1$=the previous second expectation.

20. A synaptic processor for use in constructing artificial neurons, comprising:
   a memory device for storing values of a first expectation and at least one second expectation and initial values of said first and at least one second expectation, wherein the number of second expectations is denoted by L;
   a Neuroprocessor connected to said memory device, said Neuroprocessor being programmed to read said initial values of said first and second expectations from said memory device, to initialize said first and at least one second expectations to said initial values, to receive an input signal, to responsively modify said first expectation, to modify said at least one second expectation, wherein said at least one second expectation is denoted by $W^1$ and is a function of:
   said first expectation, if l=1, or a previous second expectation,
   $W^{l-1}$, otherwise, and to responsively generate a result signal.

21. A synaptic processor, as set forth in claim 20, wherein said neuroprocessor is programmed to receive a potentiation signal, and wherein said potentiation signal is in one of a permit state and an inhibit state, and wherein said second expectation is modified when said potentiation signal is in said permit state and where in said second expectation is not modified when said potentiation signal is in said inhibit state.

22. A Neurocomputer used in constructing a neural network, comprising:
   a memory device for storing values of an input expectation and first and second expectations, initial values of said input expectation and said first and second expectations and a value of a first decay constant;
   a first synaptic processor for producing a first result signal in response to a first input signal, said first synaptic processor including:
      a first Neuroprocessor connected to said memory device, said Neuroprocessor being programmed to read said initial value of said input expectation, to initialize said input expectation to said initial value, to receive said first input signal, to modify said input expectation, wherein the net modification to said input expectation includes an increase term and a decrease term, said increase term being responsive to the magnitude of said input signal and said decrease term being independent of said magnitude and a function of a first decay constant, and to responsively generate a first result signal; and
   a second synaptic processor for producing a second output signal in response to a second input signal, said second synaptic processor including:
      a second Neuroprocessor connected to said memory device, said second Neuroprocessor being programmed to read said initial values of said first and second expectations, to initialize said first and second expectations to said initial values, to receive said second input signal, to modify said first expectation in response to said second input signal and said second expectation, to receive said first result signal and to responsively modify said second expectation, and to responsively generate a second result signal.

23. An artificial neuron, comprising:
   a memory device for storing values of a threshold signal and a plurality input expectations and initial values of said input expectations;
   at least two input synaptic processors for producing respective result signals in response to respective input signals, said input synaptic processors including:
      a Neuroprocessor connected to said memory device, said Neuroprocessor being programmed to read said initial values of said input expectations, to initialize said input expectations to said respective initial value, to receive respective input signals, to modify said input expectations, wherein the net modification to each input expectation has an increase term and a decrease term, said increase term being responsive to the magnitude of said respective input signal and said decrease term being independent of said magnitude and a function of a respective decay constant, and to responsively generate respective result signals; and
   wherein said Neuroprocessor includes a summation and output processor, said summation and output processor being adapted to receive said result signals, sum said result signals, and responsively generate an output signal.

24. An artificial neuron, comprising:
   a memory device for storing values of a threshold signal and a plurality of first and second expectations and initial values of said first and second expectations;
   at least two input synaptic processors connected to said memory device, said at least two input synaptic processors being programmed to generate respective result signals in response to respective input signals, each said input synaptic processor including:
      a Neuroprocessor connected to said memory device, said Neuroprocessor being programmed to read said initial values of said first and second expectations, to initialize said first and second expectations to said initial values, to receive an input signal, to modify said first expectation as a function of said input signal and said second expectation, and to modify said second expectation in response to said first expectation, and to generate a result signal; and
   wherein said artificial neuron is adapted to receive said result signals, sum said result signals, and responsively generate an output signal.

25. A synaptic processor for use in a neural network, for producing a result signal in response to an input signal, comprising:
   means for initializing first and second expectations, said first and second expectations being bounded by a maximum expectation and an equilibrium expectation;
   means for receiving said input signal and said first expectation and generating a modified first expectation;
   means for receiving said second expectation and said modified first expectation, modifying said second expectation as a function of said modified first expectation, and responsively generating a modified second expectation;

wherein said modified second expectation is provided to said modified first expectation generating means and wherein said modified first expectation is a function of said modified second expectation and said input signal;

means for receiving said modified first expectation and producing said result signal as a function of said first expectation; and means for receiving said result signal and providing said result signal to the neural network.

26. A synaptic processor, as set forth in claim 25, wherein said expectations have the relationships:

$$W^M > W^O > W^1 > W^E,$$

where, $W^M$=the maximum expectation, $W^O$=the modified first expectation, $W^1$=the modified second expectation, and $W^E$=the equilibrium expectation.

27. A synaptic processor, as set forth in claim 25, wherein said result signal is a linear function of said modified first expectation.

28. A synaptic processor, as set forth in claim 25, wherein said result signal is a nonlinear function of said modified first expectation.

29. A synaptic processor, as set forth in claim 25, wherein said result signal is determined by:

$$r = k \cdot W^O \cdot e^{-\lambda \tau},$$

where, r=the result signal, k=a first constant signal, $W^O$=the modified first expectation, λ=a second constant, and τ=a predetermined time differential.

30. A synaptic processor, as set forth in claim 25, wherein said result signal is updated at discrete time intervals of Δt and is determined by:

$$r(t) = k \cdot W^O, \text{ if } X > 0,$$

or $$r(t) = r(t - \Delta t) - \lambda \cdot r(t - \Delta t),$$

otherwise, where r=the result signal, t=the current time, k=a first constant, $W^O$=the modified first expectation, and λ=a second constant.

31. A synaptic processor, as set forth in claim 25, wherein said modified first expectation is a function of the magnitude of said input signal.

32. A synaptic processor, as set forth in claim 25, wherein said first expectation modifying means includes means for decreasing said first expectation in response to said modified second expectation.

33. A synaptic processor, as set forth in claim 32, wherein said first expectation decreasing means includes means for determining the difference between said first expectation and said second modified expectation and decreasing said first expectation in response to said difference and a first decay constant.

34. A synaptic processor, as set forth in claim 25, wherein said first expectation modifying means includes means for increasing said first expectation in response to the magnitude of said input signal and said maximum expectation.

35. A synaptic processor, as set forth in claim 34, wherein said first expectation increasing means includes means for determining the difference between said first and maximum expectations and increasing said first expectation in response to said input signal, said difference, and a first rise constant.

36. A synaptic processor, as set forth in claim 34, wherein said second expectation increasing means includes means for determining the difference between said second expectation and said first modified expectation and increasing said second expectation in response to said difference and a second rise constant.

37. A synaptic processor, as set forth in claim 25, wherein said second expectation modifying means includes means for increasing said second expectation in response to said first expectation.

38. A synaptic processor, as set forth in claim 25, wherein said second expectation modifying means includes means for decreasing said second expectation in response to said equilibrium expectation.

39. A synaptic processor, as set forth in claim 25, wherein said second expectation decreasing means includes means for determining the difference between said second and equilibrium expectations and decreasing said second expectation in response to said difference and a second decay constant.

40. A synaptic processor, as set forth in claim 25, wherein said first modifying means includes means for increasing said first expectation in response to the magnitude of said input and decreasing said first expectation in response to said modified second expectation.

41. A synaptic processor, as set forth in claim 25, wherein said second modifying means includes means for increasing said second expectation in response to said modified first expectation and decreasing said second expectation in response to said equilibrium expectation.

42. A synaptic processor, as set forth in claim 25, wherein said first expectation modifying means includes means for determining a net modification and adding said net modification to said first expectation, wherein said net modification includes a first increase term and a first decrease term, said first increase term being a function of said first expectation and a first rise constant and said first decrease term being a function of said first expectation and a first decay constant.

43. A synaptic processor, as set forth in claim 25, wherein said second expectation modifying means includes means for determining a net modification and adding said net modification to said second expectation, wherein said net modification includes a second increase term and a second decrease term, said second increase term being a function of said second expectation and a second rise constant, and said second decrease term being a function of said second expectation and a second decay constant.

44. A synaptic processor, as set forth in claim 25, wherein said first expectation modifying means includes means for determining a first net modification and adding said first net modification to said first expectation, wherein said first net modification includes a first increase term and a first decrease term, said first increase term being a function of said first expectation and a first rise constant and said first decrease term being a function of said first expectation and a first decay constant, and wherein said second expectation modifying means includes means for determining a second net modification to said second expectation and adding said second net modification to said second expectation, wherein said second net modification includes a second increase term and a second decrease term, said second increase term being a function of said second expectation and a second rise constant, and said second decrease term being a function of said second expectation and a second decay constant.

45. A synaptic processor as set forth in claim 25, including means for modifying said equilibrium expectation, wherein the net modification to said equilibrium expectation includes an increase term and a decrease term, said increase term being a function of said modified second expectation and a rise constant and said decrease term being a function of a second decay constant.

46. A synaptic processor, as set forth in claim 25, wherein said modified first expectation is determined by:

$$W^0 = W_p^0 + X \cdot \alpha^0 \cdot [W^M - W_p^0] - \delta^0 \cdot [W_p^0 - W^1],$$

where, $W^0$=the modified first expectation, $W^1$=the modified second expectation, X=the input signal, $\alpha^0$=a first rise constant, $\delta^0$=a first decay constant, $W^M$=the maximum expectation, and $W_p^0$=the previous modified first expectation.

47. A synaptic processor, as set forth in claim 25, wherein said modified first expectation is determined by:

$$W^0 = W_p^0 + X \cdot \alpha^0 - \delta^0 \cdot [W_p^0 - W^1],$$

where, $W^0$=the modified first expectation, $W^1$=the modified second expectation, X=the input signal, $\alpha^0$=a first rise constant, $\delta^0$=a first decay constant, $W^M$=the maximum expectation, and $W_p^0$=the previous modified first expectation.

48. A synaptic processor, as set forth in claim 25, wherein said modified second expectation is determined by:

$$W^1 = W_p^1 + \alpha^1 \cdot [W_p^0 - W_p^1] - \delta^1 \cdot [W_p^1 - W^E],$$

where, $W^1$=the modified second expectation, $\alpha^1$=a second rise constant, $\delta^1$=a second decay constant, $W^E$=the equilibrium expectation, and $W_p^1$=the modified previous second expectation.

49. A synaptic processor for use in a neural network, for producing a result signal in response to an input signal, comprising:

means for initializing a first expectation and at least one second expectation, said first and second expectations being bounded by a maximum expectation and an equilibrium expectation, wherein the number of second expectations is denoted by L;

means for receiving said input signal and said first expectation and generating a modified first expectation;

means for receiving said modified first expectation and said at least one second expectation, modifying said at least one second expectation, and responsively generating at least one modified second expectation, wherein said at least one modified second expectation is denoted by $W^1$ and is a function of:

said first expectation, if l=1, or a previous second expectation, $W^{l-1}$, otherwise;

wherein said at least one modified second expectations provided to said modified first expectation generating means and wherein said modified first expectation signa is a function of said at least one modified second expectation and said input signal;

means for receiving said modified first expectation and producing said result signal as a function of said modified first expectation; and means for receiving said result signal and providing said result signal to the neural network.

50. A synaptic processor, as set forth in claim 49, wherein said modified first expectation is determined by:

$$W^0 = W_p^0 + X \cdot \alpha^0 \cdot [W^M - W_p^0] - \delta^0 \cdot [W_p^0 - W^1],$$

where, $W^0$=the modified first expectation, $W_p^0$=the previous modified first expectation, X=the input signal, $\alpha^0$=a rise constant, $W^M$=the maximum expectation, $\delta^0$=a decay constant, and $W^1$=the modified second expectation.

51. A synaptic processor, as set forth in claim 49, wherein said modified first expectation is determined by:

$$W^0 = W_p^0 + X \cdot \alpha^0 - \delta^0 \cdot [W_p^0 - W^1],$$

where, $W^0$=the modified first expectation, $W_p^0$=the previous modified first expectation, X=the input signal, $\alpha^0$=a rise constant, $\delta^0$=a decay constant, and $W^1$=the modified second expectation.

52. A synaptic processor, as set forth in claim 49, including means for receiving a second input signal and responsively producing a potentiation signal and wherein said at least one modified second expectation is a function of said potentiation signal.

53. A synaptic processor, as set forth in claim 52, wherein each of said at least one modified second expectations is determined by:

$$W^l = W_p^l + P \cdot \alpha^1 \cdot [W_p^{l-1} - W^l)] - \delta^1 \cdot [W_p^l - W^{l+1}],$$

if l>0 AND l <L, or $$W^l = W_p^l + P \cdot \alpha^1 \cdot [W_p^{l-1} - W^l] - \delta^1 \cdot [W_p^l - W^E],$$

if l=L, where, $W^0$=the modified first expectation, $W^l$=the modified second expectation, $W_p^1$=the previous value of the modified second expectation, P=the potentiation signal, $\alpha^1$=a rise constant, $W^M$=the maximum expectation, $\delta^1$=the decay constant, and $W^E$=the equilibrium expectation.

54. A synaptic processor for use in a neural network, for producing a result signal in response to a first input signal and a second input signal, comprising:

means for initializing first and second expectations, said first and second expectations being bounded by a maximum expectation and a equilibrium expectation;

means for receiving said first input signal and said first expectation and generating a modified first expectation;

means for receiving said second input signal and responsively producing a potentiation signal;

means for receiving said first modified expectation, said second expectation and said potentiation signal, modifying said second expectation as a function of said modified first expectation and said potentiation signal, and responsively generating a modified second expectation;

wherein said modified second expectation is provided to said first modified expectation generating means and wherein said modified first expectation is a function of said modified second expectation and said first input signal;

means for receiving said first input signal and said modified first expectation and producing said result signal as a function of said first input signal and said modified first expectation; and means for receiving said result signal and providing said result signal to the neural network.

55. A synaptic processor, as set forth in claim 54, wherein said result signal is a linear function of said modified first expectation.

56. A synaptic processor, as set forth in claim 54, wherein said result signal is a nonlinear function of said modified first expectation.

57. A synaptic processor, as set forth in claim 54, wherein said result signal is determined by:

$$r = k \cdot W^0 \cdot e^{-\lambda \tau},$$

where, $r$=the result signal, $k$=a first constant, $W^0$=the first expectation, $\lambda$=a second constant, and $\tau$=a predetermined time differential.

58. A synaptic processor, as set forth in claim 54, wherein said result signal is updated at discrete time intervals of $\Delta t$ and is determined by:

$$r(t) = k \cdot W^0, \text{ if } X > 0,$$

or $$r(t) = t(t-\Delta t) - \lambda \cdot r(t-\Delta t),$$

otherwise, where, $X$=the input signal, $t$=the current time, $r$=the result signal, $k$=a first constant, $W^0$=the first expectation, and $\lambda$=a second constant.

59. A synaptic processor, as set forth in claim 54, wherein said first expectation is a function of the magnitude of said input signal.

60. A synaptic processor, as set forth in claim 54, wherein said initializing means includes means for initializing a gating signal, and wherein said potentiation signal producing means includes means for comparing said second input signal and said gating signal and producing said potentiation signal in response thereof.

61. A synaptic processor, as set forth in claim 60, wherein said potentiation signal producing means includes means for determining said gating signal and said second input signal.

62. A synaptic processor, as set forth in claim 61, wherein said second input signal determining means includes means for receiving a plurality of interaction signals and summing said interaction signals.

63. A synaptic processor, as set forth in claim 60, wherein said potentiation signal is in a permit state if said second input signal exceeds said gating signal and in an inhibit state otherwise and wherein said second expectation is modified when said potentiation signal is in said permit state and where in said second expectation is not modified when said potentiation signal is in said inhibit state.

64. A synaptic processor, as set forth in claim 63, wherein said second expectation modifying means includes means for increasing said second expectation in response to said first expectation if said potentiation signal is in said permit state.

65. A synaptic processor, as set forth in claim 54, including means for modifying said equilibrium expectation, wherein the net modification to said equilibrium expectation includes an increase term and a decrease term, said increase term being a function of said second expectation and a rise constant, and said decrease term signal being a function of a decay constant.

66. A synaptic processor, as set forth in claim 54, wherein said modified first expectation is determined by:

$$W^0 = W_p^0 + X \cdot \alpha^0 \cdot [W^M - W_p^0] - \delta^0 \cdot [W_p^0 - W^1],$$

where, $W^0$=the modified first expectation, $W^1$=the modified second expectation, $W_p^0$=the previous modified first expectation, $X$=the first input signal, $\alpha^0$=a first rise constant, $\delta^0$=a first decay constant, and $W^M$=the maximum expectation.

67. A synaptic processor, as set forth in claim 54, wherein said modified first expectation is determined by:

$$W^0 = W_p^0 + X \cdot \alpha^0 - \delta^0 \cdot [W_p^0 - W^1],$$

where, $W^0$=the modified first expectation, $W_p^0$=the previous modified first expectation, $W^1$=the modified second expectation, $X$=the first input signal, $\alpha^0$=a first rise constant, and $\delta^0$=a first decay constant.

68. A synaptic processor, as set forth in claim 54, wherein said modified second expectation is determined by:

$$W^1 = W_p^1 + P \cdot \alpha^1 \cdot [W_p^0 - W^1] - \delta^1 \cdot [W_p^1 - W^E],$$

where, $W^0$=the modified first expectation, $W^1$=the modified second expectation, $X$=the first input signal, $\alpha^0$=a first rise constant, $\delta^0$=a first decay constant, $W^M$=the maximum expectation, and $W_p^1$=the previous modified second expectation.

69. A processing element for use in a neural network, comprising:

a first synaptic processor for producing a first result signal in response to a first input signal, comprising:

means for initializing an input expectation, said first input expectation being bounded by a first maximum expectation and a first equilibrium expectation;

means for receiving said first input signal and said input expectation, responsively modifying said input expectation, and responsively generating a modified input expectation, wherein the net modification to said input expectation includes a first increase term and a first decrease term, said first increase term being responsive to said first input signal, and said first decrease term being a function of said first equilibrium expectation; and means for receiving said modified input expectation and producing said first result signal as a function of said modified input expectation;

a second synaptic processor for producing a second result signal in response to a second input signal, including:

means for initializing first and second expectations, said first and second expectations being bounded by a second maximum expectation and a second equilibrium expectation;

means for receiving said second input signal and said first expectation and generating a modified first expectation;

means for receiving said first result signal and responsively producing a potentiation signal;

means for receiving said first modified expectation, said second expectation and said potentiation signal, modifying said second expectation as a function of said modified first expectation and said potentiation signal and responsively generating a modified second expectation;

wherein said modified second expectation is provided to said modified first expectation generating means and wherein said first modified first expectation is a function of said second input signal and said second modified expectation; and means for receiving said first input signal and said first modified expectation and producing said second result signal as a function of said second input signal and said modified first expectation;

means for receiving said first and second result signals and providing said result signals to the neural network.

70. A processing element, as set forth in claim 69, wherein said first result signal is determined by:

$$r^1 = k \cdot W^{01} \cdot e^{-\lambda \tau},$$

where, $r^1$=the first result signal, k=a first constant, $W^{01}$=the modified input expectation, $\lambda$=a second constant, and $\tau$=a predetermined time differential.

71. A processing element, as set forth in claim 69, wherein said first result signal is updated at discrete time intervals of $\Delta t$ and is determined by:

$$r^1(t) = k \cdot W^{01}, \text{ if } X^1 > 0,$$

or $$r^1(t) = r(t - \Delta t) - \lambda \cdot r(t - \Delta t),$$

otherwise where $X^1$=the first input signal, t=the current time, $r^1$=the first result signal, k=a first constant, $W^{01}$=the modified input expectation, and $\lambda$=a second constant.

72. A processing element, as set forth in claim 69, wherein said first decrease term is proportional to the difference between said modified input expectation and said first equilibrium expectation and in accordance with a first decay constant.

73. A processing element, as set forth in claim 69, wherein said first increase term is a function of the difference between said modified input expectation and said first maximum expectation and a first rise constant.

74. A processing element, as set forth in claim 69, wherein said first synaptic processor includes means for modifying said first equilibrium expectation, wherein the net modification to said first equilibrium expectation has a second increase term and a second decrease term, said second increase term being a function of said input expectation and a second rise constant, and said second decrease term being a function of a second decay constant.

75. A processing element, as set forth in claim 69, wherein said modified input expectation is determined by:

$$W^{01} = W_p^{01} + X^1 \cdot \alpha^{01} \cdot [W^{M1} - W_p^{01})] - \delta^{01} \cdot [W_p^{01} - W^{E1}],$$

where, $W^{01}$=the modified input expectation, $X^1$=the input signal, $\alpha^{01}$=a first rise constant, $\delta^{01}$=a first decay constant, $W^{M1}$=the maximum expectation, and $W_p^{01}$=the previous modified input expectation.

76. A processing element, as set forth in claim 69, wherein said modified input expectation is determined by:

$$W^{01} = W_p^{01} + X^1 \cdot \alpha^{01} - \delta^{01} \cdot [W^{01} - p \, W^{E1}],$$

where, $W^{01}$=the modified input expectation, $X^1$=the input signal, $\alpha^{01}$=a first rise constant, $\delta^{01}$=a first decay constant, and $W_p^{01}$=the previous modified input expectation.

77. A processing element, as set forth in claim 69, wherein said second maximum, second equilibrium, and said first and second expectations have the relationships:

$$W^{M2} > W^{02} > W^{12} > W^{E2},$$

where, $W^{M2}$=the second maximum expectation, $W^{02}$=the modified first expectation, $W^{12}$=the modified second expectation, and $W^{E2}$=the equilibrium expectation.

78. A processing element, as set forth in claim 69, wherein said second result signal, $r^2$, is determined by:

$$r^2 = k \cdot W^{02} \cdot e^{-\lambda \tau}.$$

where, r²=the second result signal, k=a first constant, $W^{02}$=the modified first expectation, λ=a second constant, and τ=a predetermined time differential.

79. A processing element, as set forth in claim 69, wherein said second result signal is updated at discrete time intervals of Δt and is determined by:

$$r^2(t) = k \cdot W^{02}, \text{ if } X^2 > 0,$$

or $$r^2(t) = r(t-\Delta t) - \lambda \cdot r(t-\Delta t),$$

otherwise,
where, $X^2$=the second input signal, t=the current time, r²=the second result signal, k=a first constant, $W^{02}$=the modified first expectation, and λ=a second constant.

80. A processing element, as set forth in claim 69, wherein said modified first expectation is a function of the magnitude of said first input signal.

81. A processing element, as set forth in claim 69, wherein said first expectation modifying means includes means for determining a net modification and adding said net modification to said first expectation, wherein said net modification includes a third increase term and a third decrease term, said third increase term being a function of said first expectation and a third rise constant, and said third decrease term being a function of said first expectation and a third decay constant.

82. A processing element, as set forth in claim 69, wherein said second expectation modifying means includes means for determining a net modification and adding said net modification to said second expectation, wherein said net modification includes a fourth increase term and a fourth decrease term, said fourth increase term being a function of said modified first expectation and a fourth rise constant, and said fourth decrease term being a function of said modified first expectation and a fourth decay constant.

83. A processing element, as set forth in claim 69, wherein said first expectation modifying means includes means for determining a first net modification and adding said first net modification to said first expectation, wherein said first net modification includes a third increase term and a third decrease term, said third increase term being a function of said first expectation and a third rise constant, and said third decrease term being a function of said first expectation, and a third decay constant, and wherein said second expectation modifying means includes means for determining a second net modification to said second expectation and adding said second net modification to said second expectation, wherein said second net modification includes a fourth increase term and a fourth decrease term, said fourth increase term being a function of said modified first expectation and a fourth rise constant, and said fourth decrease term being a function of said modified first expectation and a second decay constant.

84. A processing element, as set forth in claim 69, including means for modifying said second equilibrium expectation, wherein the net modification to said second equilibrium expectation has a fifth increase term and a fifth decrease term, said fifth increase term being a function of said second expectation and a fifth rise constant, and said fifth decrease term being a function of a fifth decay constant.

85. A processing element, as set forth in claim 69, wherein said modified first expectation is determined by:

$$W^{02} = W_p^{02} + X^2 \cdot \alpha^{02} \cdot [W^{M2} - W_p^{02}] - \delta^{02} \cdot [W_p^{02} - W^{12}],$$

where, $W^{02}$=the modified first expectation, $W^{12}$=the modified second expectation, $X^2$=the second input signal, $\alpha^{02}$=a third rise constant, $\delta^{02}$=a third decay constant, and $W_p^{02}$=the previous modified first expectation.

86. A processing element, as set forth in claim 69, wherein said modified first expectation is determined by:

$$W^{02} = W_p^{02} + X^2 \cdot \alpha^{02} - \delta^{02} \cdot [W_p^{02} - W^{12}],$$

where, $W^{02}$=the modified first expectation, $W^{12}$=the modified second expectation, $X^2$=the second input signal, $\alpha^{02}$=a third rise constant, $\delta^{02}$=a third decay constant, and $W_p^{02}$=the previous modified first expectation.

87. A processing element, as set forth in claim 69, wherein said modified second expectation, $W^{12}$, is determined by:

$$W^{12} = W_p^{12} + P \cdot \alpha^{12} \cdot [W^{02} - p\, W^{12}] - \delta^{12} \cdot [W^{12} p - W^{E2}],$$

where, $W^{12}$=the modified second expectation,

P=the potentiation signal, $\alpha^{12}$=a fourth rise constant, $\delta^{12}$=a fourth decay constant, and $W_p^{12}$=the previous modified second.

88. A processing element for use in a neural network, comprising:

means for producing a threshold signal;

at least two input synaptic processors for producing respective result signals in response to respective input signals, each said input synaptic processor including:

means for initializing first and second expectations, said first and second expectations being bounded by a maximum expectation and an equilibrium expectation;

means for receiving said input signal and said first expectation and generating a modified first expectation;

means for receiving said modified first expectation and said second expectation, modifying said second expectation as a function of said modified first expectation, and responsively generating a modified second expectation;

wherein said modified second expectation is provided to said modified first expectation generating means and wherein said modified first expectation is a function of said modified second expectation and input signal; and means for receiving said modified first expectation and producing said result signal as a function of said modified first expectation; and means for receiving said result signals, summing said result signals, and responsively producing a sigma signal; and means for receiving said sigma signal and said threshold signal and responsively producing an output signal.

89. A processing element, as set forth in claim 88, wherein said expectations have the relationships:

$$W^M > W^O > W^1 > W^E,$$

where, $W^M$=the maximum expectation,
$W^O$=the modified first expectation,
$W^1$=the modified second expectation, and
$W^E$= the equilibrium expectation.

90. A processing element, as set forth in claim 88, wherein said first expectation modifying means includes means for determining a first net modification and adding said first net modification to said first expectation, wherein said first net modification has a first increase term and a first decrease term, said first increase term being a function of said first expectation and a first rise constant and said first decrease term being a function of said first expectation and a first decay constant, and wherein said second expectation modifying means includes means for determining a second net modification to said second expectation and adding said second net modification to said second expectation, wherein said second net modification includes a second increase term and a second decrease term, said second increase term being a function of said second expectation and a second rise constant, and said second decrease term being a function of said second expectation and a second decay constant.

91. A processing element, as set forth in claim 88, including means for modifying said equilibrium expectation, wherein the net modification to said equilibrium expectation includes an increase term and a decrease term, said increase term being a function of said second expectation and a rise constant and said decrease term being a function of a second decay constant.

92. A processing element, as set forth in claim 88, wherein said modified first expectation is determined by:

$$W^O = W_p^O + X \cdot \alpha^0 \cdot [W^M - W_p^O] - \delta^0 \cdot [W_p^O - W^1],$$

where, $W^O$=the modified first expectation,
$W^1$=the modified second expectation,
$X$=the input signal,
$\alpha^0$=a first rise constant,
$\delta^0$=a first decay constant,
$W^M$=the maximum expectation, and
$W_p^O$=the previous modified first expectation.

93. A processing element, as set forth in claim 88, wherein said modified first expectation is determined by:

$$W^O = W_p^O + X \cdot \alpha^0 \cdot [W^M - W_p^O] - \delta^0 \cdot [W_p^O - W^1],$$

where, $W^O$=the modified first expectation,
$W^1$=the modified second expectation,
$X$=the input signal, $\alpha^0$=a first rise constant,
$\delta^0$=a first decay constant, and
$W_p^O$= the previous modified first expectation.

94. A processing element, as set forth in claim 88, wherein said modified second expectation is determined by:

$$W^1 = W_p^1 + \alpha^1 \cdot [W_p^O - W^1] - \delta^1 \cdot [W_p^1 - W^E],$$

where, $W^1$=the modified second expectation,
$\alpha^1$=a second rise constant,
$\delta^0$=a second decay constant,
$W^E$=the equilibrium expectation, and
$W_p^1$=the previous modified second expectation.

95. A processing element, as set forth in claim 88, wherein said threshold signal producing means includes an output processor for receiving said output signal and responsively producing a threshold modifying signal.

96. A neural network implemented by application specific integrated chips, the neural network composed of a plurality of synaptic processors, each synaptic processor defined by a series of state variables; comprising:

an input processor for receiving external signals and passing said external signals to the neural network;

a processor for updating the state variables of the synaptic processors;

a memory device for storing the state variables;

an output processor for receiving signals from the neural network and passing said signals to the outside world;

wherein said neural network is implemented via programming of said processor; and wherein said processor includes, for each synaptic processor:

means for initializing first and second expectations, said first and second expectations being bounded by a maximum expectation and an equilibrium expectation;

means for receiving said input signal and said first expectation and generating a modified first expectation;

means for receiving said second expectation and said modified first expectation, modifying said second expectation as a function of said modified first expectation, and responsively generating a modified second expectation;

wherein said modified second expectation is provided to said modified first expectation generating means and wherein said modified first expectation is a function of said modified second expectation and said input signal;

means for receiving said modified first expectation and producing said result signal as a function of said first expectation; and means for receiving said result signal and providing said result signal to the neural network.

* * * * *

UNITED STATES PATENT AND TRADEMARK OFFICE
CERTIFICATE OF CORRECTION

PATENT NO. : 5,504,839
DATED : Apr. 2, 1996
INVENTOR(S) : Mobus

It is certified that error appears in the above-indentified patent and that said Letters Patent is hereby corrected as shown below:

*In claim 18*, column 186, line 61: delete "ms" and insert "is".

*In claim 58*, column 193, line 54:

delete "$r(t) = t(t-\Delta t) - \lambda \cdot r(t-\Delta t)$."

insert "$r(t) = r(t-\Delta t) - \lambda \cdot r(t-\Delta t)$."

*In claim 77* (equation), column 196, line 57:

delete "$w^{M2} > w^{02} > w^{12} > w^{E2}$."

insert "$w^{M2} \geq w^{02} \geq w^{12} \geq w^{E2}$."

*In claim 89*, column 199, line 5:

delete "$w^M > w^0 > w^1 > W^E$."

insert "$w^M \geq w^0 \geq w^1 \geq W^E$."

Signed and Sealed this

Thirty-first Day of December, 1996

Attest:

BRUCE LEHMAN

*Attesting Officer*     *Commissioner of Patents and Trademarks*